United States Patent
Uno et al.

(10) Patent No.: US 10,734,818 B2
(45) Date of Patent: Aug. 4, 2020

(54) VOLTAGE EQUALIZATION CIRCUIT SYSTEM

(71) Applicants: JAPAN CAPACITOR INDUSTRIAL CO., LTD., Tokyo (JP); Japan Aerospace Exploration Agency, Tokyo (JP)

(72) Inventors: Masatoshi Uno, Hitachi (JP); Akio Kukita, Kamakura (JP); Kazushige Ito, Fussa (JP); Tsutomu Sekido, Fussa (JP)

(73) Assignees: JAPAN CAPACITOR INDUSTRIAL CO., LTD., Tokyo (JP); Japan Aerospace Exploration Agency, Tokyo (JP)

( * ) Notice: Subject to any disclaimer, the term of this patent is extended or adjusted under 35 U.S.C. 154(b) by 248 days.

(21) Appl. No.: 15/741,840

(22) PCT Filed: Jul. 22, 2016

(86) PCT No.: PCT/JP2016/071577
§ 371 (c)(1),
(2) Date: Jan. 4, 2018

(87) PCT Pub. No.: WO2017/014300
PCT Pub. Date: Jan. 26, 2017

(65) Prior Publication Data
US 2018/0205238 A1     Jul. 19, 2018

(30) Foreign Application Priority Data
Jul. 22, 2015   (JP) ................................. 2015-145110

(51) Int. Cl.
*H02J 7/00*     (2006.01)
*H02J 7/02*     (2016.01)
(Continued)

(52) U.S. Cl.
CPC ......... *H02J 7/0014* (2013.01); *H01M 10/441* (2013.01); *H02J 7/0019* (2013.01);
(Continued)

(58) Field of Classification Search
CPC ..................................................... H02J 7/0014
(Continued)

(56) References Cited

U.S. PATENT DOCUMENTS

2009/0273321 A1*   11/2009   Gotzenberger ....... H02J 7/0018
                                                       320/166
2012/0200163 A1    8/2012   Ito et al.
(Continued)

FOREIGN PATENT DOCUMENTS

JP          2011-055648 A      3/2011
JP          2012186881 A   *   9/2012
(Continued)

OTHER PUBLICATIONS

International Search Report issued in PCT/JP2016/071577; dated Sep. 20, 2016.
(Continued)

*Primary Examiner* — Adi Amrany
(74) *Attorney, Agent, or Firm* — Studebaker & Brackett PC

(57) ABSTRACT

An equalization circuit system having a system configuration simplified through reduction of the total number of switches is provided. An electricity storage cell voltage equalization circuit is operated with a square wave voltage generated at a switching node in an electricity storage module voltage equalization circuit as an input voltage, thereby achieving an electricity storage cell voltage equalization circuit without a switch. Typically, the electricity storage cell voltage equalization circuit may be a resonance voltage-doubling rectifier circuit, and the electricity storage
(Continued)

module voltage equalization circuit may be a switched capacitor, a resonance voltage-doubling rectifier circuit, a buck-boost converter or the like.

3 Claims, 40 Drawing Sheets

(51) Int. Cl.
    *H02M 3/07* (2006.01)
    *H02M 3/337* (2006.01)
    *H01M 10/44* (2006.01)
    *H02J 7/34* (2006.01)
    *H02M 7/483* (2007.01)
    *H02M 7/5387* (2007.01)

(52) U.S. Cl.
    CPC .............. *H02J 7/0024* (2013.01); *H02J 7/02* (2013.01); *H02J 7/345* (2013.01); *H02M 3/07* (2013.01); *H02M 3/337* (2013.01); *H02M 7/483* (2013.01); *H02M 7/5387* (2013.01)

(58) Field of Classification Search
    USPC ............................................ 307/77; 320/116
    See application file for complete search history.

(56) References Cited

U.S. PATENT DOCUMENTS

2015/0002096 A1\* 1/2015 Suzuki ................... H02J 7/007
    320/112
2016/0118817 A1\* 4/2016 Uno ....................... H02M 3/156
    320/166
2016/0294189 A1\* 10/2016 Uno ........................... G05F 1/67

FOREIGN PATENT DOCUMENTS

| JP | 2013-183557 A | | 9/2013 | |
|---|---|---|---|---|
| JP | 2013183557 A | \* | 9/2013 | |
| JP | 2013220009 A | \* | 10/2013 | .............. B60L 58/22 |
| JP | 2014233128 A | \* | 12/2014 | .............. H02J 7/345 |

OTHER PUBLICATIONS

Written Opinion issued in PCT/JP2016/071577; dated Sep. 20, 2016.

Park et al.; Design of a Charge Equalizer Based on Battery Modularization; IEEE Transactions on Vehicular Technology; vol. 58, No. 7; pp. 3216-3223; 2009.

Uno et al.; Two-Switch Cell Voltage Equalizer Using Series-Resonant Voltage Multiplier for Series-Connected Energy Storage Cells—Consideration to Optimum Operation Mode for Integration with Charge-Discharge Regulator—; The Institute of Electronics, Information and Communication Engineers (Energy Engineering in Electronics and Communications); IEICE Technical Report; vol. 114, No. 63; pp. 7-12; 2009.

Uno et al.: Two-Switch Voltage Equalizer Using a Series-Resonant Voltage Multiplier Operating in Frequency-Multiplied Discontinuous Conduction Mode for Series-Connected Supercapacitors; IEICE Trans. Commun.; vol. E98-B, No. 5; pp. 842-853; 2015.

\* cited by examiner

VOLTAGE EQUALIZATION CIRCUIT SYSTEM

TECHNICAL FIELD

The present invention relates to an equalization circuit system configured to equalize voltages of a plurality of electricity storage cells (such as capacitors, secondary batteries, or electric double-layer capacitors) connected in series in an electricity storage module.

BACKGROUND ART

For example, in a secondary battery or an electric double-layer capacitor, a plurality of electricity storage cells are connected in series and used to form an electricity storage module for obtaining a desired voltage. In usage requiring relatively large electrical power and energy, the electricity storage modules are connected in series and used to form an electricity storage system.

In each electricity storage module and the electricity storage system described above, a voltage difference between electricity storage cells, which is attributable to variance in capacitance, internal resistance, environment temperature, self-discharging, and the like between the electricity storage cells, is generated through repetitive charging and discharging. Typically, an electricity storage module or an electricity storage system in which such a voltage difference is generated suffers problems such as accelerated progress of degradation and decrease of available energy. To solve those problems, various voltage equalization circuits have been disclosed.

A large-scale electricity storage system tends to have a serious problem of generation of a voltage difference attributable to the environment temperature among the above-described factors for generating a voltage difference between electricity storage cells. Typically, since a large-scale system inevitably has a large physical size, it is difficult to achieve uniform temperature distribution inside the large-scale electricity storage system. Since each electricity storage module included in the electricity storage system has a physical size smaller than that of the electricity storage system, temperature distribution inside the electricity storage module is relatively small. In other words, since the temperature is relatively uniform inside each electricity storage module, the magnitude of a voltage difference between the electricity storage cells is relatively small. However, a relatively large temperature variance exists between the electricity storage modules, and thus the magnitude of the voltage difference between the electricity storage modules tends to be large.

CITATION LIST

Patent Literature

Patent Literature 1: Japanese Patent Laid-Open No. 2013-183557
Patent Literature 2: Japanese Patent Laid-Open No. 2011-55648

Non Patent Literature

Non Patent Literature 1: H. S. Park, C. H. Kim, K. B. Park, G. W. Moon, and J. H. Lee, "Design of a charge equalizer based on battery modularization", IEEE Transactions on Vehicular Technology, vol. 58, no. 7, pp. 3216-3223, 2009.
Non Patent Literature 2: Masatoshi Uno and Akio Kukita, "Two-Switch Cell Voltage Equalizer Using Series-Resonant Voltage Multiplier for Series-Connected Energy Storage Cells—Consideration to Optimum Operation Mode for Integration with Charge-Discharge Regulator—", The Institute of Electronics, Information and Communication Engineers (Energy Engineering in Electronics and Communications), IEICE Technical Report vol. 114, no. 63, pp. 7-12.

SUMMARY OF INVENTION

Technical Problem

Typically, larger capacity (electrical power capacity) is required for a voltage equalization circuit as the magnitude of a voltage difference is larger. As described above, the magnitude of a voltage difference between electricity storage cells inside each electricity storage module is small, but the magnitude of a voltage difference between the electricity storage modules tends to be large. Thus, it is effective to provide different voltage equalization circuits inside each electricity storage module (that is, for the cells) and between the electricity storage modules (that is, for the modules). In a disclosed scheme, different equalization circuit schemes are applied to an electricity storage cell voltage equalization circuit and an electricity storage module voltage equalization circuit inside each electricity storage module. FIG. 1 illustrates a conceptual diagram of this system.

When different equalization circuit schemes are applied for equalization inside each electricity storage module and equalization between the electricity storage modules, optimum voltage equalization can be achieved as the entire electricity storage system. However, a circuit (hereinafter referred to as an electricity storage cell voltage equalization circuit) for equalization inside each electricity storage module and a circuit (hereinafter referred to as an electricity storage module voltage equalization circuit) for equalization between the electricity storage modules operate independently from each other and each require a switch. Typically, a switch requires a drive circuit including a plurality of components, and thus the number of switches is used as an index indicating complication of a circuit configuration. In an equalization circuit scheme using a switched capacitor (FIG. 2a) disclosed in Non Patent Literature 1, a large number of switches are required in proportional to the number of electricity storage cells and the number of electricity storage modules, which leads to a significantly complicated circuit configuration of the system. Non Patent Literature 1 also discloses an equalization circuit scheme (FIG. 2b) using a multiwinding transformer configured to operate with one switch. However, the multiwinding transformer is difficult to design, which is a largest disadvantage.

Patent Literature 1 discloses an equalization circuit scheme that requires no multiwinding transformer and operates with two switches (FIG. 3). This circuit scheme is achieved by combining a half-bridge circuit and a series resonance voltage-doubling rectifier circuit. The series resonance voltage-doubling circuit is driven by a square wave voltage generated by the half-bridge circuit. When this equalization circuit scheme is applied to the electricity storage cell voltage equalization circuit and the electricity storage module voltage equalization circuit, the circuit configuration of the electricity storage system is significantly simplified, but both of the electricity storage cell voltage equalization circuit and the electricity storage module voltage equalization circuit still require switches.

The present invention is made in the above-described background. The present invention is intended to achieve, in an equalization circuit system including an electricity storage cell voltage equalization circuit and an electricity storage module voltage equalization circuit, operation of the electricity storage cell voltage equalization circuit without a switch and simplification of the circuit system through reduction of the number of switches in the entire system.

Solution to Problem

To solve the above-described problem, the present invention provides a voltage equalization circuit system including: first to n-th (n is an integer equal to or larger than two) electricity storage cell voltage equalization circuits connected with first to n-th electricity storage modules, respectively, and each configured to equalize electricity storage cell voltages of a plurality of electricity storage cells included in the corresponding electricity storage module; and an electricity storage module voltage equalization circuit configured to equalize electricity storage module voltages of first to n-th electricity storage modules and operate by switching. The first to n-th electricity storage cell voltage equalization circuits are each configured to operate by receiving, from the electricity storage module voltage equalization circuit, inputting of an input voltage that changes in response to the switching.

In the above-described voltage equalization circuit system, each electricity storage cell voltage equalization circuit can be operated with, as an input voltage, a temporally changing voltage such as a square wave shape generated at a switching node of a switch-type electricity storage module voltage equalization circuit in operation, which eliminates the need to provide a separately dedicated switch to the electricity storage cell voltage equalization circuit.

In the above-described voltage equalization circuit system, the k-th electricity storage cell voltage equalization circuit may include an electricity storage cell voltage equalization circuit internal multi-stage voltage-doubling rectifier circuit, and an electricity storage cell voltage equalization circuit internal resonance circuit. In the electricity storage cell voltage equalization circuit internal multi-stage voltage-doubling rectifier circuit, when $m_k$ ($m_k$ is an integer equal to or larger than two) represents the number of electricity storage cells included in the k-th (k is any integer between 1 and n) electricity storage module, first to $m_k$-th electricity storage cells connected in series are each connected in parallel with two electricity storage cell voltage equalization circuit internal diodes connected in series, and an electricity storage cell voltage equalization circuit internal capacitor is connected with a middle point between the two electricity storage cell voltage equalization circuit internal diodes connected in series. The electricity storage cell voltage equalization circuit internal resonance circuit is configured to convert the input voltage and output an alternating-current voltage to each electricity storage cell voltage equalization circuit internal capacitor. The electricity storage cell voltage equalization circuit internal resonance circuit is configured to equalize the voltages of the first to $m_k$-th electricity storage cells by using the alternating-current voltage output from the electricity storage cell voltage equalization circuit internal resonance circuit. In this case, the electricity storage cell voltage equalization circuit internal resonance circuit may include a resonance circuit internal inductor and a resonance circuit internal capacitor that are connected in series.

The electricity storage module voltage equalization circuit may further include at least one electricity storage module voltage equalization circuit internal capacitor, and may be configured to equalize the voltages of the first to n-th electricity storage modules by changing, by the switching, a connection state between each of the first to n-th electricity storage modules and the at least one electricity storage module voltage equalization circuit internal capacitor to allow the first to n-th electricity storage modules to perform mutual charging and discharging through at least one electricity storage module voltage equalization circuit internal capacitor.

Alternatively, the electricity storage module voltage equalization circuit may include an electricity storage module voltage equalization circuit internal multi-stage voltage-doubling rectifier circuit, an electricity storage module voltage equalization circuit internal input circuit, and an electricity storage module voltage equalization circuit internal resonance circuit. In the electricity storage module voltage equalization circuit internal multi-stage voltage-doubling rectifier circuit, each of the first to n-th electricity storage modules connected in series is connected in parallel with two electricity storage module voltage equalization circuit internal diodes connected in series, and an electricity storage module voltage equalization circuit internal capacitor is connected with a middle point between the two electricity storage module voltage equalization circuit internal diodes connected in series. The electricity storage module voltage equalization circuit internal input circuit is configured to receive inputting of a sum of the voltages of the first to n-th electricity storage modules connected in series and output a voltage that changes by the switching. The electricity storage module voltage equalization circuit internal resonance circuit is configured to convert the voltage output from the electricity storage module voltage equalization circuit internal input circuit and output an alternating-current voltage to each electricity storage module voltage equalization circuit internal capacitor. The electricity storage module voltage equalization circuit may be configured to equalize the voltages of the first to n-th electricity storage modules by using the alternating-current voltage output from the electricity storage module voltage equalization circuit internal resonance circuit. In this case, the electricity storage module voltage equalization circuit internal resonance circuit may include a resonance circuit internal inductor and a resonance circuit internal capacitor that are connected in series.

Alternatively, the electricity storage module voltage equalization circuit may be configured as a switching converter including an electricity storage module voltage equalization circuit internal inductor and configured to equalize the voltages of the first to n-th electricity storage modules by adjusting a time ratio of the switching.

Advantageous Effects of Invention

In a resonance modular voltage equalization circuit system according to the present invention, an electricity storage cell voltage equalization circuit without a switch can be achieved by driving the electricity storage cell voltage equalization circuit by using a voltage in, for example, a square wave shape generated in an electricity storage module voltage equalization circuit. In other words, the electricity storage cell voltage equalization circuit only includes passive components, thereby achieving a significantly simplified electricity storage system.

DESCRIPTION OF EMBODIMENTS

The following describes the configuration and operation of a voltage equalization circuit system according to the present invention with reference to the accompanying drawings. However, the configuration and operation of the voltage equalization circuit system according to the present invention are not limited to particular specific configurations to be described with reference to the drawings, but can be modified as appropriate without departing from the scope of the present invention. For example, in the following description, each capacitor is mainly a single electricity storage element, and an electricity storage cell is, for example, a capacitor, a secondary battery, or an electric double-layer capacitor. However, these components may be each an optional element that can be electrically charged and discharged, a module composed of a plurality of the elements, or an optional device including the modules. Each electricity storage element may have a different capacitance. Each switch is a semiconductor switch such as a MOSFET in the following description, but may be an optional electronic switch or mechanical switch.

Circuit Element Included in Voltage Equalization Circuit System

Before description of the configuration and operation of the voltage equalization circuit system according to the present invention, the configurations and operations of a switched capacitor and a resonance voltage-doubling rectifier circuit that can be used as an electricity storage cell voltage equalization circuit and an electricity storage module voltage equalization circuit included in the voltage equalization circuit system will be described based on the disclosures of earlier application inventions (Patent Literatures 1 and 2) by part or all of the inventors of the present invention.

Switched Capacitor

The configuration and operation of a switched capacitor are as described in the specification (Patent Literature 2) of an earlier application invention (Japanese Patent Application No. 2009-202633; Japanese Patent No. 4590520) by the present inventors.

Figure 1:
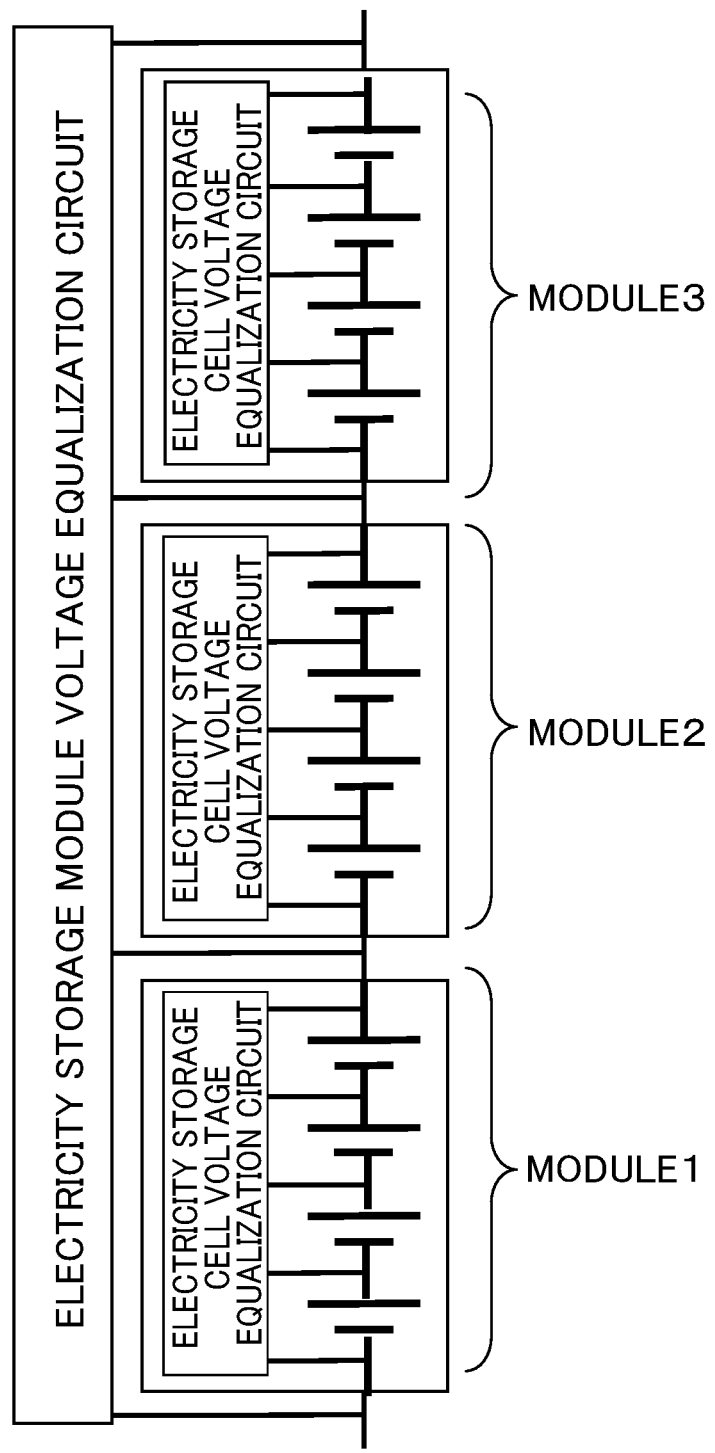
FIG. 1 is a conceptual diagram of an electricity storage system including an electricity storage module equalization circuit and a cell equalization circuit.
Figure 2A:
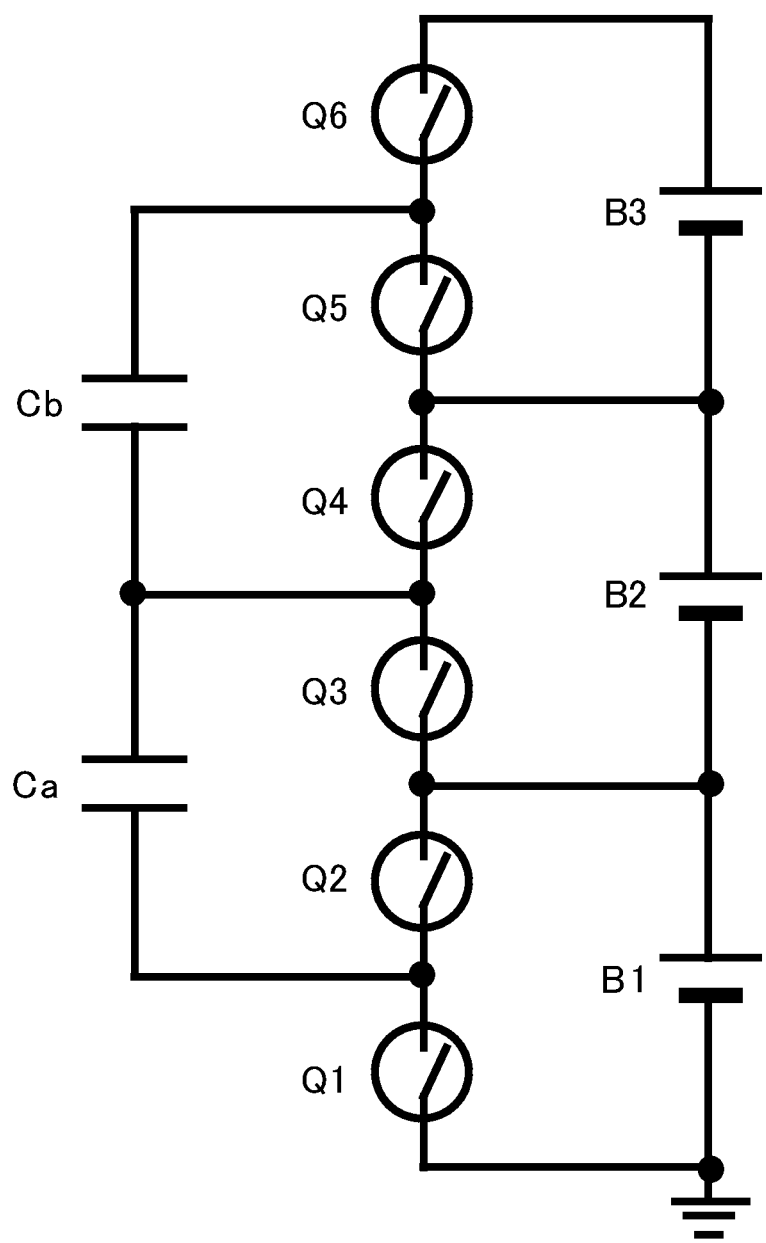
FIG. 2*a* illustrates a conventional equalization circuit scheme using a switched capacitor.
Figure 2B:
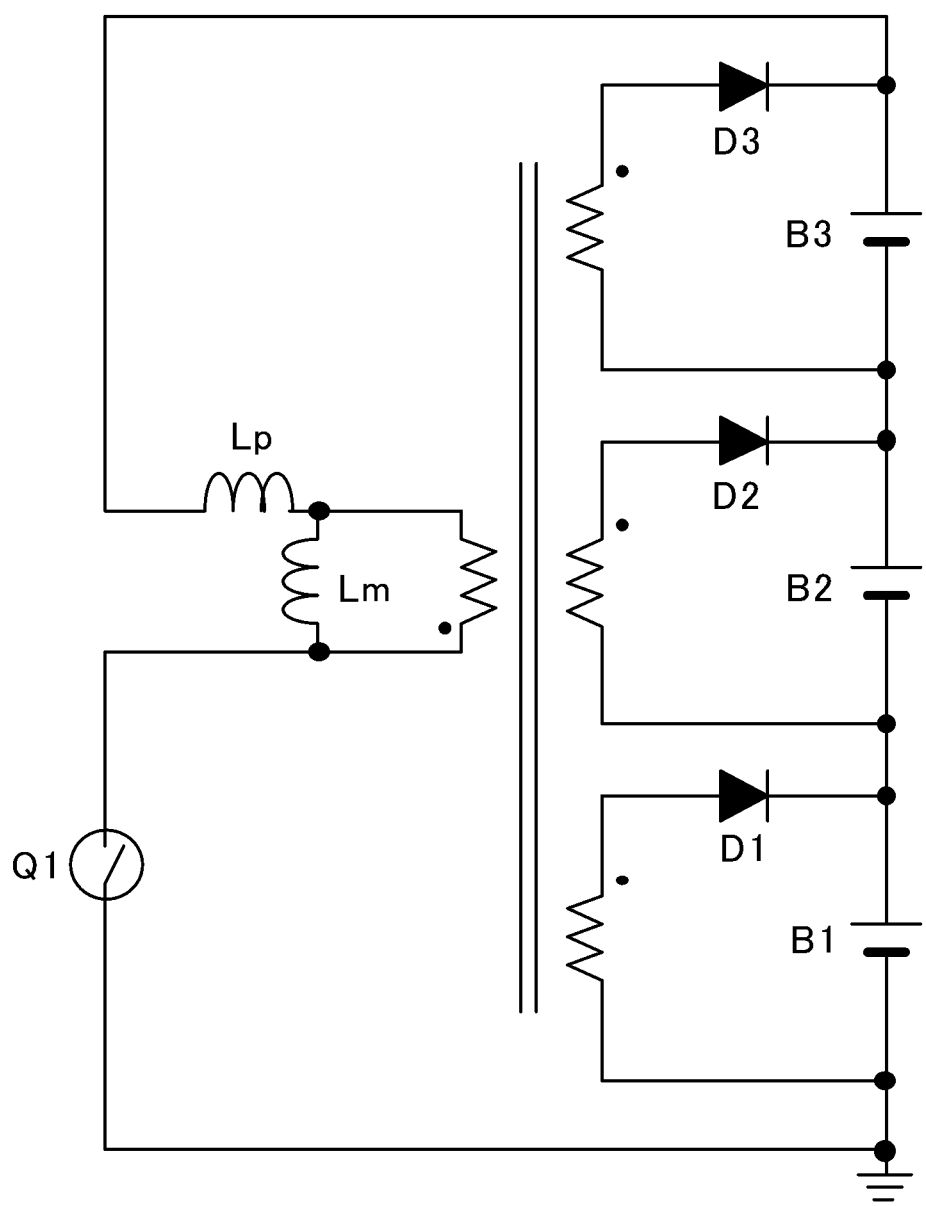
FIG. 2*b* illustrates a conventional equalization circuit scheme using a multiwinding transformer.

Specifically, when a switched capacitor illustrated in FIG. 2a is used, voltages of capacitors Ca and Cb and the electricity storage cells (or electricity storage modules) B1 to B3 are equalized through mutual charging and discharging by repeatedly switching a connection state of switches arranged in series in the order of Q1 to Q6.

Specifically, when the odd-numbered switches Q1, Q3, and Q5 are on, the capacitor Ca is connected in parallel with the electricity storage cell (or electricity storage module) B1, and the capacitor Cb is connected in parallel with the electricity storage cell (or electricity storage module) B2. Accordingly, when a voltage difference exits between a capacitor and an electricity storage cell (or electricity storage module) connected in parallel with each other, mutual charging and discharging is performed therebetween to reduce the voltage difference. When the even-numbered switches Q2, Q4, and Q6 are on, the capacitor Ca is connected in parallel with the electricity storage cell (or electricity storage module) B2, and the capacitor Cb is connected in parallel with the electricity storage cell (or electricity storage module) B3. Accordingly, when a voltage difference exits between a capacitor and an electricity storage cell (or electricity storage module) connected in parallel, mutual charging and discharging is performed therebetween to reduce the voltage difference.

Thus, repetitive switching between a state in which all odd-numbered switches are on and a state in which all even-numbered switches are on allows each capacitor and the corresponding electricity storage cell (or electricity storage module) to perform mutual charging and discharging with all other capacitors and electricity storage cells (or electricity storage modules) directly or indirectly (through, for example, any other capacitor). In this manner, voltages of the capacitors Ca and Cb and the electricity storage cells (or electricity storage modules) B1 to B3 are equalized. The number of electricity storage cells (or electricity storage modules) connected in series is three for the switched capacitor exemplarily illustrated in FIG. 2a, but the same principle applies to operation of a switched capacitor including an optional number (two or larger) of electricity storage cells (or electricity storage modules) connected in series.

Resonance Voltage-Doubling Rectifier Circuit

The configuration and operation of a resonance voltage-doubling rectifier circuit are as described in the specification (Patent Literature 1) of an earlier application invention (Japanese Patent Application No. 2012-46569) by part of the present inventors.

Figure 3:
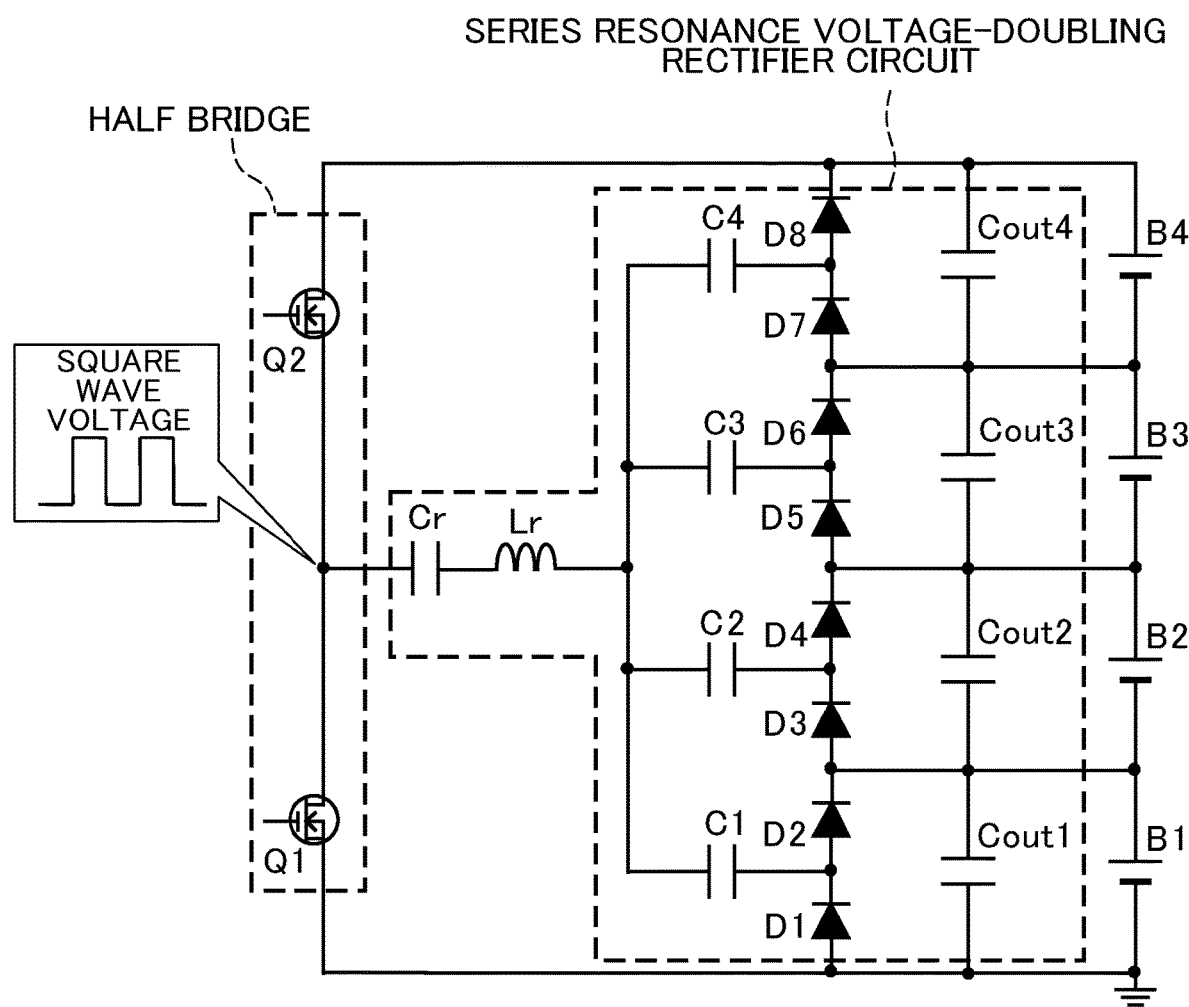
FIG. 3 illustrates a conventional equalization circuit scheme using a series resonance voltage-doubling rectifier circuit, which is disclosed in Patent Literature 1.

An equalization circuit illustrated in FIG. 3 is an example of an equalization circuit disclosed in Patent Literature 1. This equalization circuit includes a multi-stage voltage-doubling rectifier circuit (capacitors C1 to C4, diodes D1 to D8, and output-side capacitors Cout1 to Cout4; the output-side capacitors Cout1 to Cout4 are not essential, and the same operation principle applies without these capacitors), half-bridge input circuits (switches Q1 and Q2), and resonance circuits (a capacitor Cr and an inductor Lr). The multi-stage voltage-doubling rectifier circuit and the resonance circuit function as a series resonance voltage-doubling rectifier circuit. Voltages of the electricity storage cells (or electricity storage modules) B1 to B4 are equalized by connecting the equalization circuit with electricity storage cells (or electricity storage modules) B1 to B4 as illustrated in FIG. 3 and alternately switching the switches Q1 and Q2. The above-described circuits and the equalization circuit disclosed in Patent Literature 1, which includes these circuits, will be described in detail below with reference to the description of Patent Literature 1 (additional description will be made as appropriate in accordance with the content of the present invention).

Multi-Stage Voltage-Doubling Rectifier Circuit

Figure 4:
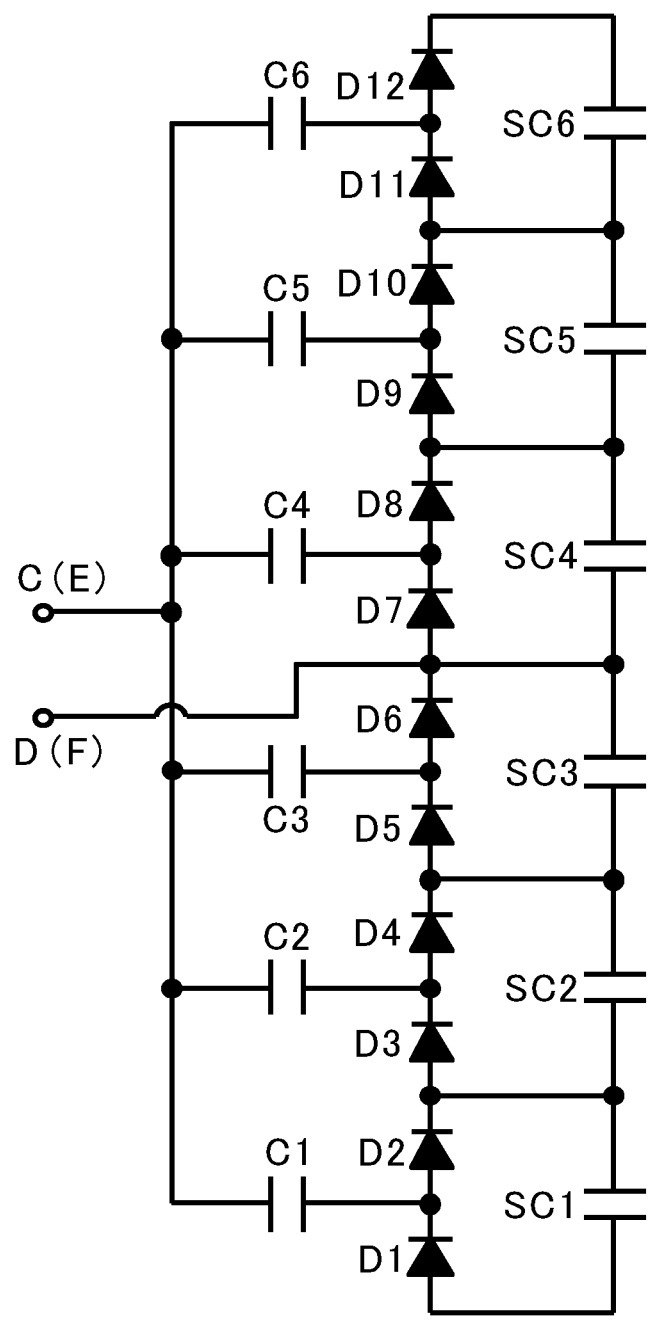
FIG. 4 is a circuit diagram of a multi-stage voltage-doubling rectifier circuit that can be used in an equalization circuit according to Patent Literature 1 (FIG. 3 in Patent Literature 1).

FIG. 4 is a circuit diagram of a multi-stage voltage-doubling rectifier circuit that can be used in the equalization circuit disclosed in Patent Literature 1. The multi-stage voltage-doubling rectifier circuit includes diodes D1 to D12 connected in series, and capacitors C1 to C6 each connected with a middle point between the corresponding pair of two diodes connected in series. The electricity storage cells (or electricity storage modules) SC1 to SC6 are each connected in parallel with the corresponding two of the diodes D1 to D12. As described later, voltages of the electricity storage cells (or electricity storage modules) SC1 to SC6 are equalized when an alternating-current voltage is input from Terminals C and D (third and fourth terminals: first and second terminals will be described later) or Terminals E and F (fifth and sixth terminals) through the capacitors C1 to C6 and the diodes D1 to D12. The number of electricity storage cells (or electricity storage modules) connected in series is not limited to six but may be an optional number equal to or larger than two.

Input Circuit

Figure 5A:
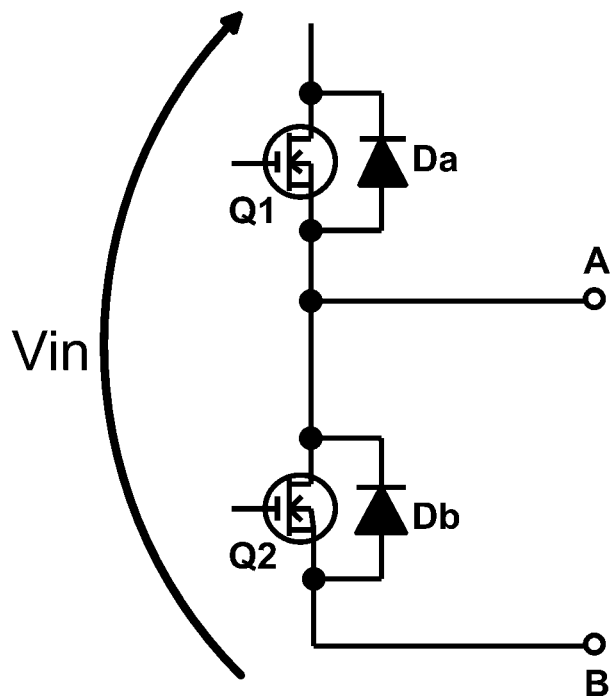
FIG. 5*a* is a circuit diagram of a half-bridge cell that can be used as an input circuit in the equalization circuit according to Patent Literature 1 (FIG. 4a in Patent Literature 1).
Figure 5B:
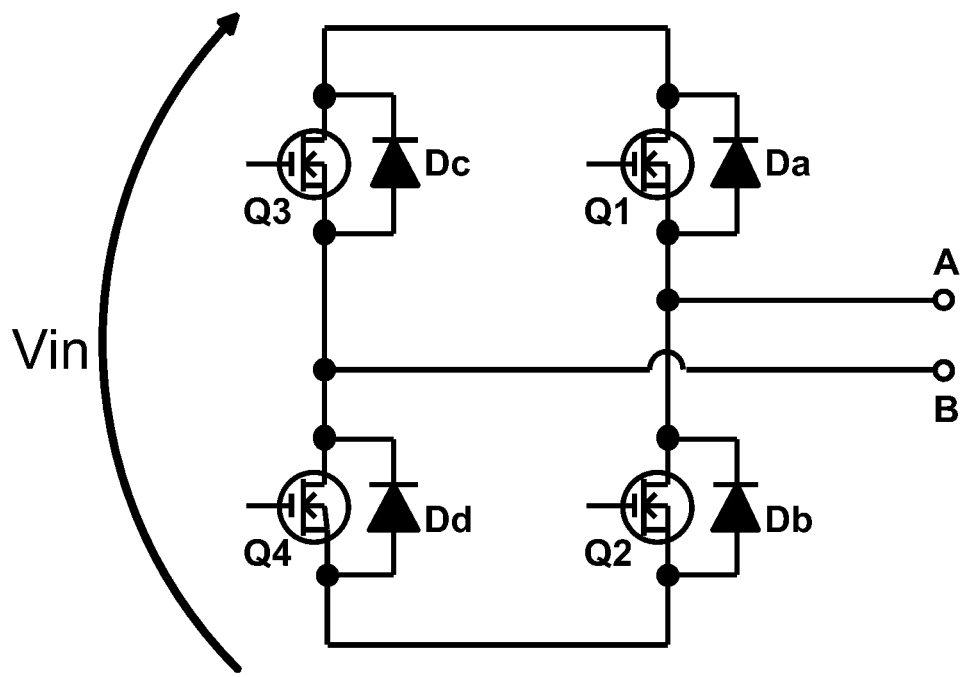
FIG. 5*b* is a circuit diagram of a full-bridge cell that can be used as an input circuit in the equalization circuit according to Patent Literature 1 (FIG. 4b in Patent Literature 1).

FIGS. 5a and 5b are circuit diagrams of a half-bridge cell and a full-bridge cell, respectively, that can be used as input circuits in the equalization circuit disclosed in Patent Literature 1.

The half-bridge cell includes switches Q1 and Q2 connected in series and flywheel diodes Da and Db connected in parallel with the switches Q1 and Q2, respectively. While voltage $V_{in}$ is input between both ends of the switches Q1 and Q2, temporal switching is performed between these switches to output a square wave voltage having a peak voltage at $V_{in}$ and a bottom voltage at zero between Terminals A and B (first and second terminals).

The full-bridge cell includes a switch set of switches Q1 and Q2 connected in series, a switch set of switches Q3 and Q4 connected in series, and flywheel diodes Da to Dd connected in parallel with the respective switches. The switches Q1 and Q2 are connected in parallel with the switches Q3 and Q4. While voltage $V_{in}$ is input between both ends of the switches Q1 and Q2 (between both ends of the switches Q3 and Q4), the connection state is temporally switched between a state in which the switches Q1 and Q4 are on and a state in which the switches Q2 and Q3 are on to output a square wave voltage having a peak voltage $V_{in}$ and a bottom voltage at $-V_{in}$ between Terminals A and B. When the full-bridge cell is used as an input circuit, for example, a resonance circuit including a transformer needs to be provided at a later stage to achieve independent voltage levels at the full-bridge circuit and the multi-stage voltage-doubling rectifier circuit.

Resonance Circuit

FIGS. 6a to 6d are circuit diagrams of a series resonance circuit, a parallel resonance circuit, a series-parallel resonance circuit, and an LLC circuit, respectively, that can be used as resonance circuits in the equalization circuit disclosed in Patent Literature 1. In any of the circuits, at least one inductor and at least one capacitor are provided, and an alternating-current voltage is output between Terminals C and D when a square wave voltage is input between Terminals A and B.

The alternating-current voltage typically has a sinusoidal waveform, but a complete sine wave including a single frequency component only cannot be always obtained. Basic frequency component $f_s$ and amplitude $V_M$ of the alternating-current voltage depend not only on the inductance of the inductor and the capacitance of a capacitor included in a resonance circuit but also on the characteristics of a resistor connected with between Terminals C and D. In particular, when the resonance circuit is connected with a multi-stage voltage-doubling rectifier circuit including capacitors C1 to C6 as resistors, the basic frequency component $f_s$ may change also depending on the capacitance thereof.

However, an alternating-current voltage can be obtained through a resonance phenomenon between an inductive element and a capacitive element (current having a waveform same as that of inductor current $i_{Lr}$ illustrated in FIG. 10 to be described later is input to a multi-stage voltage-doubling rectifier circuit) by using any of the resonance circuits illustrated in FIGS. 6a to 6d or any other circuit including at least an inductive element (as described above, when a capacitor is included in a multi-stage voltage-doubling rectifier circuit connected as a resistor, a resonance circuit may be configured by only connecting an inductive element while the capacitor is used as a capacitive element). Accordingly, the equalization circuit disclosed in Patent Literature 1 can be operated in the same principle irrespective of specific values of frequency component $f_s$ and amplitude $V_M$.

As illustrated in FIGS. 7a to 7d, when a transformer is formed by providing a conductive wire between Terminals C and D, winding a wire around the conductive wire as a core, and further winding a secondary winding wire around the core, an alternating-current voltage applied between Terminals C and D can be changed before being output between Terminals E and F at both ends of the secondary winding wire.

Equalization Circuit Disclosed in Patent Literature 1

Figure 6A:
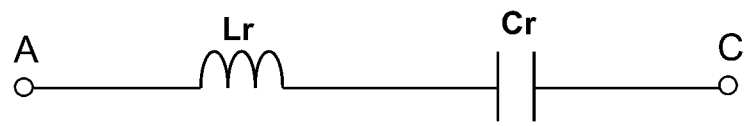
FIG. 6*a* is a circuit diagram of a series resonance circuit that can be used as a resonance circuit in the equalization circuit according to Patent Literature 1 (FIG. 5a in Patent Literature 1).
Figure 6A:
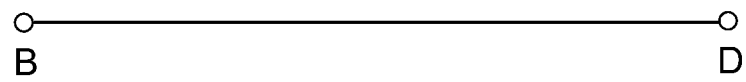
Figure 8:
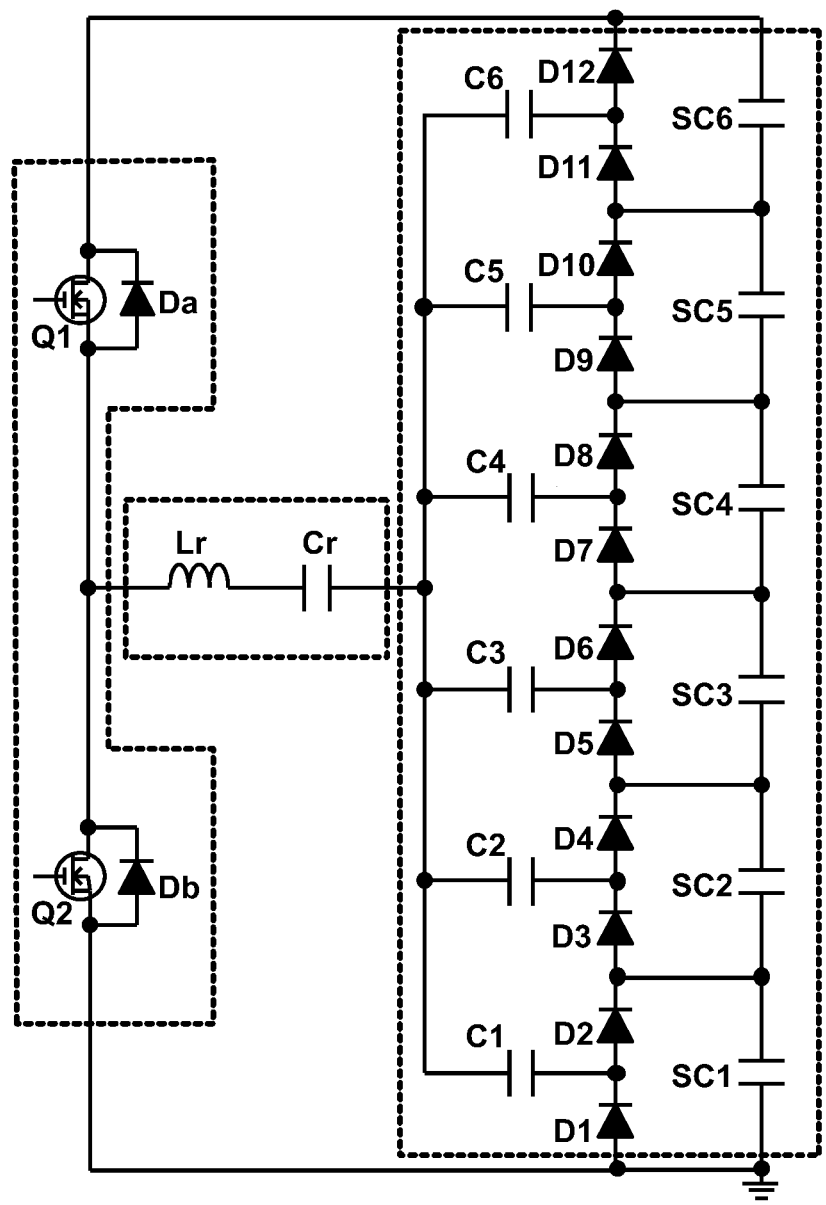
FIG. 8 is a circuit diagram of an embodiment of the equalization circuit according to Patent Literature 1, in which the multi-stage voltage-doubling rectifier circuit illustrated in FIG. 4, the half-bridge cell illustrated in FIG. 5*a*, and the series resonance circuit illustrated in FIG. 6*a* are connected with each other (FIG. 7 in Patent Literature 1).

FIG. 8 illustrates an embodiment of an equalization circuit in which the multi-stage voltage-doubling rectifier circuit illustrated in FIG. 4, the half-bridge cell illustrated in FIG. 5a, and the series resonance circuit illustrated in FIG. 6a are connected with each other. Only two switches are included in the equalization circuit illustrated in FIG. 8, and all other components are passive components. The number of needed switches is two irrespective of the number of electricity storage cells connected in series, which leads to a significantly simplified circuit configuration as compared to various equalization circuits in the conventionally scheme. In addition, inductor Lr is the only magnetism element included in the equalization circuit, in other words, the number of needed magnetism elements is one irrespective of the number of electricity storage cells (or electricity storage modules) connected in series, thereby easily achieving downsizing of the circuit as compared to various equalization circuits in the conventionally scheme.

Equalization Operation by Equalization Circuit Disclosed in Patent Literature 1

The following describes, in detail with reference to FIGS. 9 to 20, an operation to equalize voltages of electricity storage cells (or electricity storage modules) by the equalization circuit disclosed in Patent Literature 1.

Figure 9:
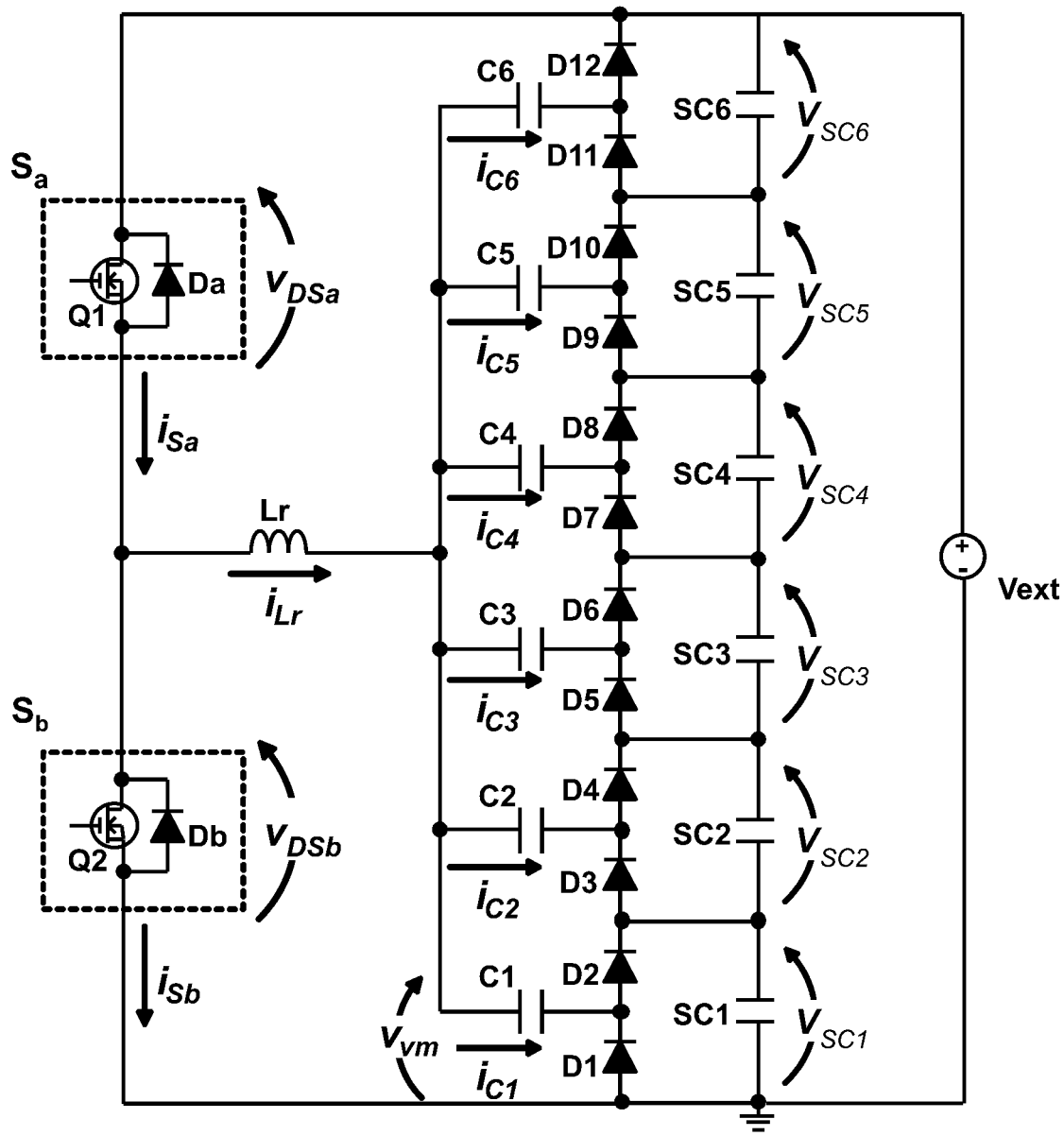
FIG. 9 is a circuit diagram illustrating, in an integrated manner, a capacitor in the resonance circuit and each capacitor in the multi-stage voltage-doubling rectifier circuit in the equalization circuit illustrated in FIG. 8 (FIG. 8 in Patent Literature 1).

The resonance circuit internal capacitor Cr is not illustrated in FIGS. 9 to 20 because capacitor groups of the capacitor Cr and the respective capacitors C1 to C6 in FIG. 8 are included in capacitors C1 to C6 in FIG. 9. Specifically, when, in FIG. 8, the capacitor Cr has capacitance $C_r$ and the capacitors C1 to C6 each have capacitance $C_i$ (i=1 to 6), combined capacitance $C'_i$ is calculated by the following equation:

$$1/C'_i = 1/C_r + 1/C_i \quad (1).$$

The existence of the capacitor Cr can be ignored in description of the operation by using the capacitance $C'_i$ as the capacitance of the capacitor Ci.

In FIG. 9, reference sign $S_a$ denotes a bidirectional switch cell $S_a$ including the switch Q1 and the flywheel diode Da, and reference sign $S_b$ denotes a bidirectional switch cell $S_b$ including the switch Q1 and the flywheel diode Db. Reference signs $v_{DSa}$ and $V_{DSb}$ denotes voltages applied to the switch cells $S_a$ and $S_b$. Reference signs $i_{Sa}$ and $i_{Sb}$ denote current flowing through the switch cells $S_a$ and $S_b$, respectively. Reference sign $i_{Lr}$ denotes current flowing through the inductor Lr. Reference signs $i_{C1}$ to $i_{C6}$ denote current flowing through capacitors C1 to C6, respectively. Reference signs $V_{SC1}$ to $V_{SC6}$ denote voltages applied to the electricity storage cells (or electricity storage modules) SC1 to SC6.

In FIG. 9, a constant-voltage external charger $V_{ext}$ is connected with the electricity storage cells (or electricity storage modules) SC1 to SC6, but is not essential for operating the equalization circuit disclosed in Patent Literature 1.

It is assumed that optional voltages are applied to the electricity storage cells (or electricity storage modules) SC1 to SC6 when the operation starts. The sum of the voltages applied to the electricity storage cells and a constant voltage from the external charger $V_{ext}$ are applied to both ends of the switches Q1 and Q2. A time-dependent voltage $V_{DSb}$ is input to the resonance circuit when the connection state is temporally switched between a state in which a predetermined voltage is applied as a gate voltage $v_{Gsa}$ of the switch Q1 to turn on the switch Q1 and a gate voltage $V_{GSb}$ of the switch Q2 is set to zero to turn off the switch Q2, and a state in which the gate voltage $v_{GSa}$ of the switch Q1 is set to zero to turn off the switch Q1 and a predetermined voltage is applied as the gate voltage $V_{GSb}$ of the switch Q2 to turn on the switch Q2. When the capacitance of the electricity storage cells (or electricity storage modules) SC1 to SC6 is sufficiently larger than the capacitance of the capacitors C1 to C6 and the like, and the electricity storage cell voltages $V_{SC1}$ to $V_{SC6}$ are substantially constant over one switching period, voltages applied to both ends of the switches Q1 and Q2 are substantially constant over one switching period. Accordingly, the voltage $V_{DSb}$ input to the resonance circuit is a square wave voltage as illustrated in FIG. 10. The following describes operation modes 1 to 4 (refer to a graph of $v_{GSa}$ in FIG. 10) corresponding to four divided durations, respectively, of one switching period in each of a case in which the frequency of the switching is higher than the resonance frequency of the resonance circuit and a case in which the frequency of the switching is lower than the resonance frequency of the resonance circuit.

Case in which Switching Frequency is Higher than Resonance Frequency

For sake of simplicity, operation in Mode 2 will be described first. During Mode 2, as illustrated with graphs of $v_{GSa}$ and $V_{GSb}$ in FIG. 10, the switch Q1 is on, the switch Q2 is off, and a substantially constant positive voltage (voltage rising in the direction of an arrow representing $v_{Dsb}$ in FIG. 9; refer to a graph of $V_{DSb}$ in FIG. 10) is output to the resonance circuit including the inductor Lr. Accordingly, positive current (current flowing in the direction of an arrow representing $i_{Lr}$ in FIG. 9; current flowing from the electricity storage cells (or electricity storage modules) SC1 to SC6 to the inductor Lr through the switch Q1 being turned on) flows to the inductor Lr. Then, this current flows on paths illustrated in FIG. 11 through the capacitors C1 to C6, the diodes D2, D4, D6, D8, and D12, and the electricity storage cells (or electricity storage modules) SC2 to SC6. The current $i_{Lr}$ flowing through the inductor Lr sinusoidally changes due to a resonance phenomenon between the inductor Lr and each of the capacitors C1 to C6 (refer to a graph of $i_{Lr}$ in FIG. 10). As understood from FIG. 11, the current $i_{Lr}$ is equal to the current $i_{Sa}$ flowing through the switch cell $S_a$ (refer to a graph of $i_{Sa}$ in FIG. 10). As illustrated in FIG. 11, no current flows through the switch Q2 being turned off, in other words, the current $i_{Sb}$ flowing through the switch cell $S_b$ is zero (refer to a graph of $i_{Sb}$ in FIG. 10). Similarly, as illustrated in FIG. 11, the current $i_{Lr}$ flowing through the inductor Lr bifurcates into the diodes D2, D4, D6, D8, and D12. Accordingly, current $i_{D2i}$ flowing through an even-numbered diode qualitatively has a waveform same as that of $i_{Lr}$, and current $i_{D(2i-1)}$ flowing through an odd-numbered diode is zero (refer to graphs of $i_{D2i}$ and $i_{D(2i-1)}$ in FIG. 10).

An input voltage $v_{vm}$ to the multi-stage voltage-doubling rectifier circuit is the sum of the voltage $V_{DSb}$ of the switch cell $S_b$ and an induced electromotive force by the inductor Lr, and reaches at a maximum value during Mode 2. When $V_{VM-E}$ represents the maximum value of $v_{vm}$ and $V_D$ represents a drop voltage through each diode, voltages $V_{C1E}$ to $V_{C6E}$ of the capacitors C1 to C6 when $v_{vm}$ has the maximum value $V_{VM-E}$ can be expressed by Expression (2) below by applying Kirchhoff's second law to: a path through the switch Q2 (Terminals B and A in FIG. 5a), the inductor Lr, the capacitor C1, the diode D2, and the electricity storage cell (or electricity storage module) SC1; a path through the switch Q2, the inductor Lr, the capacitor C2, the diode D4, and the electricity storage cells (or electricity storage modules) SC2 and SC1; a path through the switch Q2, the inductor Lr, the capacitor C3, the diode D6, and the electricity storage cells (or electricity storage modules) SC3, SC2, and SC1; a path through the switch Q2, the inductor Lr, the capacitor C4, the diode D8, and the electricity storage cells (or electricity storage modules) SC4, SC3, SC2, and SC1; a path through the switch Q2, the inductor Lr, the capacitor C5, the diode D10, and the electricity storage cells (or electricity storage modules) SC5, SC4, SC3, SC2, and SC1; and a path through the switch Q2, the inductor Lr, the capacitor C6, the diode D12, and the electricity storage cells (or electricity storage modules) SC6, SC5, SC4, SC3, SC2, and SC1.

[Math 1]

$$\begin{cases} -V_{C1E} = -V_{VM-E} + V_D + V_{SC1} \\ -V_{C2E} = -V_{VM-E} + V_D + V_{SC1} + V_{SC2} \\ -V_{C3E} = -V_{VM-E} + V_D + V_{SC1} + V_{SC2} + V_{SC3} \\ -V_{C4E} = -V_{VM-E} + V_D + V_{SC1} + V_{SC2} + V_{SC3} + V_{SC4} \\ -V_{C5E} = -V_{VM-E} + V_D + V_{SC1} + V_{SC2} + V_{SC3} + V_{SC4} + V_{SC5} \\ -V_{C6E} = -V_{VM-E} + V_D + V_{SC1} + V_{SC2} + V_{SC3} + V_{SC4} + V_{SC5} + V_{SC6} \end{cases} \quad (2)$$

When the switch Q1 is turned off, current flowing through the switch Q1 during Mode 2 flows to the flywheel diode Db instead, and the operation transitions to Mode 3. In this state, the voltage $V_{Dsb}$ input to the resonance circuit is zero (refer to the graph of $V_{Dsb}$ in FIG. 10), but the current $i_{Lr}$ flowing through the inductor Lr still sinusoidally changes due to a resonance phenomenon (refer to the graph of $i_{Lr}$ in FIG. 10). Since the switching is performed at a frequency higher than the resonance frequency, the current $i_{Lr}$ flowing through the inductor Lr is still positive at the transition to Mode 3. The current $i_{Lr}$ is continuous at the transition to Mode 3 because the inductor Lr is an inductive element, and the current $i_{Sa}$, which has been equal to $i_{Lr}$ during Mode 2, becomes zero simultaneously with the transition to Mode 3 (refer to the graph of $i_{Sa}$ in FIG. 10). Accordingly, the current $i_{Sb}$, which has been zero during Mode 2, has a magnitude equal to that of $i_{Lr}$ simultaneously with the transition to Mode 3 (since the polarity of the current $i_{Sb}$ is defined as illustrated in FIG. 9, the current $i_{Sb}$ and the current $i_{Lr}$ have opposite signs. Refer to the graphs of the current $i_{Sb}$ and $i_{Lr}$ in FIG. 10).

Figure 12:
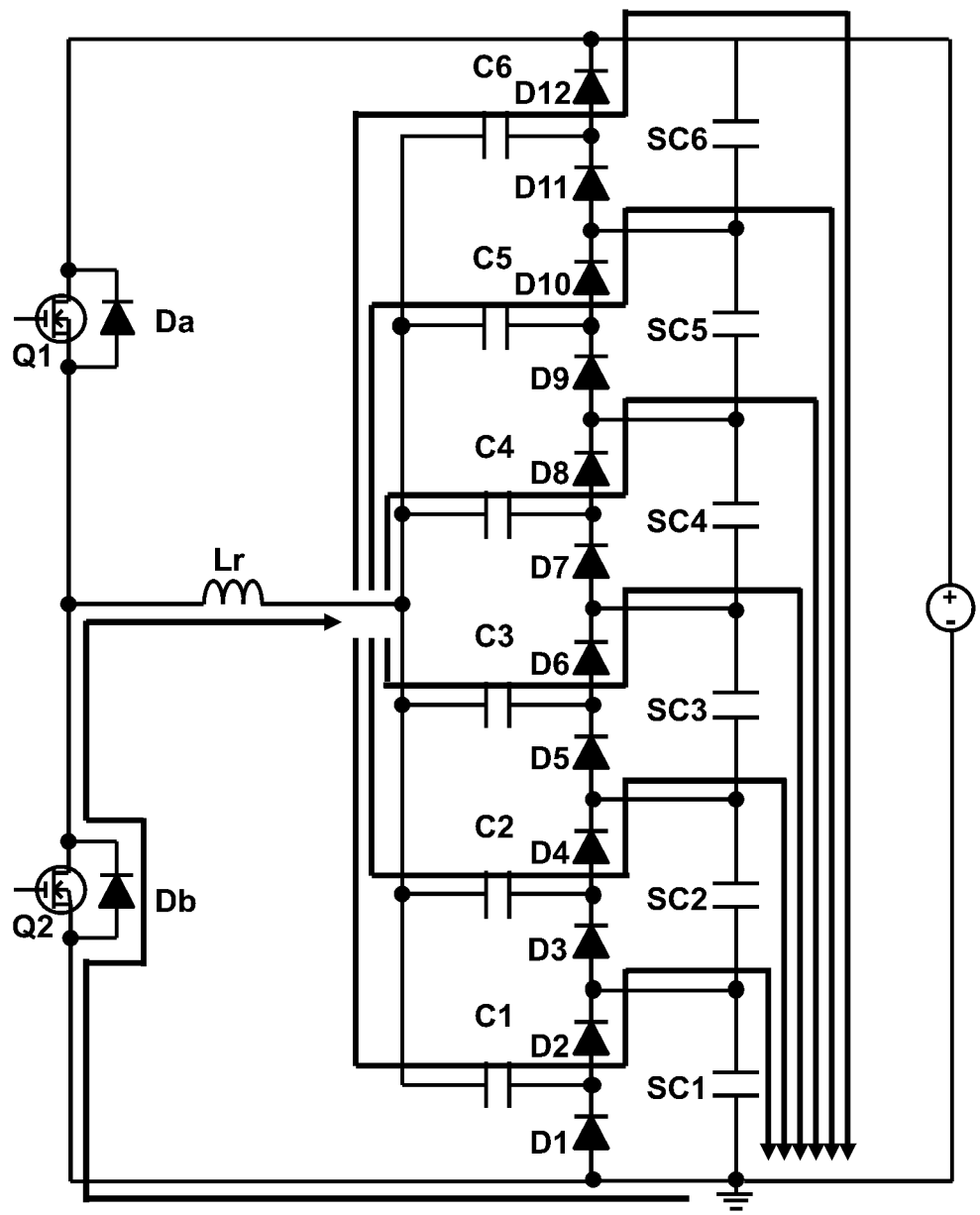
FIG. 12 is a diagram illustrating paths of current flowing during Mode 3 when the equalization circuit illustrated in FIG. 9 is operated at a frequency higher than the resonance frequency of the resonance circuit (FIG. 11 in Patent Literature 1).

FIG. 12 illustrates paths of current flowing during Mode 3. The current $i_{Lr}$ at the inductor Lr bifurcates into the diodes D2, D4, D6, D8, and D12. Accordingly, the current $i_{D2i}$ flowing through an even-numbered diode qualitatively has a waveform same as that of $i_{Lr}$, and the current $i_{D(2i-1)}$ flowing through an odd-numbered diode is zero (refer to the graphs of $i_{D2i}$ and $i_{D(2i-1)}$ in FIG. 10).

The switch Q2 is turned on during Mode 3. The operation transitions to Mode 4 at a timing when the current $i_{Lr}$ at the inductor Lr becomes negative.

Figure 10:
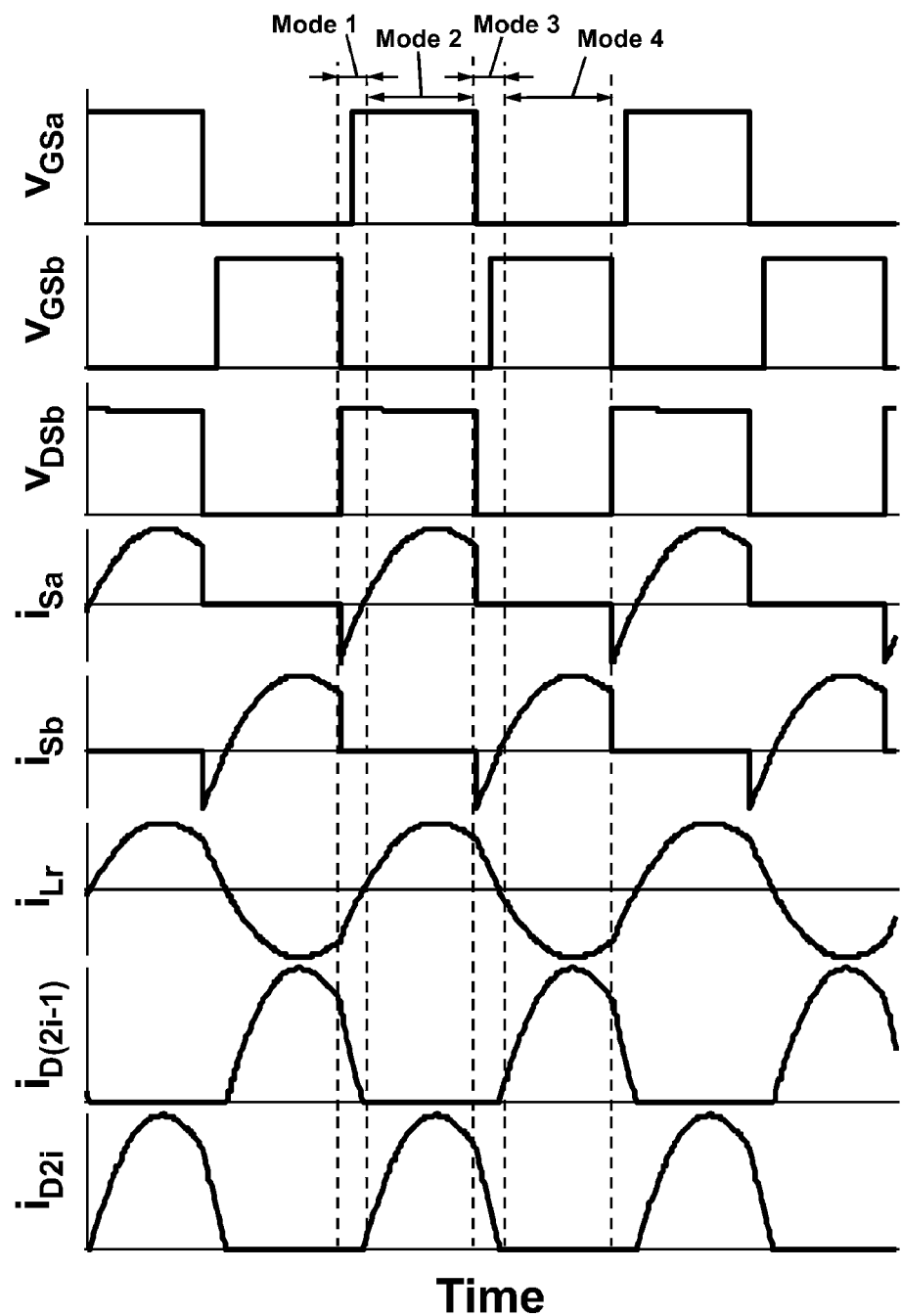
FIG. 10 is a diagram illustrating temporal change of current flowing through each element and temporal change of voltage applied to each switch when the equalization circuit illustrated in FIG. 9 is operated at a frequency higher than the resonance frequency of the resonance circuit (FIG. 9 in Patent Literature 1).
Figure 11:
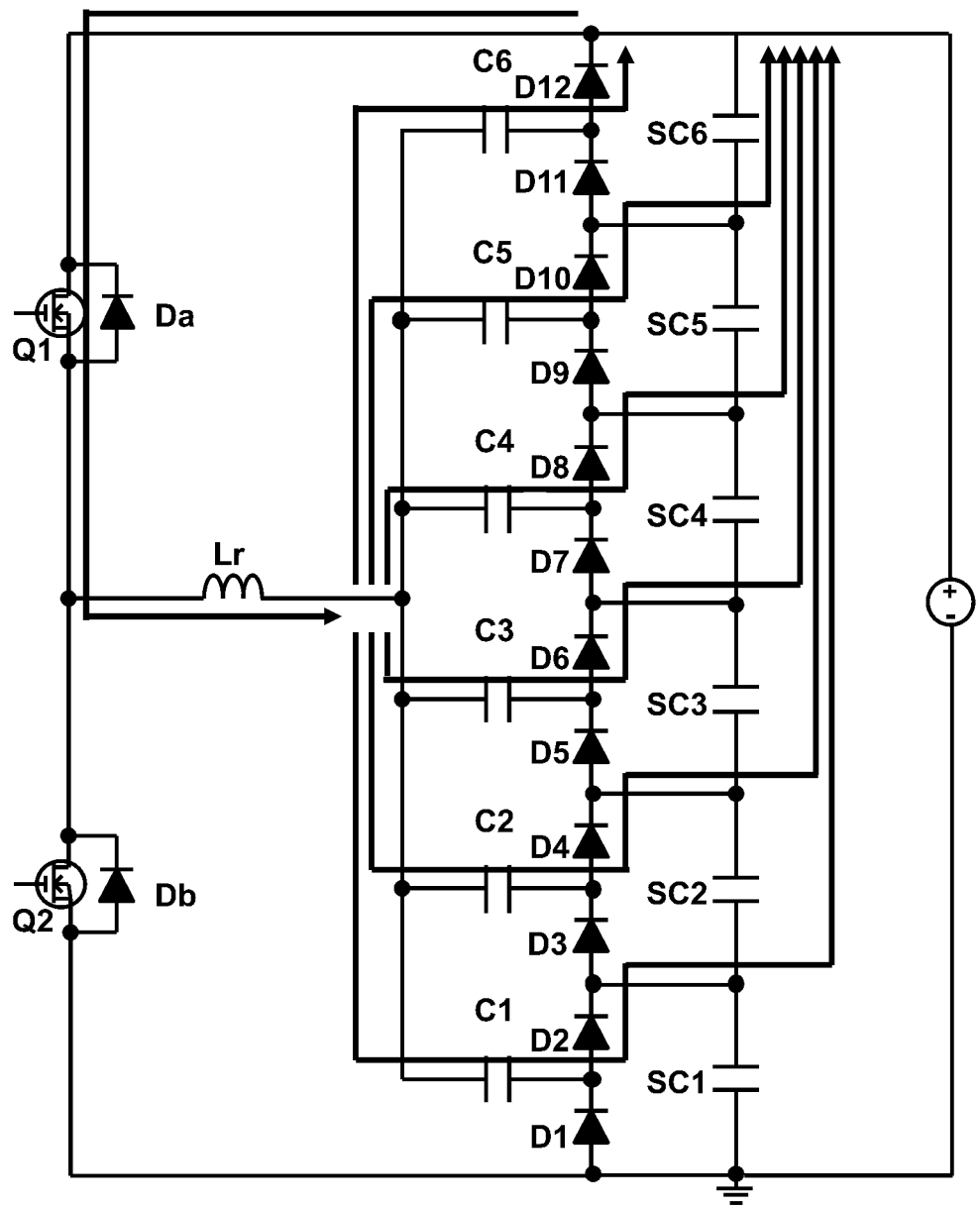
FIG. 11 is a diagram illustrating paths of current flowing during Mode 2 when the equalization circuit illustrated in FIG. 9 is operated at a frequency higher than the resonance frequency of the resonance circuit (FIG. 10 in Patent Literature 1).
Figure 13:
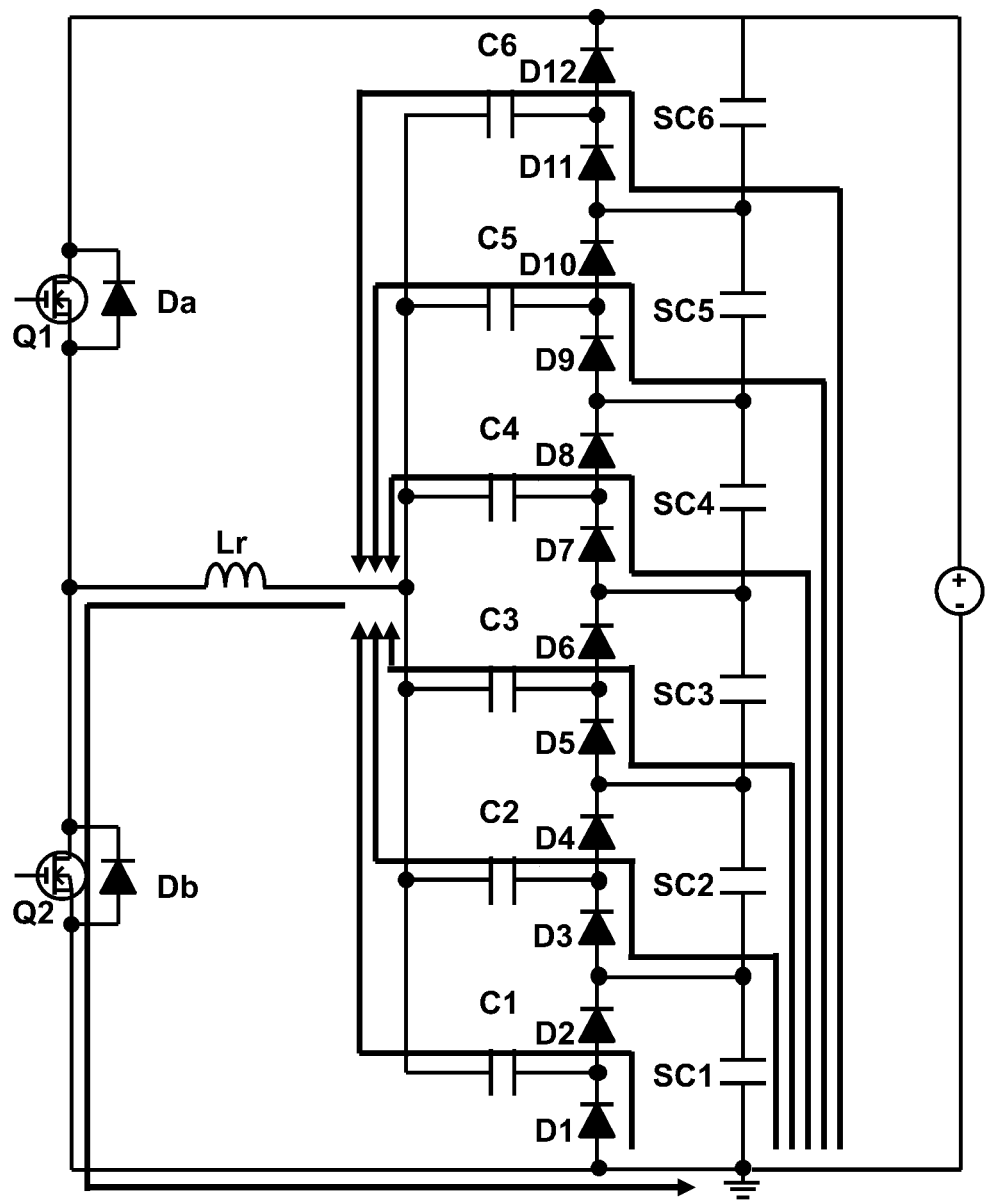
FIG. 13 is a diagram illustrating paths of current flowing during Mode 4 when the equalization circuit illustrated in FIG. 9 is operated at a frequency higher than the resonance frequency of the resonance circuit (FIG. 12 in Patent Literature 1).

During Mode 4, similarly to Mode 3, the voltage $V_{Dsb}$ input to the resonance circuit is zero (refer to the graph of $V_{DSb}$ in FIG. 10), but the current $i_{Lr}$ flowing through the inductor Lr still sinusoidally changes due to a resonance phenomenon (refer to the graph of $i_{Lr}$ in FIG. 10). The current $i_{Lr}$, which is negative, flows on paths illustrated in FIG. 13 through the switch Q2, the electricity storage cells (or electricity storage modules) SC1 to SC5, the diodes D1, D3, D5, D7, D9, and D11, and the capacitors C1 to C6. As understood from FIG. 13, the current $i_{Lr}$ has a magnitude equal to that of the current $i_{Sb}$ flowing through the switch cell $S_b$, and has the opposite polarity (refer to the graph of $i_{Sb}$ in FIG. 10). As illustrated in FIG. 13, no current flows through the switch Q1 being turned off, in other words, the current $i_{Sa}$ flowing through the switch cell $S_a$ is zero (refer to the graph of $i_{Sa}$ in FIG. 10). Similarly, as illustrated in FIG. 13, the current $i_{Lr}$ bifurcates into the diodes D1, D3, D5, D7, D9, and D11. Accordingly, the current $i_{D(2i-1)}$ flowing through an odd-numbered diode qualitatively has a waveform same as that of $i_{Lr}$, and the current $i_{D2i}$ flowing through an even-numbered diode is zero (refer to the graphs of $i_{D2i}$ and $i_{D(2i-1)}$ in FIG. 10).

The input voltage $v_{vm}$ to the multi-stage voltage-doubling rectifier circuit reaches at a minimum value during Mode 4. When $V_{VM-O}$ represents the minimum value of $v_{vm}$, voltages $V_{C1O}$ to $V_{C6O}$ of the capacitors C1 to C6 when $v_{vm}$ has the minimum value $V_{VM-O}$ can be expressed by Expression (3) below by applying Kirchhoff's second law to: a path through the switch Q2 (Terminals B and A in FIG. 5a), the inductor Lr, the capacitor C1, and the diode D1; a path through the switch Q2, the inductor Lr, the capacitor C2, the diode D3, and the electricity storage cell (or electricity storage module) SC1; a path through the switch Q2, the inductor Lr, the capacitor C3, the diode D5, and the electricity storage cells (or electricity storage modules) SC2 and SC1; a path through the switch Q2, the inductor Lr, the capacitor C4, the diode D7, and the electricity storage cells (or electricity storage modules) SC3, SC2, and SC1; a path through the switch Q2, the inductor Lr, the capacitor C5, the diode D9, and the electricity storage cells (or electricity storage modules) SC4, SC3, SC2, and SC1; and a path through the switch Q2, the inductor Lr, the capacitor C6, the diode D11, and the electricity storage cells (or electricity storage modules) SC5, SC4, SC3, SC2, and SC1.

[Math 2]

$$\begin{cases} -V_{C1O} = -V_{VM-O} - V_D \\ -V_{C2O} = -V_{VM-O} - V_D + V_{SC1} \\ -V_{C3O} = -V_{VM-O} - V_D + V_{SC1} + V_{SC2} \\ -V_{C4O} = -V_{VM-O} - V_D + V_{SC1} + V_{SC2} + V_{SC3} \\ -V_{C5O} = -V_{VM-O} - V_D + V_{SC1} + V_{SC2} + V_{SC3} + V_{SC4} \\ -V_{C6O} = -V_{VM-O} - V_D + V_{SC1} + V_{SC2} + V_{SC3} + V_{SC4} + V_{SC5} \end{cases} \quad (3)$$

When the switch Q2 is turned off, current flowing through the switch Q2 during Mode 4 flows the flywheel diode Da instead, and the operation transitions to Mode 1. In this state, the substantially constant positive voltage $V_{DSb}$ is output to the resonance circuit including the inductor Lr (refer to the graph of $v_{DSb}$ in FIG. 10). Since the switching is performed at a frequency higher than the resonance frequency, the current $i_{Lr}$ flowing through the inductor Lr is negative at the transition to Mode 1 but temporally rises due to the positive voltage $V_{DSb}$ and a resonance phenomenon. The current $i_{Lr}$ is continuous at the transition to Mode 1 because the inductor Lr is an inductive element, and the current $i_{Sb}$, which has been equal to $i_{Lr}$ during Mode 4 becomes zero simultaneously with the transition to Mode 1 (refer to the graph of $i_{Sb}$ in FIG. 10). Accordingly, the current $i_{Sa}$, which has been zero during Mode 4 becomes equal to $i_{Lr}$ simultaneously with the transition to Mode 1 (refer to the graphs of the current $i_{Sa}$ and $i_{Lr}$ in FIG. 10).

Figure 14:
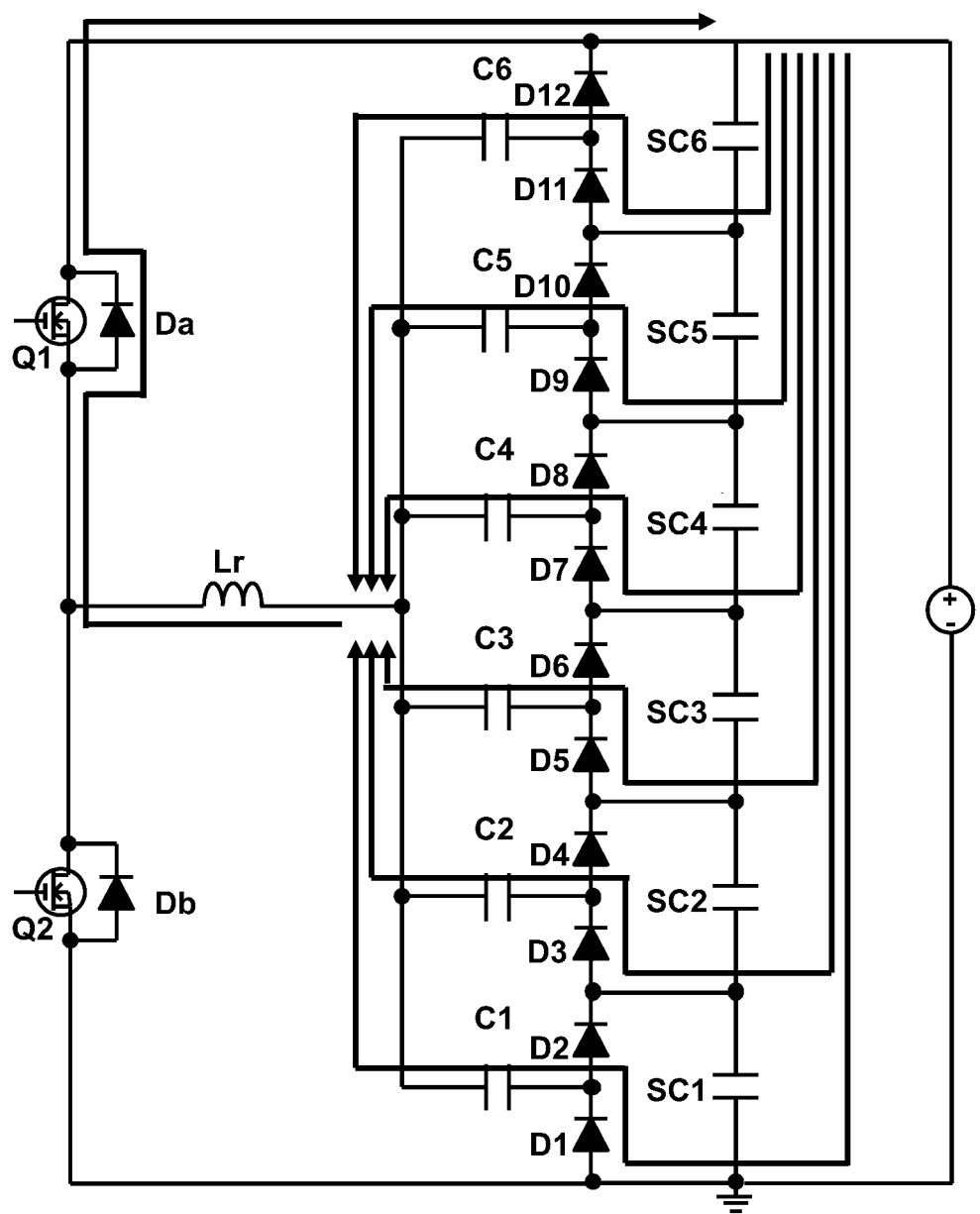
FIG. 14 is a diagram illustrating paths of current flowing during Mode 1 when the equalization circuit illustrated in FIG. 9 is operated at a frequency higher than the resonance frequency of the resonance circuit (FIG. 13 in Patent Literature 1).

FIG. 14 illustrates paths of current flowing during Mode 1. The current $i_{Lr}$ at the inductor Lr bifurcates into the diodes D1, D3, D5, D7, D9, and D11. Accordingly, the current $i_{D(2i-1)}$ flowing through an odd-numbered diode qualitatively has a waveform same as that of $i_{Lr}$, and the current $i_{D2i}$ flowing through an odd-numbered diode is zero (refer to the graphs of $i_{D(2i-1)}$ and $i_{D2i}$ in FIG. 10).

The switch Q1 is turned on during Mode 1. The operation transitions to Mode 2 at a timing when the current $i_{Lr}$ at the inductor Lr becomes positive.

Expressions (2) and (3) above can be used to express voltage variations $\Delta V_{C1}=V_{C1E}-V_{C1O}$ to $\Delta V_{C6}=V_{C6E}-V_{C6O}$ occurring at the capacitors C1 to C6 during one switching period by Expression (4) below.

[Math 3]

$$\begin{cases} \Delta V_{C1} = (V_{VM-E} - V_{VM-O}) - 2V_D - V_{SC1} \\ \Delta V_{C2} = (V_{VM-E} - V_{VM-O}) - 2V_D - V_{SC2} \\ \Delta V_{C3} = (V_{VM-E} - V_{VM-O}) - 2V_D - V_{SC3} \\ \Delta V_{C4} = (V_{VM-E} - V_{VM-O}) - 2V_D - V_{SC4} \\ \Delta V_{C5} = (V_{VM-E} - V_{VM-O}) - 2V_D - V_{SC5} \\ \Delta V_{C6} = (V_{VM-E} - V_{VM-O}) - 2V_D - V_{SC6} \end{cases} \quad (4)$$

Typically, the amount of electric charge carried through a capacitor during an optional time t and an equivalent resistance $R_{eq}$ due to this electric charge transfer can be expressed by Expression (5) below.

[Math 4]

$$\begin{cases} Q = It = CV \\ V = \dfrac{It}{C} = \dfrac{I}{Cf} = IR_{eq} \end{cases} \quad (5)$$

In the above expression, Q represents the amount of electric charge, I represents average current flowing through the time t, C represents the capacitance of the capacitor, and V represents a voltage variation occurring at the capacitor during the time t. When the time t is equal to one switching period, the reciprocal 1/t is the frequency f of the switching.

When, in Expression (5), average current $I_{C1}$ to $I_{C6}$ flowing through the capacitors C1 to C6 over one switching period are used as the current I, and voltage variations $\Delta V_{C1}$ to $\Delta V_{C6}$ of the capacitors C1 to C6 over one switching period are used as the voltage variation V, equivalent resistances $R_{eq1}$ to $R_{eq6}$ of electric charge transfer through the respective capacitors can be expressed by Expression (6) below.

[Math 5]

$$\begin{cases} I_{C1}R_{eq1} = (V_{VM-E} - V_{VM-O}) - 2V_D - V_{SC1} \\ I_{C2}R_{eq2} = (V_{VM-E} - V_{VM-O}) - 2V_D - V_{SC2} \\ I_{C3}R_{eq3} = (V_{VM-E} - V_{VM-O}) - 2V_D - V_{SC3} \\ I_{C4}R_{eq4} = (V_{VM-E} - V_{VM-O}) - 2V_D - V_{SC4} \\ I_{C5}R_{eq5} = (V_{VM-E} - V_{VM-O}) - 2V_D - V_{SC5} \\ I_{C6}R_{eq6} = (V_{VM-E} - V_{VM-O}) - 2V_D - V_{SC6} \end{cases} \quad (6)$$

Figure 15:
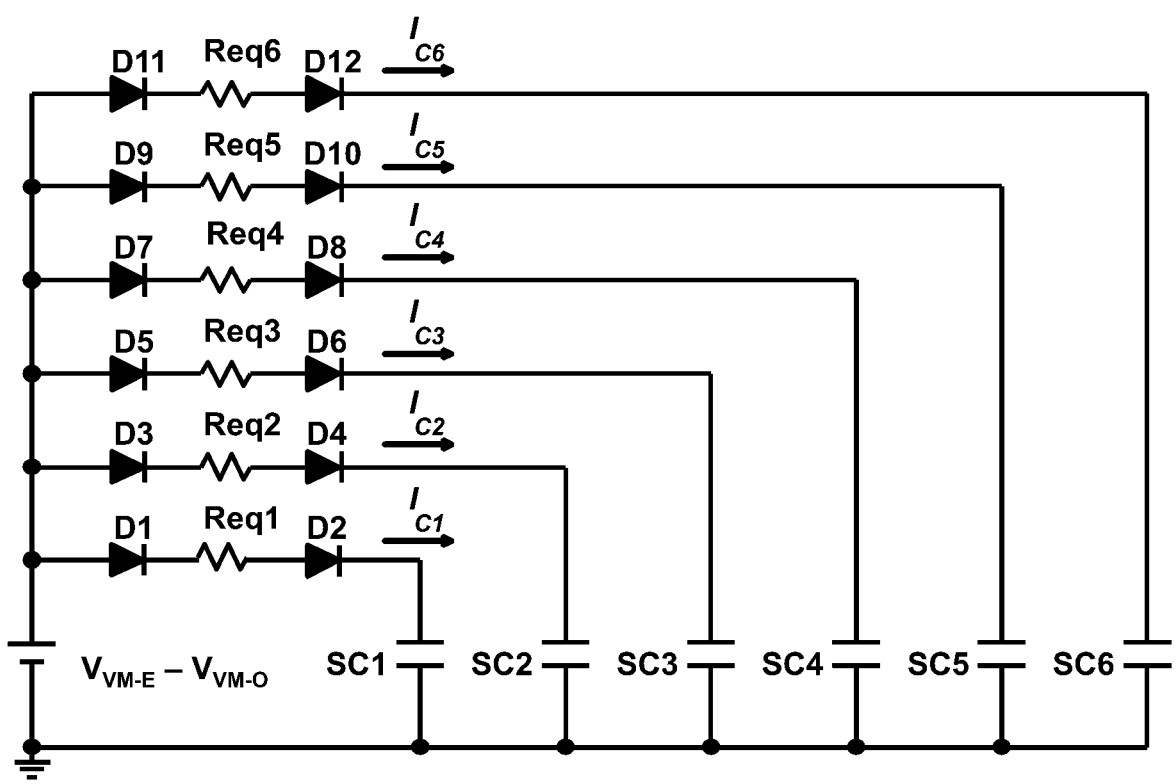
FIG. 15 is a circuit diagram of an equivalent circuit obtained by averaging operation of the equalization circuit illustrated in FIG. 9 over one switching period (FIG. 14 in Patent Literature 1).

A direct-current equivalent circuit as illustrated in FIG. 15 can be obtained, from Expression (6) and Ohm's law, as a circuit for describing the operation of the equalization circuit illustrated in FIG. 9, which is averaged over one switching period. In this direct-current equivalent circuit, the electricity storage cells (or electricity storage modules) SC1 to SC6 are connected with a voltage source having a voltage value of $V_{VM-E}-V_{VM-O}$ through two diodes and one equivalent resistance. Thus, the voltages of the electricity storage cells (or electricity storage modules) SC1 to SC6 are all adjusted toward a voltage of $(V_{VM-E}-V_{VM-O})-2V_D$ and thus changed toward equalization.

Case in which Switching Frequency is Lower than Resonance Frequency

The following describes operation of the equalization circuit illustrated in FIG. 9 when the switching frequency is lower than the resonance frequency.

For sake of simplicity, operation in Mode 2 will be described first. During Mode 2, as illustrated with graphs of $v_{GSa}$ and $v_{GSb}$ in FIG. 16, the switch Q1 is on, the switch Q2 is off, and a substantially constant positive voltage (refer to a graph of $V_{DSb}$ in FIG. 16) is output to the resonance circuit including the inductor Lr. Accordingly, positive current (flowing from the electricity storage cells (or electricity storage modules) SC1 to SC6 to the inductor Lr through the switch Q1 being turned on) flows to the inductor Lr. Then, this current flows on paths illustrated in FIG. 17 through the capacitors C1 to C6, the diodes D2, D4, D6, D8, and D12, and the electricity storage cells (or electricity storage modules) SC2 to SC6. The current $i_{Lr}$ flowing through the inductor Lr sinusoidally changes due to a resonance phenomenon between the inductor Lr and each of the capacitors C1 to C6 (refer to a graph of $i_{Lr}$ in FIG. 16). As understood from FIG. 17, the current $i_{Lr}$ is equal to the current $i_{Sa}$ flowing through the switch cell $S_a$ (refer to a graph of $i_{Sa}$ in FIG. 16). As illustrated in FIG. 17, no current flows through the switch Q2 being turned off, in other words, the current $i_{Sb}$ flowing through the switch cell $S_b$ is zero (refer to a graph of $i_{Sb}$ in FIG. 16). Similarly, as illustrated in FIG. 17, the current $i_{Lr}$ bifurcates into the diodes D2, D4, D6, D8, and D12. Accordingly, the current $i_{D2i}$ flowing through an even-numbered diode qualitatively has a waveform same as that of $i_{Lr}$, and the current $i_{D(2i-1)}$ flowing through an odd-numbered diode is zero (refer to graphs of $i_{D2i}$ and $i_{D(2i-1)}$ in FIG. 16).

The input voltage $v_{vm}$ to the multi-stage voltage-doubling rectifier circuit is the sum of the voltage $V_{DSb}$ of the switch cell $S_b$ and the induced electromotive force by the inductor Lr, and reaches at a maximum value during Mode 2. When $V_{VM-E}$ represents the maximum value of $v_{vm}$ and $V_D$ represents a drop voltage due to each diode, the voltages $V_{C1E}$ to $V_{C6E}$ of the capacitors C1 to C6 when $v_{vm}$ has the maximum value $V_{VM-E}$ can be expressed in the above Expression (2) by applying Kirchhoff's second law, similarly to the case in which the switching frequency is higher than the resonance frequency.

Figure 16:
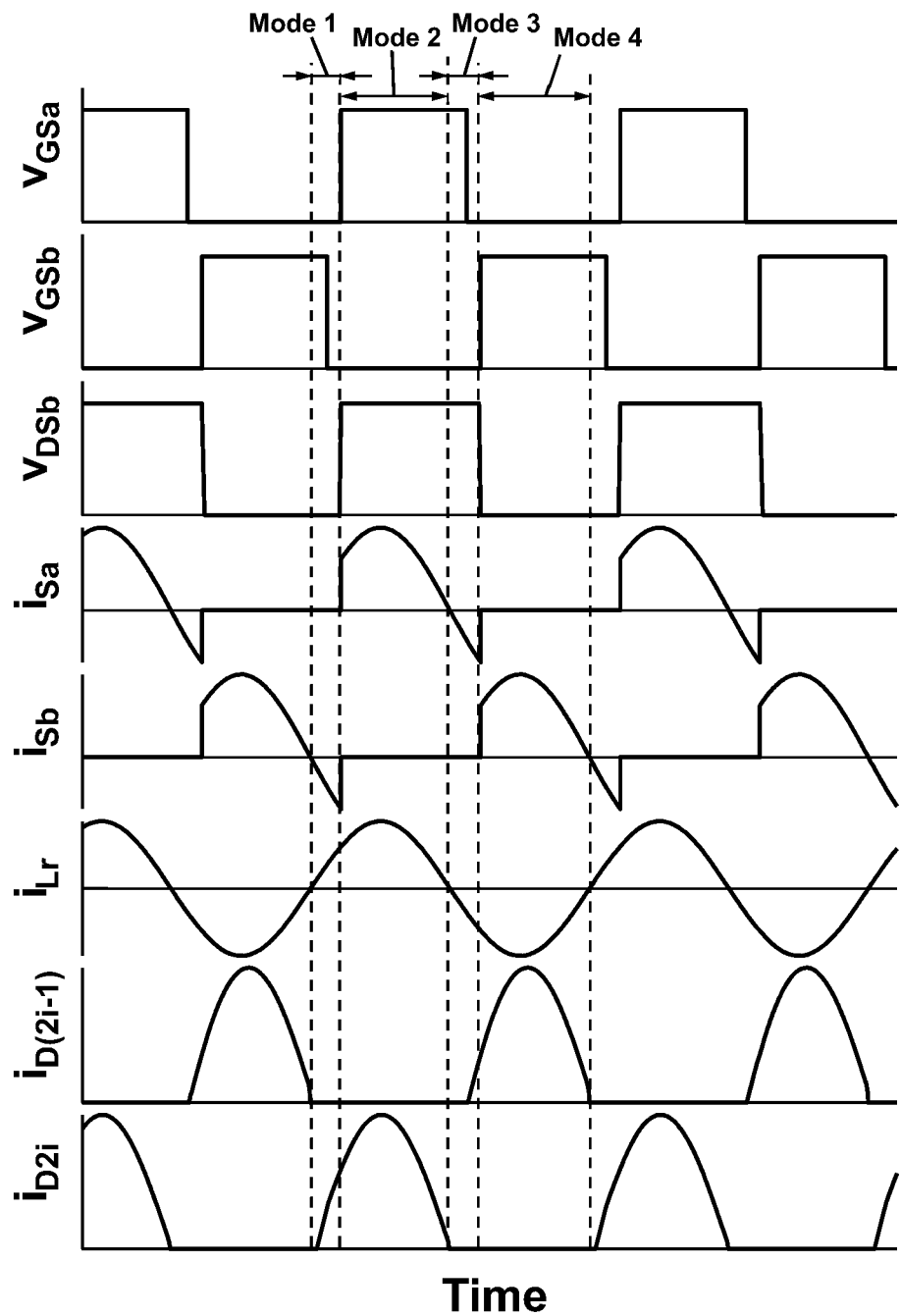
FIG. 16 is a diagram illustrating temporal change of current flowing through each element and temporal change of voltage applied to each switch when the equalization circuit illustrated in FIG. 9 is operated at a frequency lower than the resonance frequency of the resonance circuit (FIG. 16 in Patent Literature 1).
Figure 17:
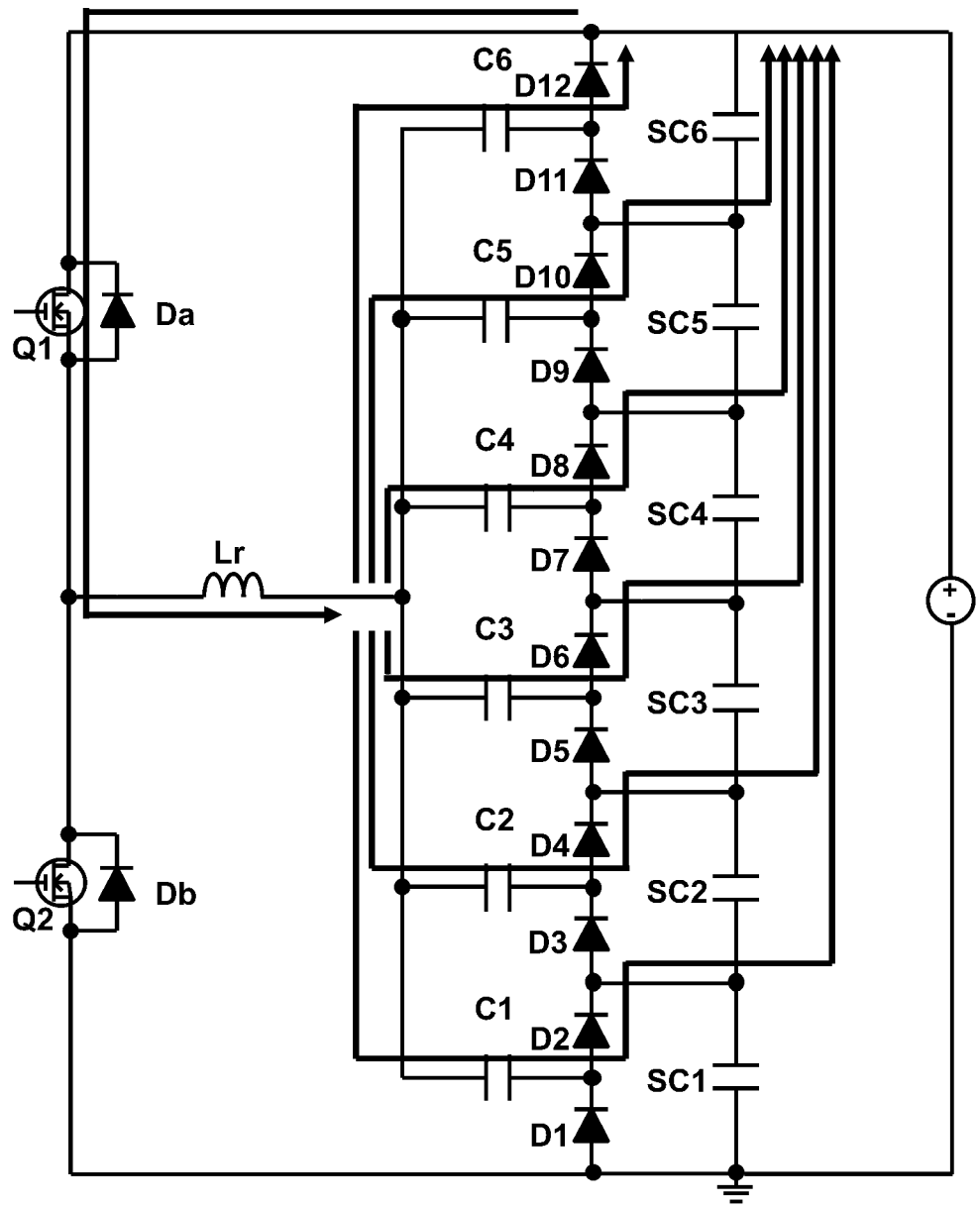
FIG. 17 is a diagram illustrating paths of current flowing during Mode 2 when the equalization circuit illustrated in FIG. 9 is operated at a frequency lower than the resonance frequency of the resonance circuit (FIG. 17 in Patent Literature 1).
Figure 18:
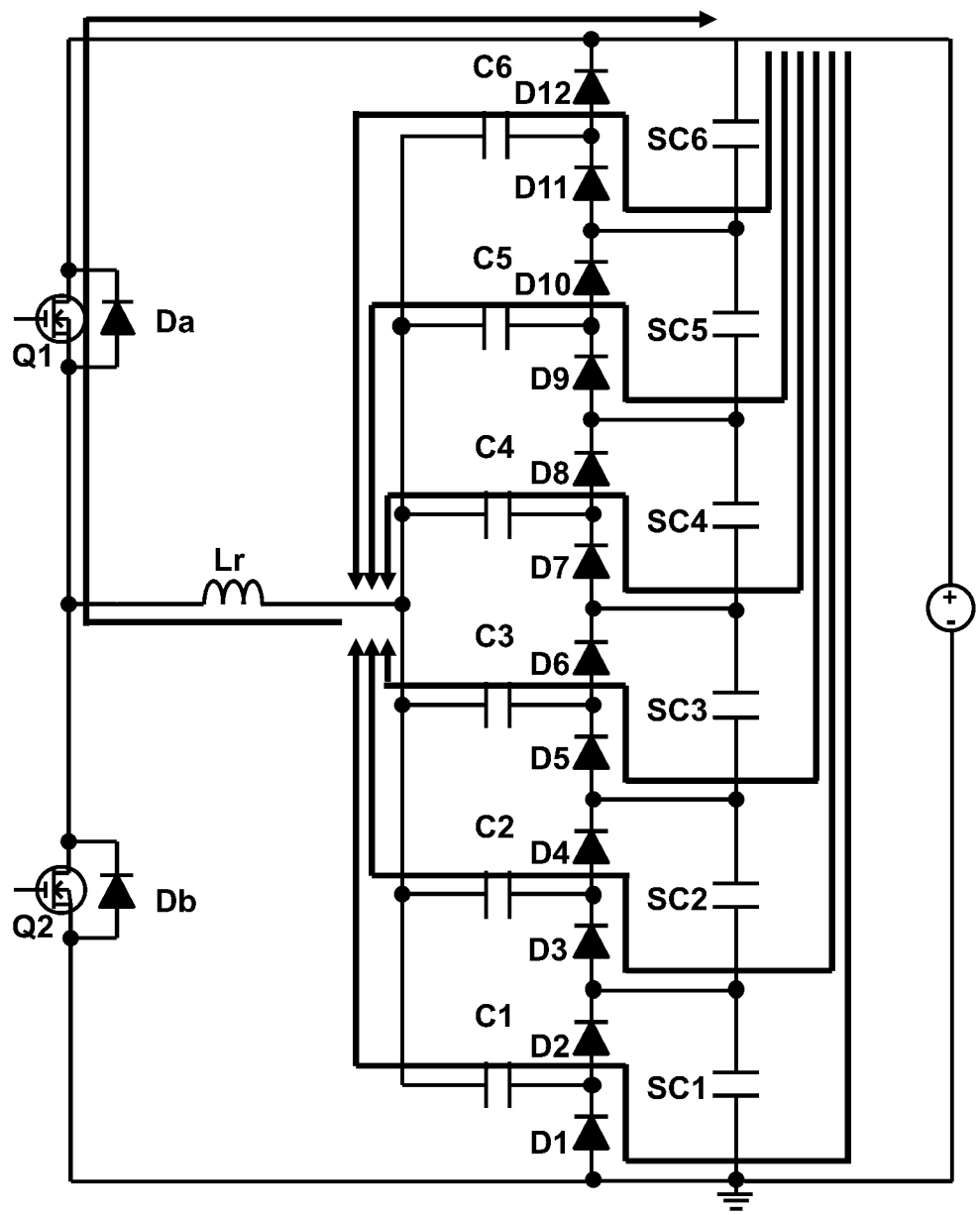
FIG. 18 is a diagram illustrating paths of current flowing during Mode 3 when the equalization circuit illustrated in FIG. 9 is operated at a frequency lower than the resonance frequency of the resonance circuit (FIG. 18 in Patent Literature 1).

Since the resonance frequency is higher than the switching frequency, the current $i_{Lr}$ becomes negative before the switch Q1 is turned off (refer to the graph of $i_{Lr}$ in FIG. 16). Simultaneously, the operation transitions to Mode 3. FIG. 18 illustrates paths of current flowing during Mode 3. The current $i_{Lr}$ is continuous at the transition to Mode 3, but, unlike Mode 2, the current $i_{Lr}$ bifurcates into the diodes D1, D3, D5, D7, D9, and D11. Accordingly, the current $i_{D(2i-1)}$ flowing through an odd-numbered diode qualitatively has a waveform same as that of $i_{Lr}$, and the current $i_{D2i}$ flowing through an even-numbered diode is zero (refer to the graphs of $i_{D(2i-1)}$ and $i_{D2i}$ in FIG. 16).

The switch Q1 is turned off during Mode 3. In this state, current flowing through the switch Q1 flows to the flywheel diode Da instead. When the switch Q2 is turned on, the operation transitions to Mode 4.

Figure 19:
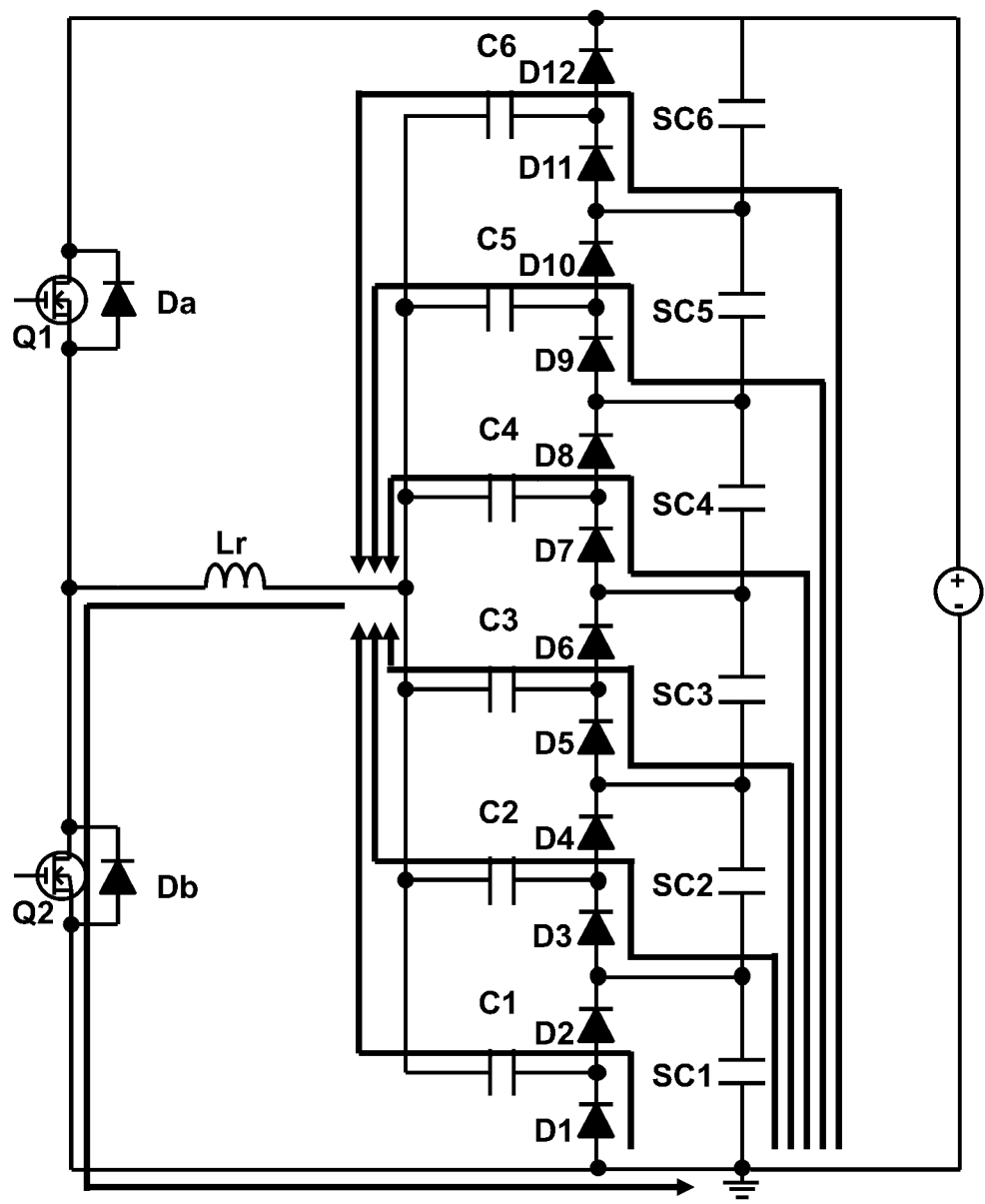
FIG. 19 is a diagram illustrating paths of current flowing during Mode 4 when the equalization circuit illustrated in FIG. 9 is operated at a frequency lower than the resonance frequency of the resonance circuit (FIG. 19 in Patent Literature 1).

During Mode 4, the voltage $V_{Dsb}$ input to the resonance circuit is zero (refer to the graph of $V_{Dsb}$ in FIG. 16), and the current $i_{Lr}$ flowing through the inductor Lr still sinusoidally changes due to a resonance phenomenon (refer to the graph of $i_{Lr}$ in FIG. 16). The current $i_{Lr}$, which is negative, flows on paths illustrated in FIG. 19 through the switch Q2, the electricity storage cells (or electricity storage modules) SC1 to SC5, the diodes D1, D3, D5, D7, D9, and D11, and the capacitors C1 to C6. As understood from FIG. 19, the current $i_{Lr}$ has a magnitude equal to that of the current $i_{Sb}$ flowing through the switch cell $S_b$, and has the opposite polarity (refer to the graph of $i_{Sb}$ in FIG. 16). As illustrated in FIG. 19, no current flows through the switch Q1 being turned off, in other words, the current $i_{Sa}$ flowing through the switch cell $S_a$ is zero (refer to the graph of $i_{Sa}$ in FIG. 16). Similarly, as illustrated in FIG. 19, the current $i_{Lr}$ bifurcates into the diodes D1, D3, D5, D7, D9, and D11. Accordingly, the current $i_{D(2i-1)}$ flowing through an odd-numbered diode qualitatively has a waveform same as that of $i_{Lr}$, and the current $i_{D2i}$ flowing through an even-numbered diode is zero (refer to the graphs of $i_{D2i}$ and $i_{D(2i-1)}$ in FIG. 16).

The input voltage $v_{vm}$ to the multi-stage voltage-doubling rectifier circuit reaches at a minimum value during Mode 4. When $V_{VM-O}$ represents the minimum value of $v_{vm}$, the voltages $V_{C1O}$ to $V_{C6O}$ of the capacitors C1 to C6 when $v_{vm}$ has the minimum value $V_{VM-O}$ can be expressed in the above Expression (3) by applying Kirchhoff's second law, similarly to the case in which the switching frequency is higher than the resonance frequency.

Figure 20:
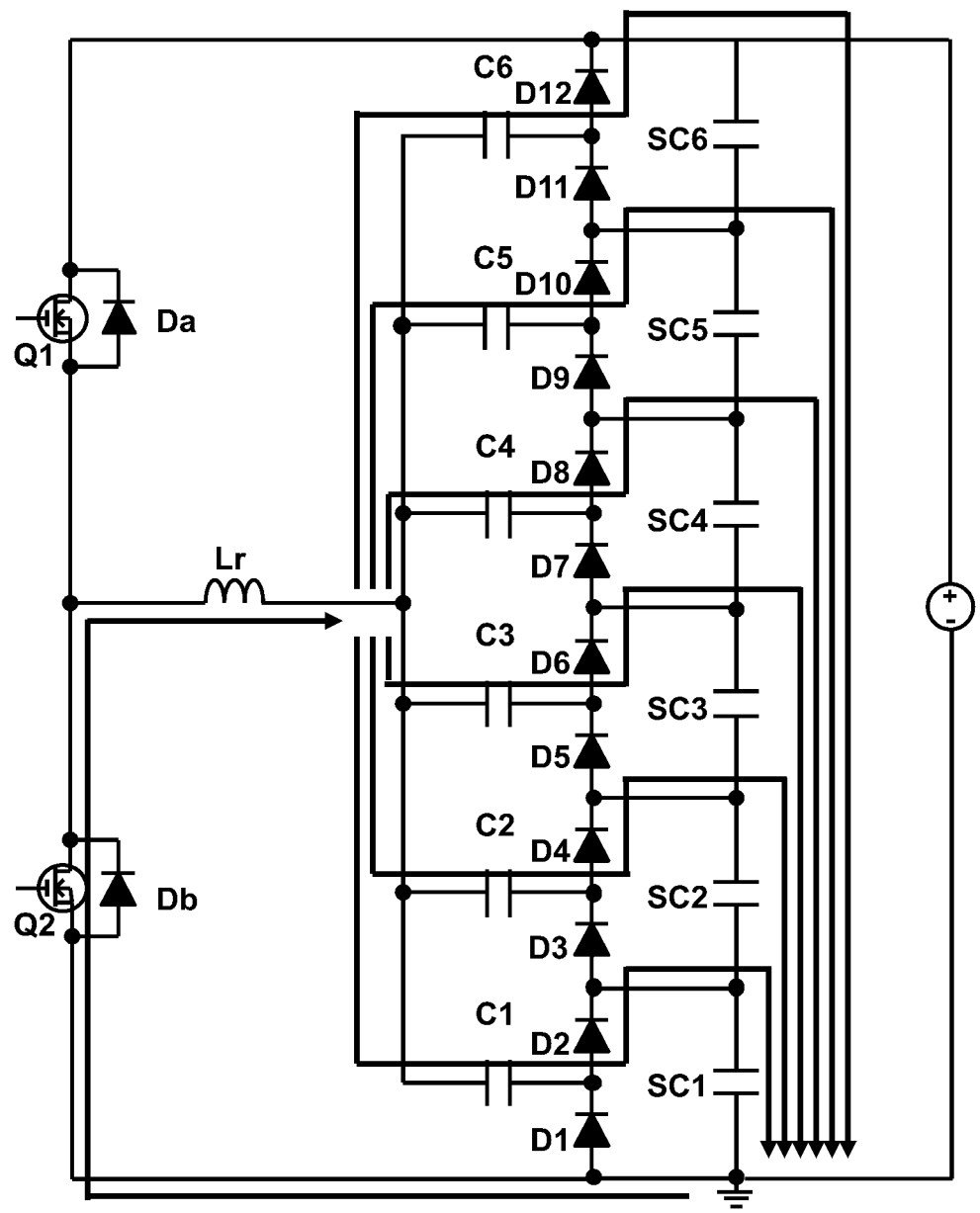
FIG. 20 is a diagram illustrating paths of current flowing during Mode 1 when the equalization circuit illustrated in FIG. 9 is operated at a frequency lower than the resonance frequency of the resonance circuit (FIG. 20 in Patent Literature 1).

Since the resonance frequency is higher than the switching frequency, the current $i_{Lr}$ becomes positive before the switch Q2 is turned off (refer to the graph of $i_{Lr}$ in FIG. 16). Simultaneously, the operation transitions to Mode 1. FIG. 20 illustrates paths of current flowing during Mode 1. The current $i_{Lr}$ is continuous at the transition to Mode 1, but, unlike Mode 4, the current $i_{Lr}$ bifurcates into diodes D2, D4, D6, D8, D10, and D12. Accordingly, the current $i_{D2i}$ flowing through an even-numbered diode qualitatively has a waveform same as that of $i_{Lr}$, and the current $i_{D(2i-1)}$ flowing through an odd-numbered diode is zero (refer to the graphs of $i_{D2i}$ and $i_{D(2i-1)}$ in FIG. 16).

The switch Q2 is turned off during Mode 1. In this state, current flowing through the switch Q2 flows to the flywheel diode Db instead. When the switch Q1 is turned on, the operation transitions to Mode 2.

As described above, when the switching frequency is lower than the resonance frequency, too, Expressions (2) and (3) hold and can be used to express voltage variations occurring at the capacitors C1 to C6 during one switching period in the above Expression (4). Thus, when the switching frequency is lower than the resonance frequency, too, the direct-current equivalent circuit as illustrated in FIG. 15 can be obtained as a circuit for describing the operation of the equalization circuit illustrated in FIG. 9, which is averaged over one switching period. The voltages of the electricity storage cells (or electricity storage modules) SC1 to SC6 are all adjusted toward the voltage of $(V_{VM-E}-V_{VM-O})-2V_D$ and thus changed toward equalization.

Figure 7A:
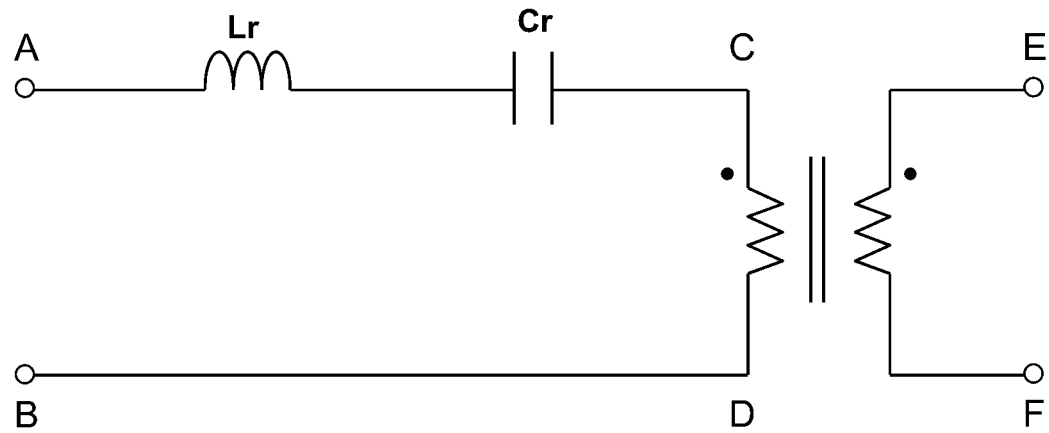
FIG. 7*a* is a circuit diagram of a resonance circuit in which a transformer is used with the series resonance circuit illustrated in FIG. 6*a* (FIG. 6a in Patent Literature 1).
Figure 7B:
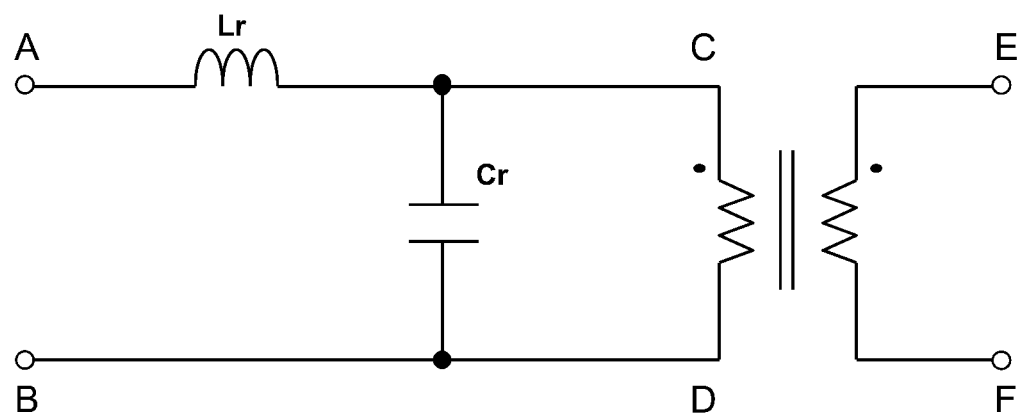
FIG. 7*b* is a circuit diagram of a resonance circuit in which a transformer is used with the parallel resonance circuit illustrated in FIG. 6*b* (FIG. 6b in Patent Literature 1).
Figure 7C:
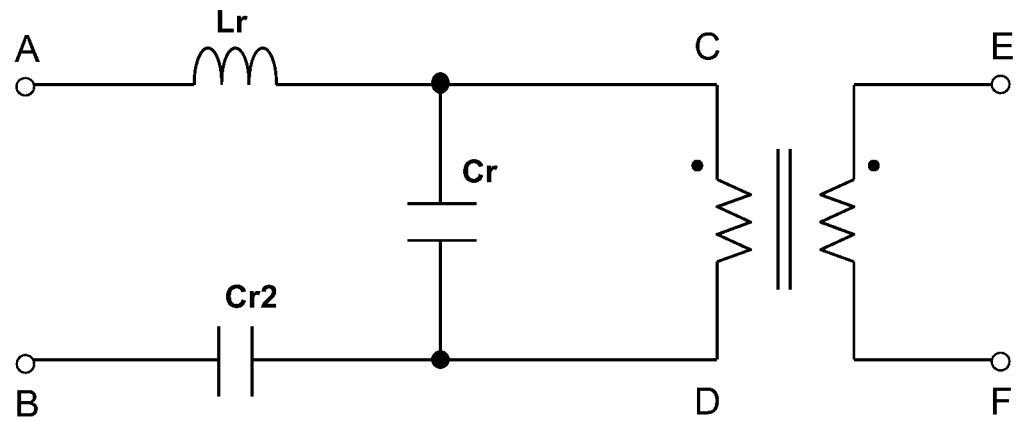
FIG. 7*c* is a circuit diagram of a resonance circuit in which a transformer is used with the series-parallel resonance circuit illustrated in FIG. 6*c* (FIG. 6c in Patent Literature 1).
Figure 7D:
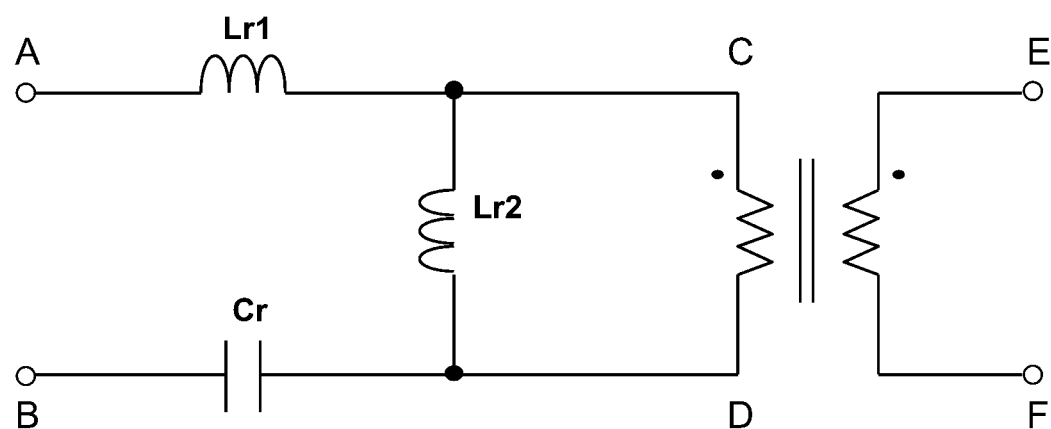
FIG. 7*d* is a circuit diagram of a resonance circuit in which a transformer is used with the LLC circuit illustrated in FIG. 6*d* (FIG. 6d in Patent Literature 1).
Figure 21:
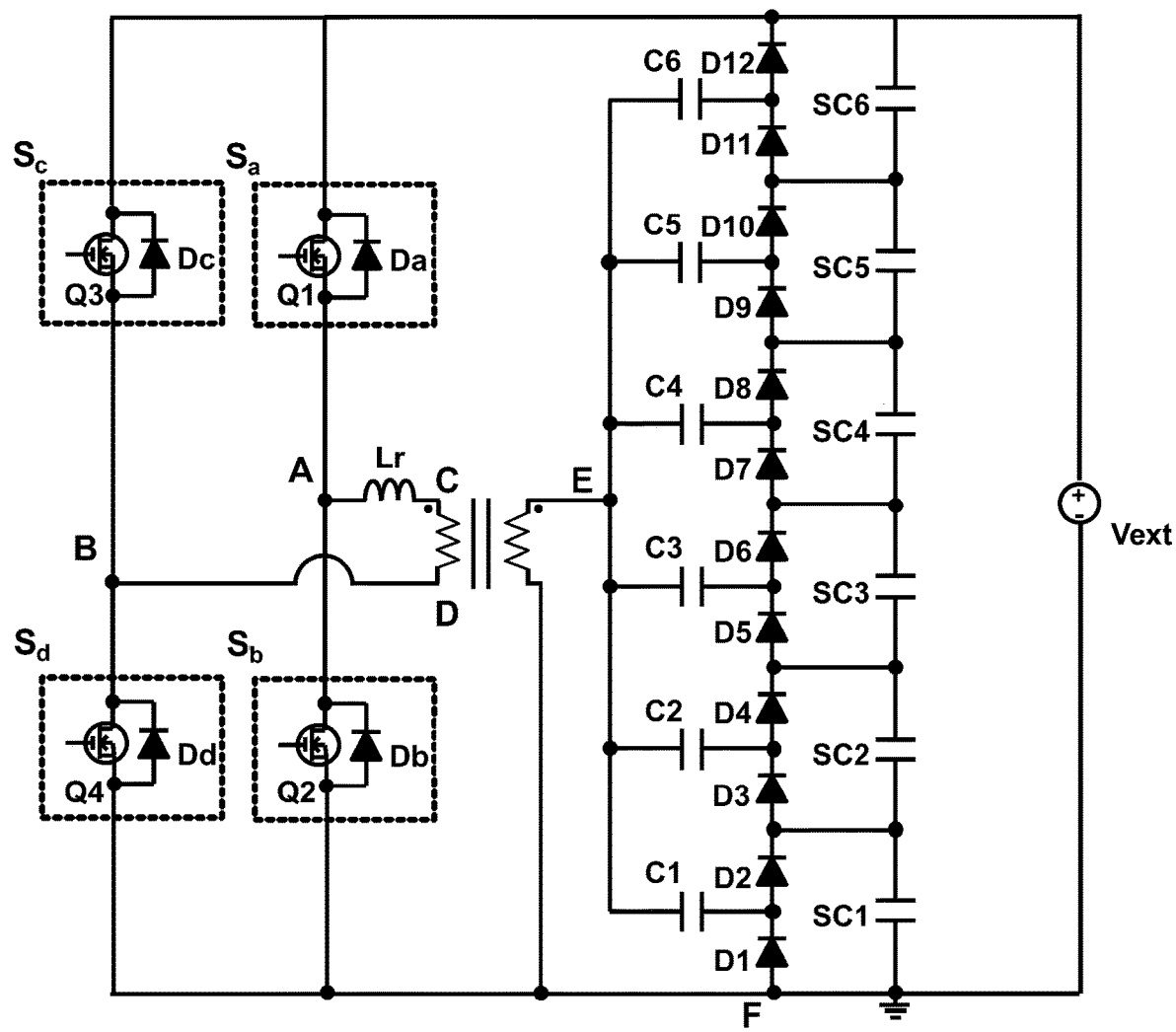
FIG. 21 is a circuit diagram illustrating the configuration of the equalization circuit illustrated in FIG. 9 including the full-bridge cell illustrated in FIG. 5*b* in place of the half-bridge cell illustrated in FIG. 5*a* and further including the resonance circuit illustrated in FIG. 7*a* (FIG. 21 in Patent Literature 1).

As described above, the input circuit in the equalization circuit disclosed in Patent Literature 1 may be an optional circuit configured to output a square wave voltage in response to inputting of a constant voltage. For example, FIG. 21 illustrates the configuration of the equalization circuit when the full-bridge cell illustrated in FIG. 5b is used as the input circuit (the capacitor Cr is integrated with the capacitors C1 to C6). In FIG. 21, the transformer as illustrated in FIG. 7a is used to achieve independency between voltage levels of the full-bridge circuit and the multi-stage voltage-doubling rectifier circuit. Such a configuration achieves connection between a ground of the secondary winding wire side and grounds of SC1 to SC6, and avoids short-circuit of the electricity storage cells SC1 to SC6 when the switch Q3 is turned on. When the equalization circuit is used to temporally switch the connection state between the state in which the switches Q1 and Q4 are on and the state in which the switches Q2 and Q3 are on, a square wave voltage having a peak voltage at $V_{in}$ and a bottom voltage of $-V_{in}$ is output to the resonance circuit. The current $i_{Lr}$ flowing through the inductor Lr is alternating current as in the graph of $i_{Lr}$ in FIG. 10 due to a resonance phenomenon between the inductor Lr and each of the capacitors C1 to C6.

When the above-described connection state is switched at a frequency higher than the resonance frequency, paths of current flowing through inside of the multi-stage voltage-doubling rectifier circuit during Modes 2, 3, 4, and 1 are identical to those illustrated in FIGS. 11, 12, 13, and 14, respectively. The input voltage $v_{vm}$ to the multi-stage voltage-doubling rectifier circuit is the sum of the voltage between Terminals A and B and the induced electromotive force by the inductor Lr, and reaches at a maximum value during Mode 2. Similarly to the equalization circuit illustrated in FIG. 9, the voltages $V_{C1E}$ to $V_{C6E}$ of the capacitors C1 to C6 when $v_{vm}$ has the maximum value $V_{VM-E}$ can be expressed in the above Expression (2) by applying Kirchhoff's second law to: the path through Terminals B and A, the inductor Lr, the capacitor C1, the diode D2, and the electricity storage cell (or electricity storage module) SC1; the path through Terminals B and A, the inductor Lr, the capacitor C2, the diode D4, and the electricity storage cells (or electricity storage modules) SC2 and SC1; the path through Terminals B and A, the inductor Lr, the capacitor C3, the diode D6, and the electricity storage cells (or electricity storage modules) SC3, SC2, and SC1; the path through Terminals B and A, the inductor Lr, the capacitor C4, the diode D8, and the electricity storage cells (or electricity storage modules) SC4, SC3, SC2, and SC1; the path through Terminals B and A, the inductor Lr, the capacitor C5, the diode D10, and the electricity storage cells (or electricity storage modules) SC5, SC4, SC3, SC2, and SC1; and the path through Terminals B and A, the inductor Lr, the capacitor C6, the diode D12, and the electricity storage cells (or electricity storage modules) SC6, SC5, SC4, SC3, SC2, and SC1. Similarly to the equalization circuit illustrated in FIG. 9, the input voltage $v_{vm}$ to the multi-stage voltage-doubling rectifier circuit reaches at a minimum value during Mode 4. When $V_{VM-O}$ represents the minimum value of $v_{vm}$, the voltages $V_{C1O}$ to $V_{C6O}$ of the capacitors C1 to C6 when $v_{vm}$ has the minimum value $V_{VM-O}$ can be expressed in the above Expression (3) by applying Kirchhoff's second law to: the path through Terminals B and A, the inductor Lr, the capacitor C1, and the diode D1; the path through Terminals B and A, the inductor Lr, the capacitor C2, the diode D3, and the electricity storage cell (or electricity storage module) SC1; the path through Terminals B and A, the inductor Lr, the capacitor C3, the diode D5, and the electricity storage cells (or electricity storage modules) SC2 and SC1; the path through Terminals B and A, the inductor Lr, the capacitor C4, the diode D7, and the electricity storage cells (or electricity storage modules) SC3, SC2, and SC1; the path through Terminals B and A, the inductor Lr, the capacitor C5, the diode D9, and the electricity storage cells (or electricity storage modules) SC4, SC3, SC2, and SC1; and the path through Terminals B and A, the inductor Lr, the capacitor C6, the diode D11, and the electricity storage cells (or electricity storage modules) SC5, SC4, SC3, SC2, and SC1. Accordingly, operation of the equalization circuit illustrated in FIG. 21 can be described with the series equivalent circuit illustrated in FIG. 15, and thus the voltages of the electricity storage cells (or electricity storage modules) SC1 to SC6 are changed toward equalization.

When the above-described connection state is switched at a frequency lower than the resonance frequency, paths of current flowing through inside of the multi-stage voltage-doubling rectifier circuit during Modes 2, 3, 4, and 1 are identical to those illustrated in FIGS. 17, 18, 19, and 20, respectively. The input voltage $v_{vm}$ to the multi-stage voltage-doubling rectifier circuit is the sum of the voltage between Terminals A and B and the induced electromotive force by the inductor Lr, and reaches at a maximum value during Mode 2. Similarly to the equalization circuit illustrated in FIG. 9, the voltages $V_{C1E}$ to $V_{C6E}$ of the capacitors C1 to C6 when $v_{vm}$ has the maximum value $V_{VM-E}$ can be expressed in the above Expression (2) by applying Kirchhoff's second law to: the path through Terminals B and A, the inductor Lr, the capacitor C1, the diode D2, and the electricity storage cell (or electricity storage module) SC1; the path through Terminals B and A, the inductor Lr, the capacitor C2, the diode D4, and the electricity storage cells (or electricity storage modules) SC2 and SC1; the path through Terminals B and A, the inductor Lr, the capacitor C3, the diode D6, and the electricity storage cells (or electricity storage modules) SC3, SC2, and SC1; the path through Terminals B and A, the inductor Lr, the capacitor C4, the diode D8, and the electricity storage cells (or electricity storage modules) SC4, SC3, SC2, and SC1; the path through Terminals B and A, the inductor Lr, the capacitor C5, the diode D10, and the electricity storage cells (or electricity storage modules) SC5, SC4, SC3, SC2, and SC1; and the path through Terminals B and A, the inductor Lr, the capacitor C6, the diode D12, and the electricity storage cells (or electricity storage modules) SC6, SC5, SC4, SC3, SC2, and SC1. Similarly to the equalization circuit illustrated in FIG. 9, the input voltage $v_{vm}$ to the multi-stage voltage-doubling rectifier circuit reaches at a minimum value during Mode 4. When $V_{VM-O}$ represents the minimum value of $v_{vm}$, the voltages $V_{C1O}$ to $V_{C6O}$ of the capacitors C1 to C6 when $v_{vm}$ has the minimum value $V_{VM-O}$ can be expressed in the above Expression (3) by applying Kirchhoff's second law to: the path through Terminals B and A, the inductor Lr, the capacitor C1, and the diode D1; the path through Terminals B and A, the inductor Lr, the capacitor C2, the diode D3, and the electricity storage cell SC1; the path through Terminals B and A, the inductor Lr, the capacitor C3, the diode D5, and the electricity storage cells SC2 and SC1; the path through Terminals B and A, the inductor Lr, the capacitor C4, the diode D7, and the electricity storage cells (or electricity storage modules) SC3, SC2, and SC1; the path through Terminals B and A, the inductor Lr, the capacitor C5, the diode D9, and the electricity storage cells (or electricity storage modules) SC4, SC3, SC2, and SC1; and the path through Terminals B and A, the inductor Lr, the capacitor C6, the diode D11, and the electricity storage cells (or electricity storage modules) SC5, SC4, SC3, SC2, and SC1. Accordingly, the operation of the equalization circuit illustrated in FIG. 21 can be described with the series equivalent circuit illustrated in FIG. 15, and thus the voltages of the electricity storage cells (or electricity storage modules) SC1 to SC6 are changed toward equalization. The same argument applies to a case in which any other circuit is used as the input circuit.

Figure 6B:
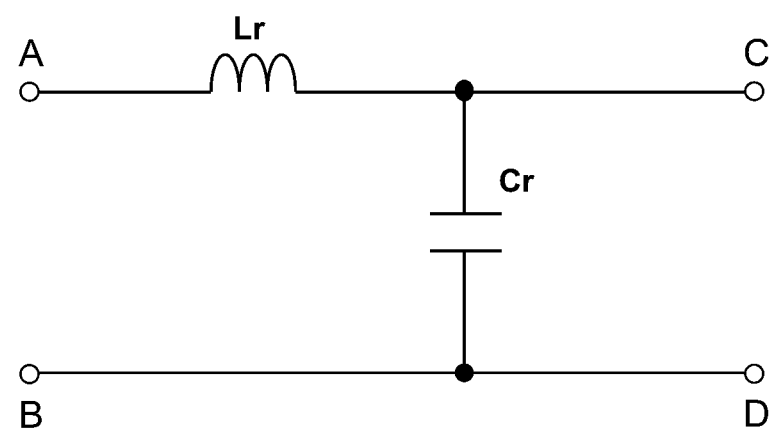
FIG. 6*b* is a circuit diagram of a parallel resonance circuit that can be used as a resonance circuit in the equalization circuit according to Patent Literature 1 (FIG. 5b in Patent Literature 1).
Figure 6C:
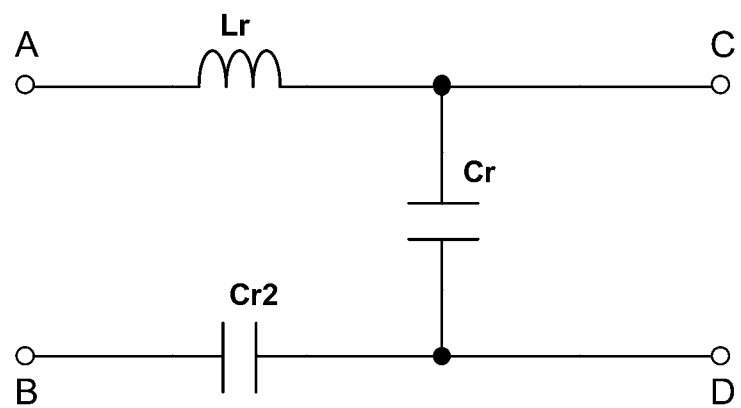
FIG. 6*c* is a circuit diagram of a series-parallel resonance circuit that can be used as a resonance circuit in the equalization circuit according to Patent Literature 1 (FIG. 5c in Patent Literature 1).
Figure 6D:
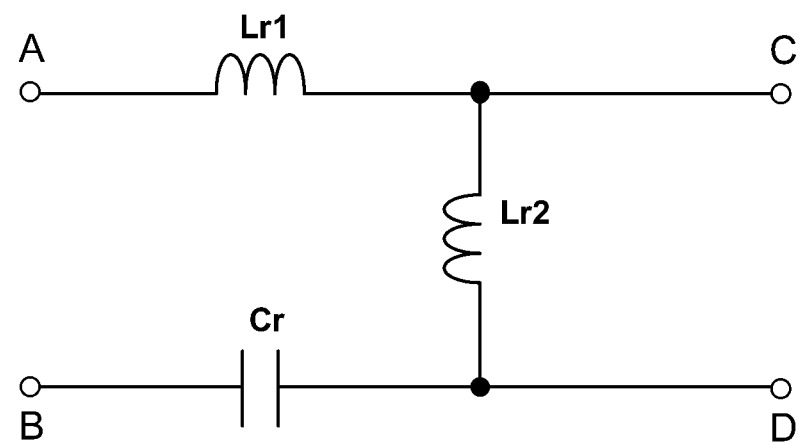
FIG. 6*d* is a circuit diagram of an LLC circuit that can be used as a resonance circuit in the equalization circuit according to Patent Literature 1 (FIG. 5d in Patent Literature 1).
Figure 22:
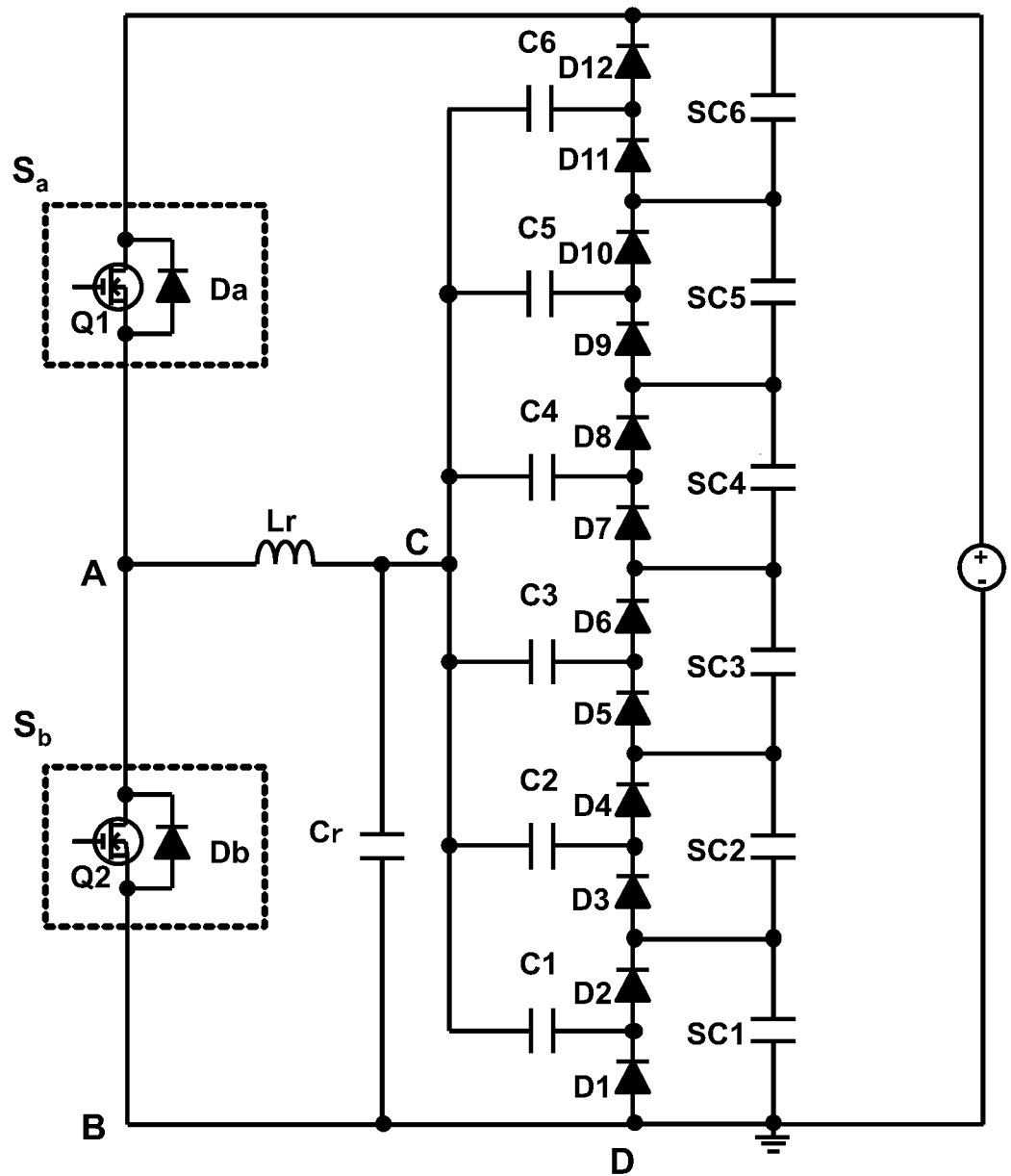
FIG. 22 is a circuit diagram illustrating the configuration of the equalization circuit illustrated in FIG. 9 including the parallel resonance circuit illustrated in FIG. 6*b* in place of the series resonance circuit illustrated in FIG. 6*a* (FIG. 22 in Patent Literature 1).

As described above, the resonance circuit in the equalization circuit disclosed in Patent Literature 1 is not limited to that illustrated in FIG. 6a, but may be an optional circuit including at least one inductive element. For example, FIG. 22 illustrates the configuration of the equalization circuit when the parallel resonance circuit illustrated in FIG. 6b is used as the resonance circuit. When the equalization circuit is used to temporally switch the connection state between a state in which the switch Q1 is on and a state in which the switch Q2 is on, a square wave voltage having a peak voltage at $V_{in}$ and a bottom voltage at zero is output to the resonance circuit. The current $i_{Lr}$ flowing through the inductor Lr is alternating current as in the graph of $i_{Lr}$ in FIG. 10 due to a resonance phenomenon among the inductor Lr, the resonance circuit internal capacitor Cr, and each of the capacitors C1 to C6.

When the above-described connection state is switched at a frequency higher than the resonance frequency, paths of current flowing through inside of the circuit during Modes 2, 3, 4, and 1 are identical to those illustrated in FIGS. 11, 12, 13, and 14, respectively (however, in each mode, current flows through the capacitor Cr, and the direction of this current changes during the same mode as needed, depending on the capacitance of the capacitor Cr). The input voltage $v_{vm}$ to the multi-stage voltage-doubling rectifier circuit is the sum of the voltage between Terminals A and B and the induced electromotive force by the inductor Lr, and reaches at a maximum value during Mode 2. Similarly to the equalization circuit illustrated in FIG. 9, the voltages $V_{C1E}$ to $V_{C6E}$ of the capacitors C1 to C6 when $v_{vm}$ has the maximum value $V_{VM-E}$ can be expressed in the above Expression (2) by applying Kirchhoff's second law to: the path through Terminals B and A, the inductor Lr, the capacitor C1, the diode D2, and the electricity storage cell (or electricity storage module) SC1; the path through Terminals B and A, the inductor Lr, the capacitor C2, the diode D4, and the electricity storage cells SC2 and SC1; the path through Terminals B and A, the inductor Lr, the capacitor C3, the diode D6, and the electricity storage cells (or electricity storage modules) SC3, SC2, and SC1; the path through Terminals B and A, the inductor Lr, the capacitor C4, the diode D8, and the electricity storage cells (or electricity storage modules) SC4, SC3, SC2, and SC1; the path through Terminals B and A, the inductor Lr, the capacitor C5, the diode D10, and the electricity storage cells (or electricity storage modules) SC5, SC4, SC3, SC2, and SC1; and the path through Terminals B and A, the inductor Lr, the capacitor C6, the diode D12, and the electricity storage cells (or electricity storage modules) SC6, SC5, SC4, SC3, SC2, and SC1. Similarly to the equalization circuit illustrated in FIG. 9, the input voltage $v_{vm}$ to the multi-stage voltage-doubling rectifier circuit reaches at a minimum value during Mode 4. When $V_{VM-O}$ represents the minimum value of $v_{vm}$, the voltages $V_{C1O}$ to $V_{C6O}$ of the capacitors C1 to C6 when $v_{vm}$ has the minimum value $V_{VM-O}$ can be expressed in the above Expression (3) by applying Kirchhoff's second law to the path through Terminals B and A, the inductor Lr, the capacitor C1, and the diode D1; the path through Terminals B and A, the inductor Lr, the capacitor C2, the diode D3, and the electricity storage cell (or electricity storage module) SC1; the path through Terminals B and A, the inductor Lr, the capacitor C3, the diode D5, and the electricity storage cells (or electricity storage modules) SC2 and SC1; the path through Terminals B and A, the inductor Lr, the capacitor C4, the diode D7, and the electricity storage cells (or electricity storage modules) SC3, SC2, and SC1; the path through Terminals B and A, the inductor Lr, the capacitor C5, the diode D9, and the electricity storage cells (or electricity storage modules) SC4, SC3, SC2, and SC1; and the path through Terminals B and A, the inductor Lr, the capacitor C6, the diode D11, and the electricity storage cells (or electricity storage modules) SC5, SC4, SC3, SC2, and SC1. Accordingly, operation of the equalization circuit illustrated in FIG. 22 can be described with the series equivalent circuit illustrated in FIG. 15, and thus the voltages of the electricity storage cells (or electricity storage modules) SC1 to SC6 are changed toward equalization.

When the above-described connection state is switched at a frequency lower than the resonance frequency, paths of current flowing through inside of the circuit during Modes 2, 3, 4, and 1 are identical to those illustrated in FIGS. 17, 18, 19, and 20, respectively (however, in each mode, current flows through the capacitor Cr, and the direction of this current changes during the same mode as needed, depending on the capacitance of the capacitor Cr). The input voltage $v_{vm}$ to the multi-stage voltage-doubling rectifier circuit is the sum of the voltage between Terminals A and B and the induced electromotive force by the inductor Lr, and reaches at a maximum value during Mode 2. Similarly to the equalization circuit illustrated in FIG. 9, the voltages $V_{C1E}$ to $V_{C6E}$ of the capacitors C1 to C6 when $v_{vm}$ has the maximum value $V_{VM-E}$ can be expressed in the above Expression (2) by applying Kirchhoff's second law to the path through Terminals B and A, the inductor Lr, the capacitor C1, the diode D2, and the electricity storage cell (or electricity storage module) SC1; the path through Terminals B and A, the inductor Lr, the capacitor C2, the diode D4, and the electricity storage cells (or electricity storage modules) SC2 and SC1; the path through Terminals B and A, the inductor Lr, the capacitor C3, the diode D6, and the electricity storage cells (or electricity storage modules) SC3, SC2, and SC1; the path through Terminals B and A, the inductor Lr, the capacitor C4, the diode D8, and the electricity storage cells (or electricity storage modules) SC4, SC3, SC2, and SC1; the path through Terminals B and A, the inductor Lr, the capacitor C5, the diode D10, and the electricity storage cells (or electricity storage modules) SC5, SC4, SC3, SC2, and SC1; and the path through Terminals B and A, the inductor Lr, the capacitor C6, the diode D12, and the electricity storage cells (or electricity storage modules) SC6, SC5, SC4, SC3, SC2, and SC1. Similarly to the equalization circuit illustrated in FIG. 9, the input voltage $v_{vm}$ to the multi-stage voltage-doubling rectifier circuit reaches at a minimum value during Mode 4. When $V_{VM-O}$ represents the minimum value of $v_{vm}$, the voltages $V_{C1O}$ to $V_{C6O}$ of the capacitors C1 to C6 when $v_{vm}$ has the minimum value $V_{VM-O}$ can be expressed in the above Expression (3) by applying Kirchhoff's second law to the path through Terminals B and A, the inductor Lr, the capacitor C1, and the diode D1; the path through Terminals B and A, the inductor Lr, the capacitor C2, the diode D3, and the electricity storage cell (or electricity storage module) SC1; the path through Terminals B and A, the inductor Lr, the capacitor C3, the diode D5, and the electricity storage cells (or electricity storage modules) SC2 and SC1; the path through Terminals B and A, the inductor Lr, the capacitor C4, the diode D7, and the electricity storage cells (or electricity storage modules) SC3, SC2, and SC1; the path through Terminals B and A, the inductor Lr, the capacitor C5, the diode D9, and the electricity storage cells (or electricity storage modules) SC4, SC3, SC2, and SC1; and the path through Terminals B and A, the inductor Lr, the capacitor C6, the diode D11, and the electricity storage cells (or electricity storage modules) SC5, SC4, SC3, SC2, and SC1. Accordingly, the operation of the equalization circuit illustrated in FIG. 22 can be described with the series equivalent circuit illustrated in FIG. 15, and thus the voltages of the electricity storage cells SC1 to SC6 are changed toward equalization. The same argument applies to a case in which any other circuit is used as the resonance circuit.

Figure 23:
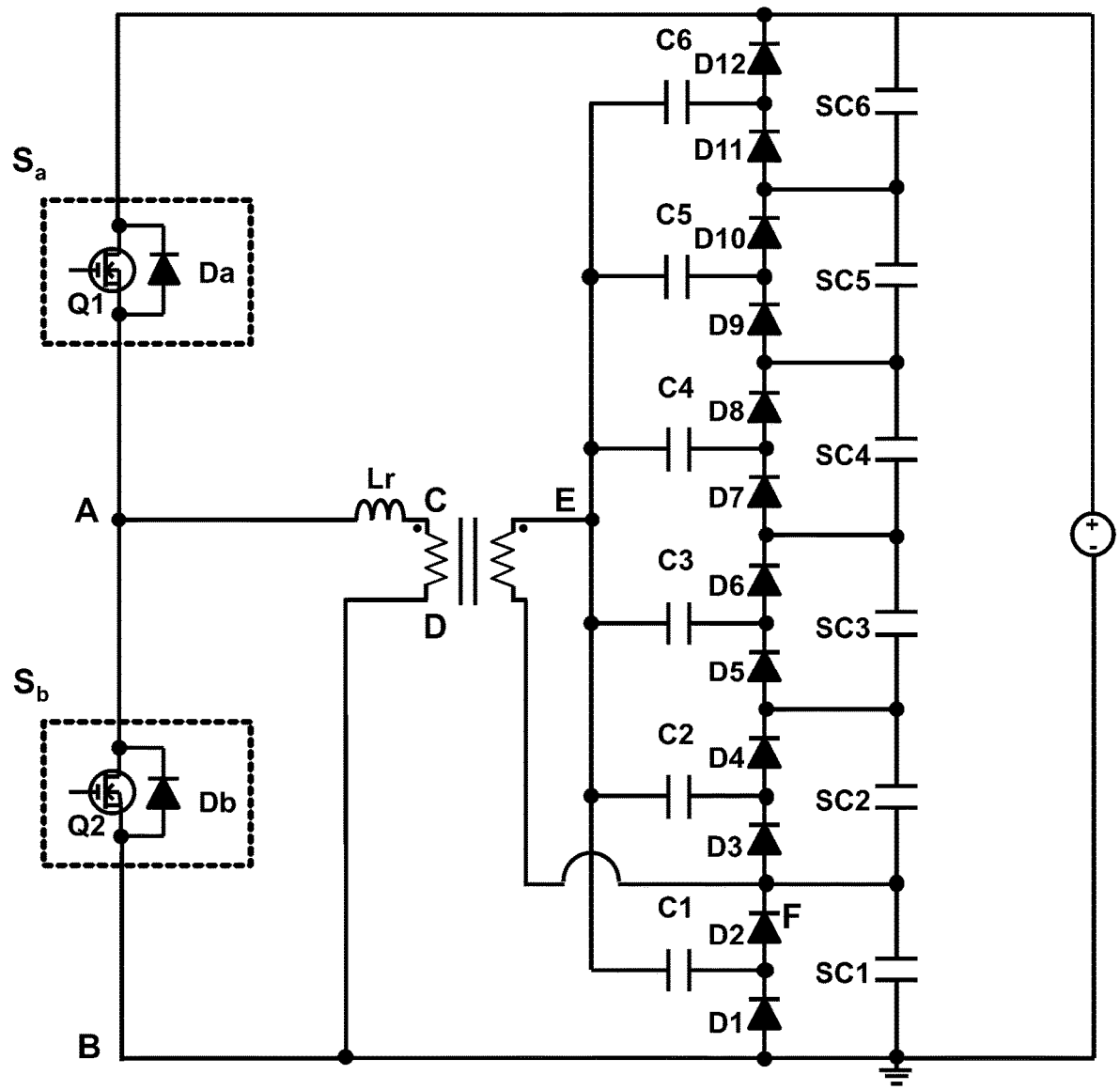
FIG. 23 is a circuit diagram illustrating the configuration of the equalization circuit illustrated in FIG. 9 in which the resonance circuit is connected with the multi-stage voltage-doubling rectifier circuit at different points (FIG. 23 in Patent Literature 1).
Figure 24:
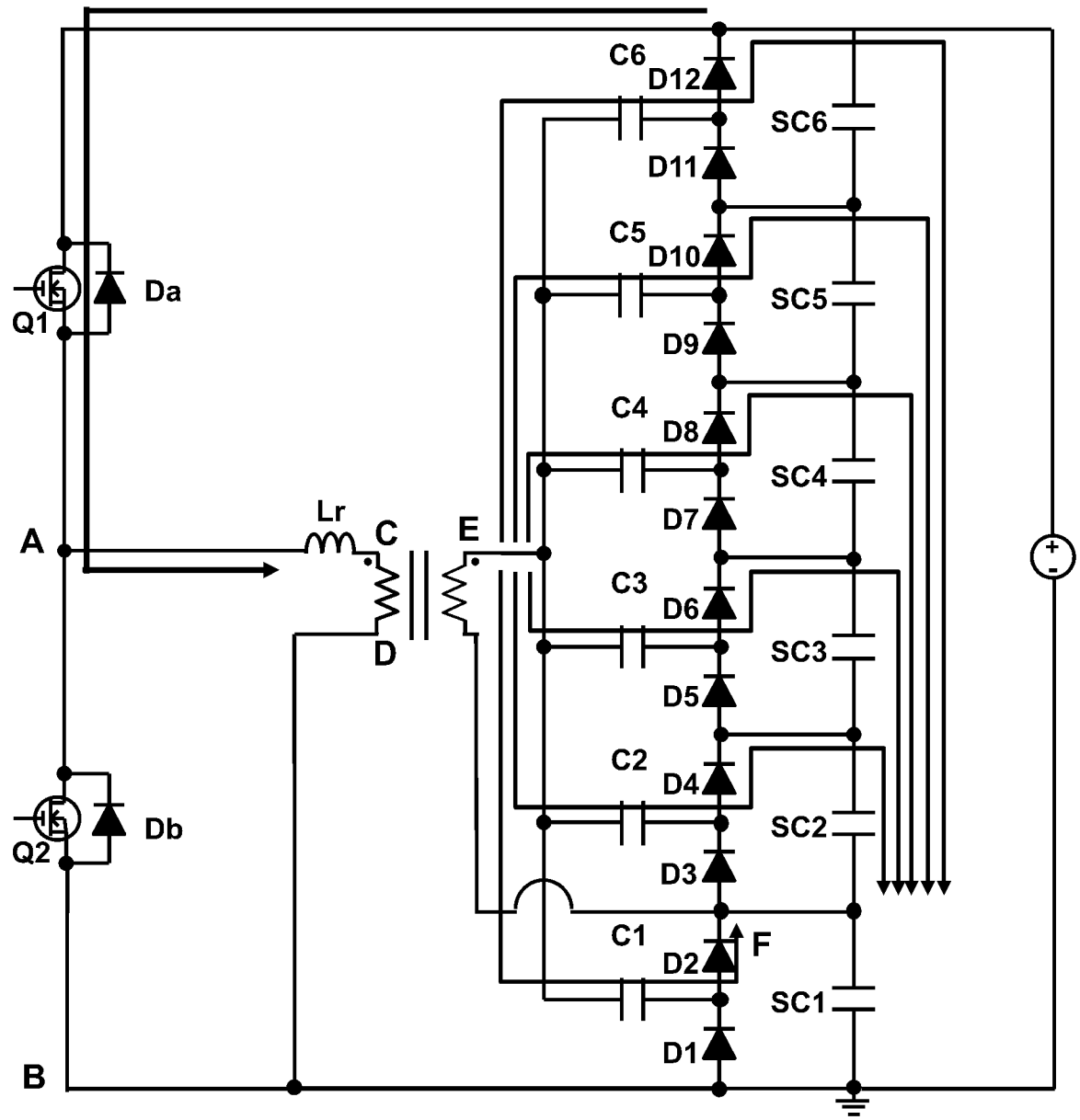
FIG. 24 is a diagram illustrating paths of current flowing during Mode 2 when the equalization circuit illustrated in FIG. 23 is operated at a frequency higher than the resonance frequency of the resonance circuit (FIG. 24 in Patent Literature 1).
Figure 25:
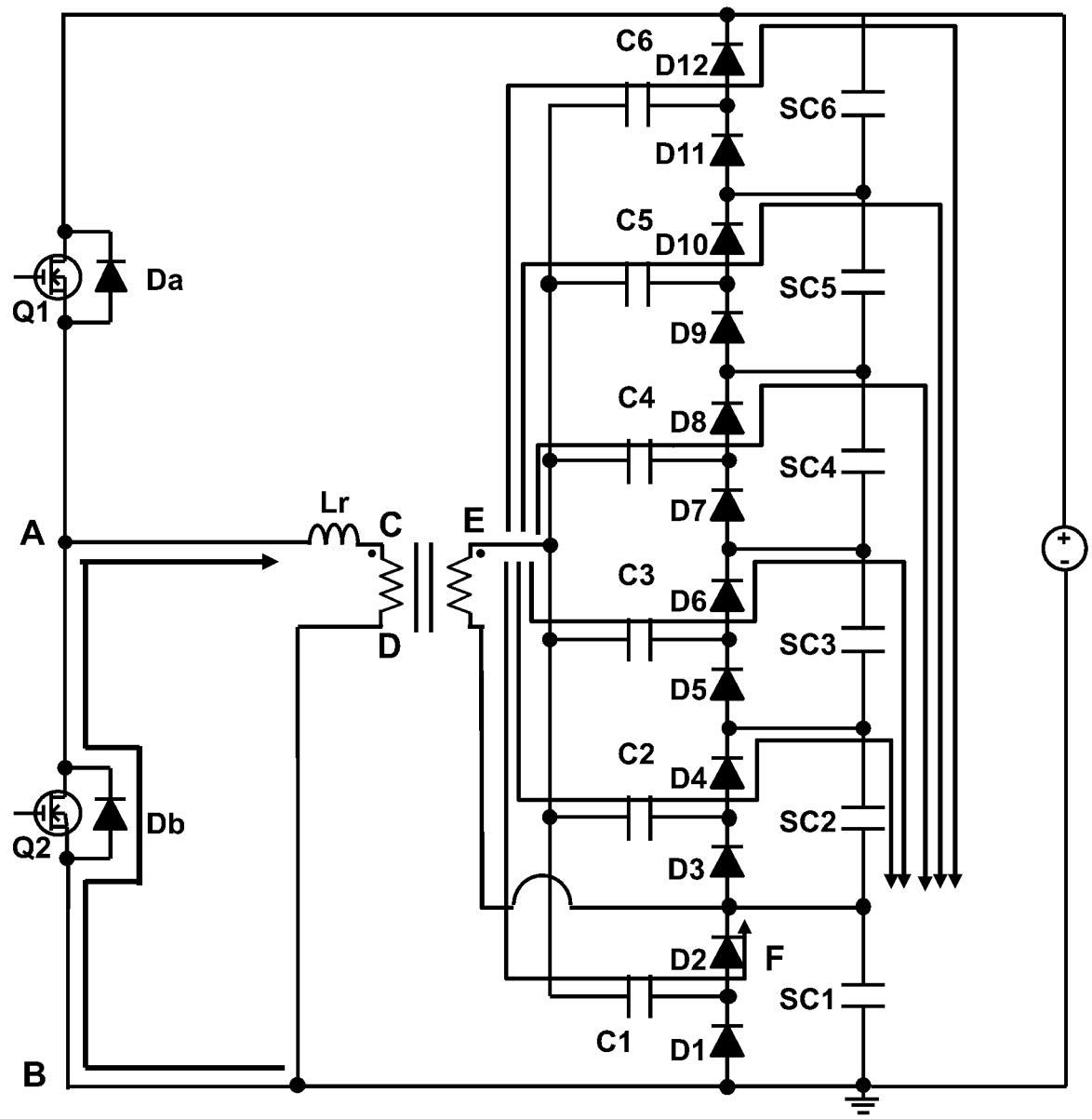
FIG. 25 is a diagram illustrating paths of current flowing during Mode 3 when the equalization circuit illustrated in FIG. 23 is operated at a frequency higher than the resonance frequency of the resonance circuit (FIG. 25 in Patent Literature 1).
Figure 26:
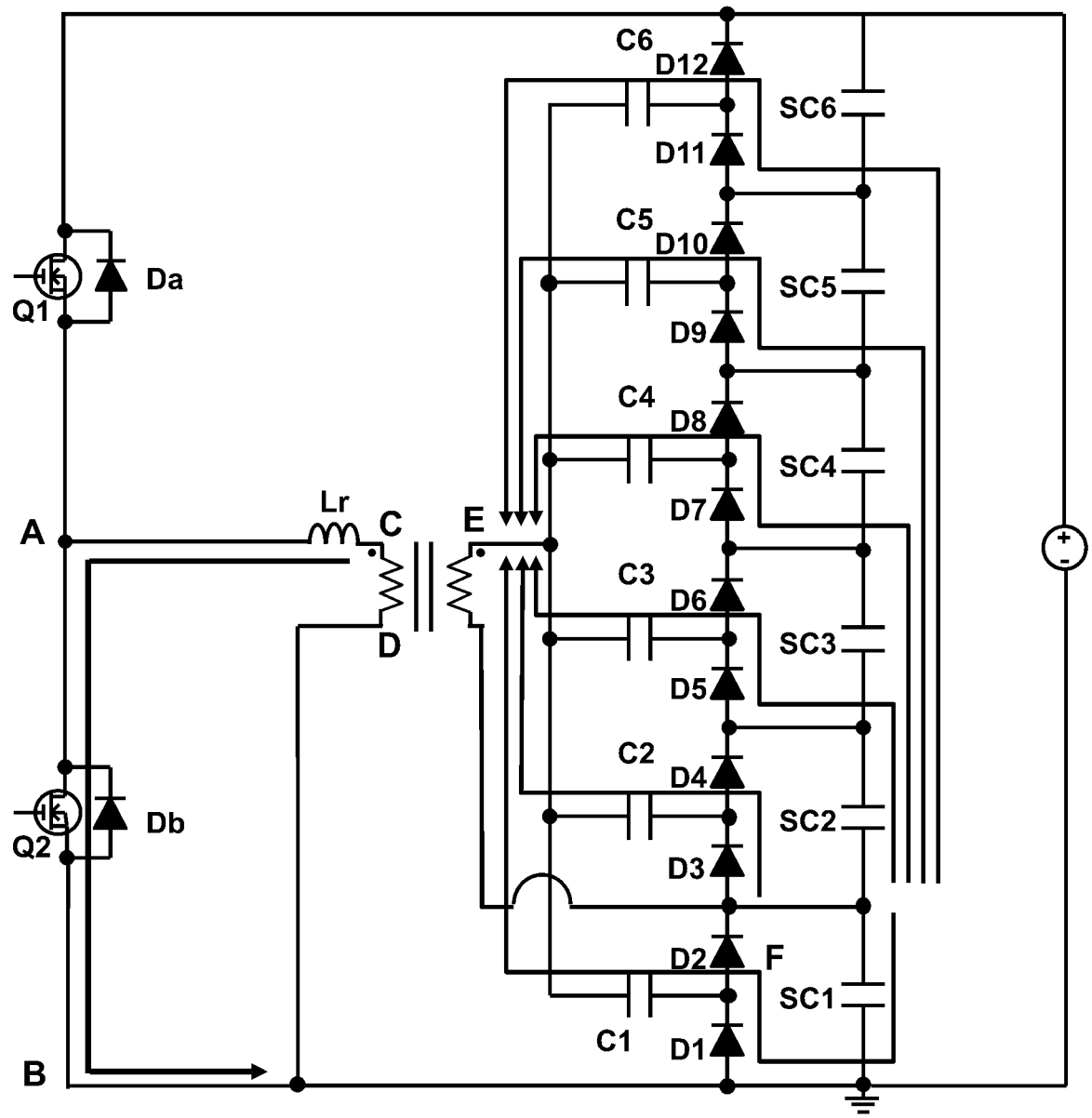
FIG. 26 is a diagram illustrating paths of current flowing during Mode 4 when the equalization circuit illustrated in FIG. 23 is operated at a frequency higher than the resonance frequency of the resonance circuit (FIG. 26 in Patent Literature 1).
Figure 27:
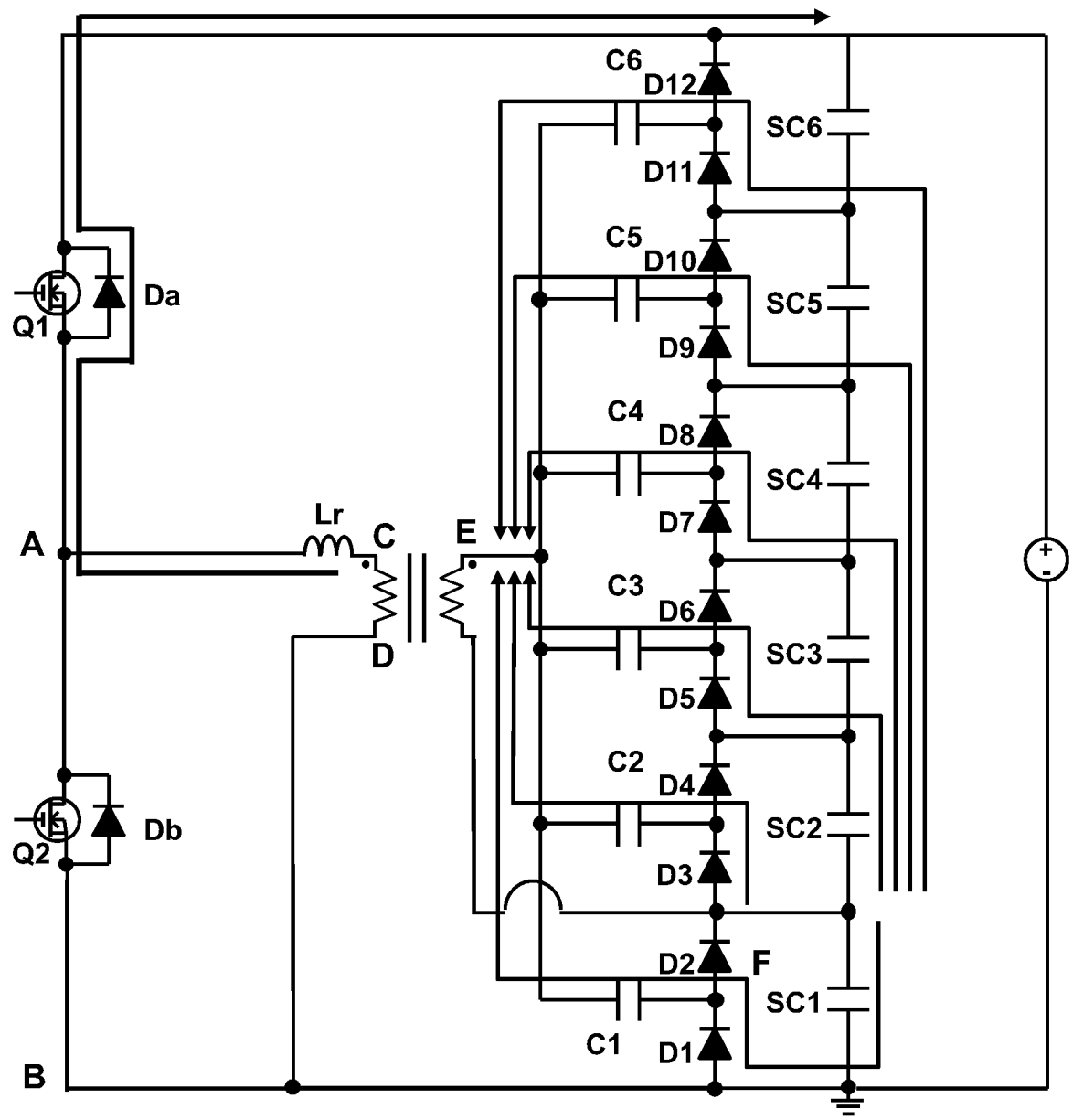
FIG. 27 is a diagram illustrating paths of current flowing during Mode 1 when the equalization circuit illustrated in FIG. 23 is operated at a frequency higher than the resonance frequency of the resonance circuit (FIG. 27 in Patent Literature 1).
Figure 28:
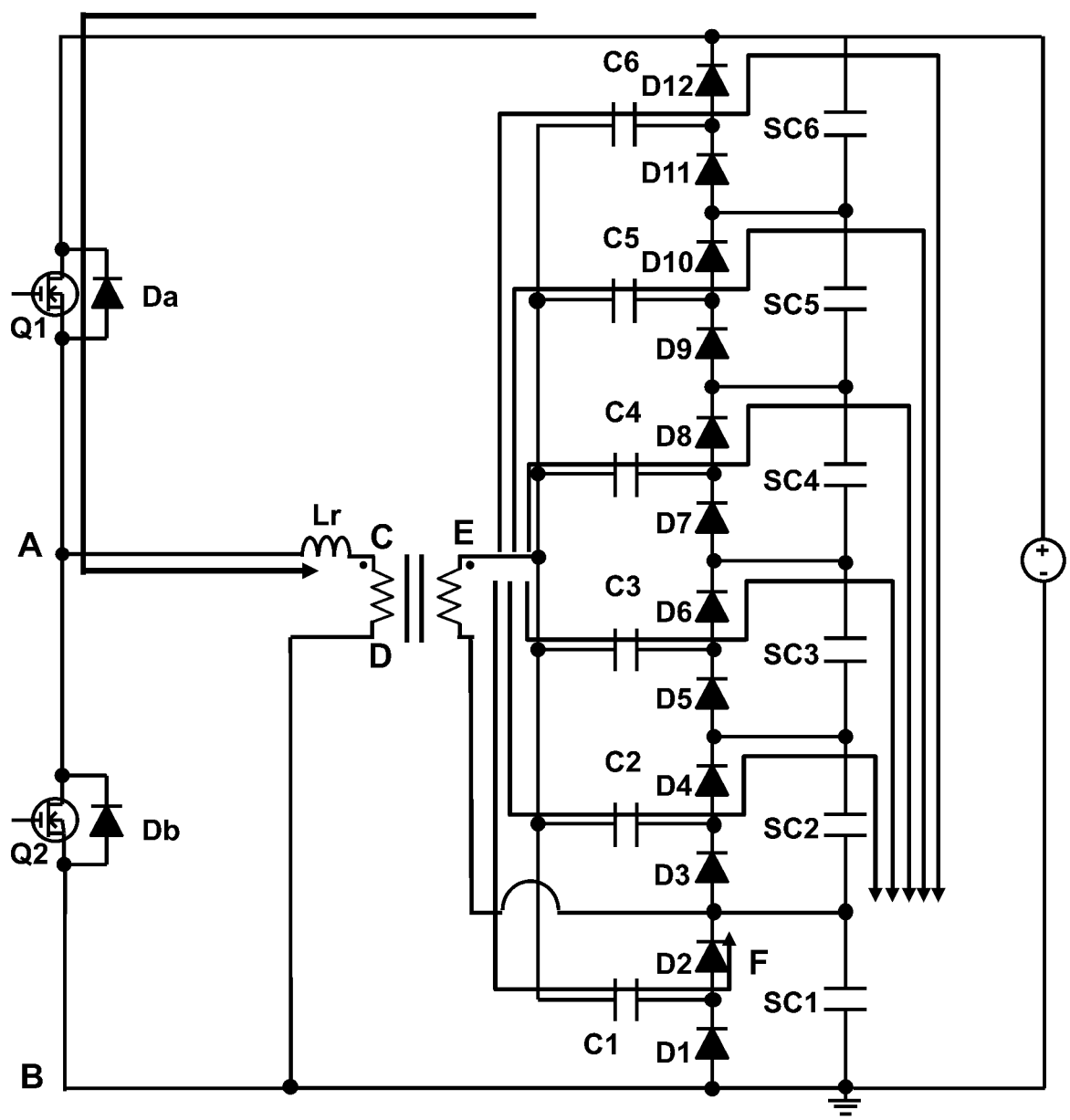
FIG. 28 is a diagram illustrating paths of current flowing during Mode 2 when the equalization circuit illustrated in FIG. 23 is operated at a frequency lower than the resonance frequency of the resonance circuit (FIG. 28 in Patent Literature 1).
Figure 29:
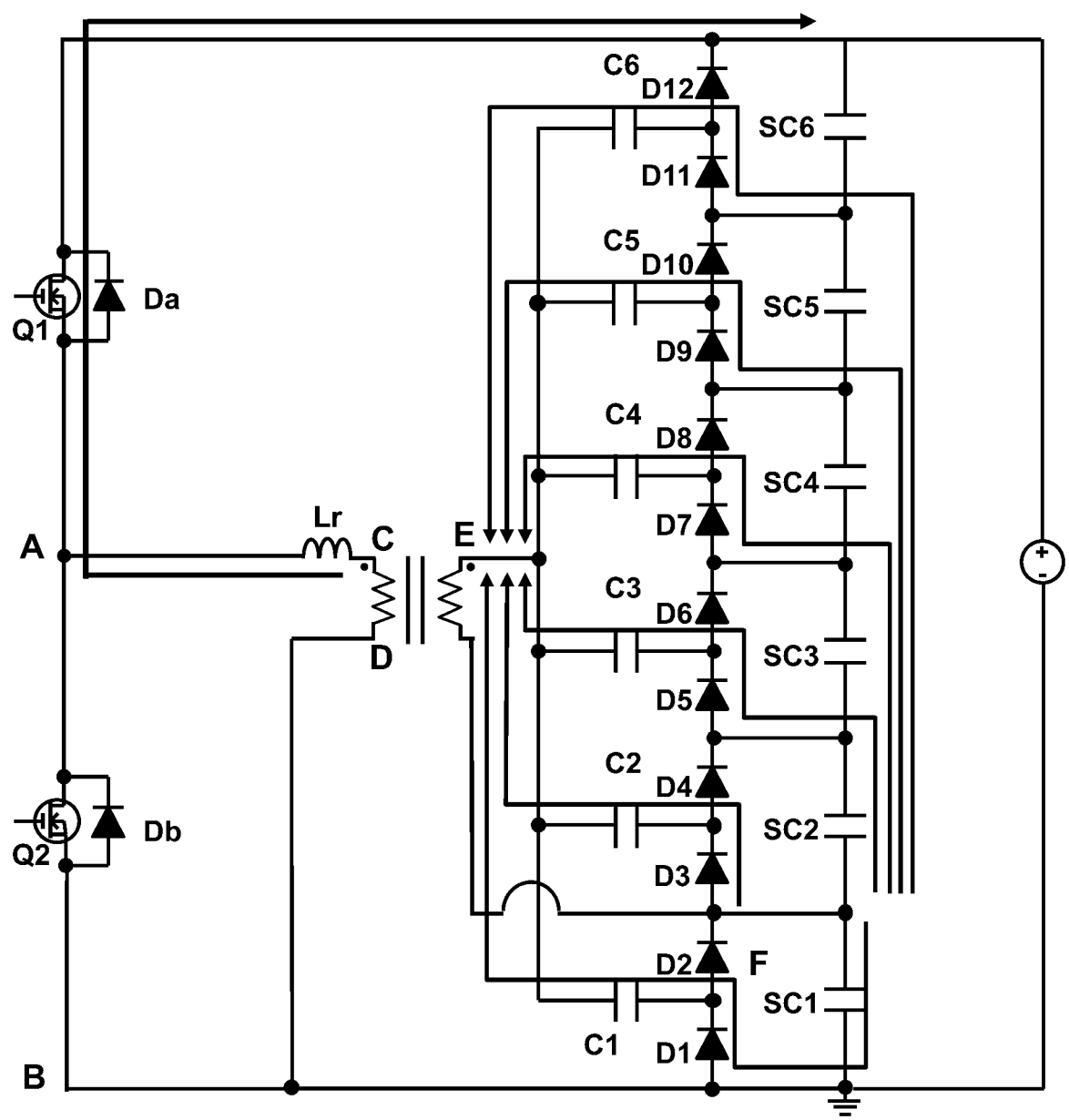
FIG. 29 is a diagram illustrating paths of current flowing during Mode 3 when the equalization circuit illustrated in FIG. 23 is operated at a frequency lower than the resonance frequency of the resonance circuit (FIG. 29 in Patent Literature 1).
Figure 30:
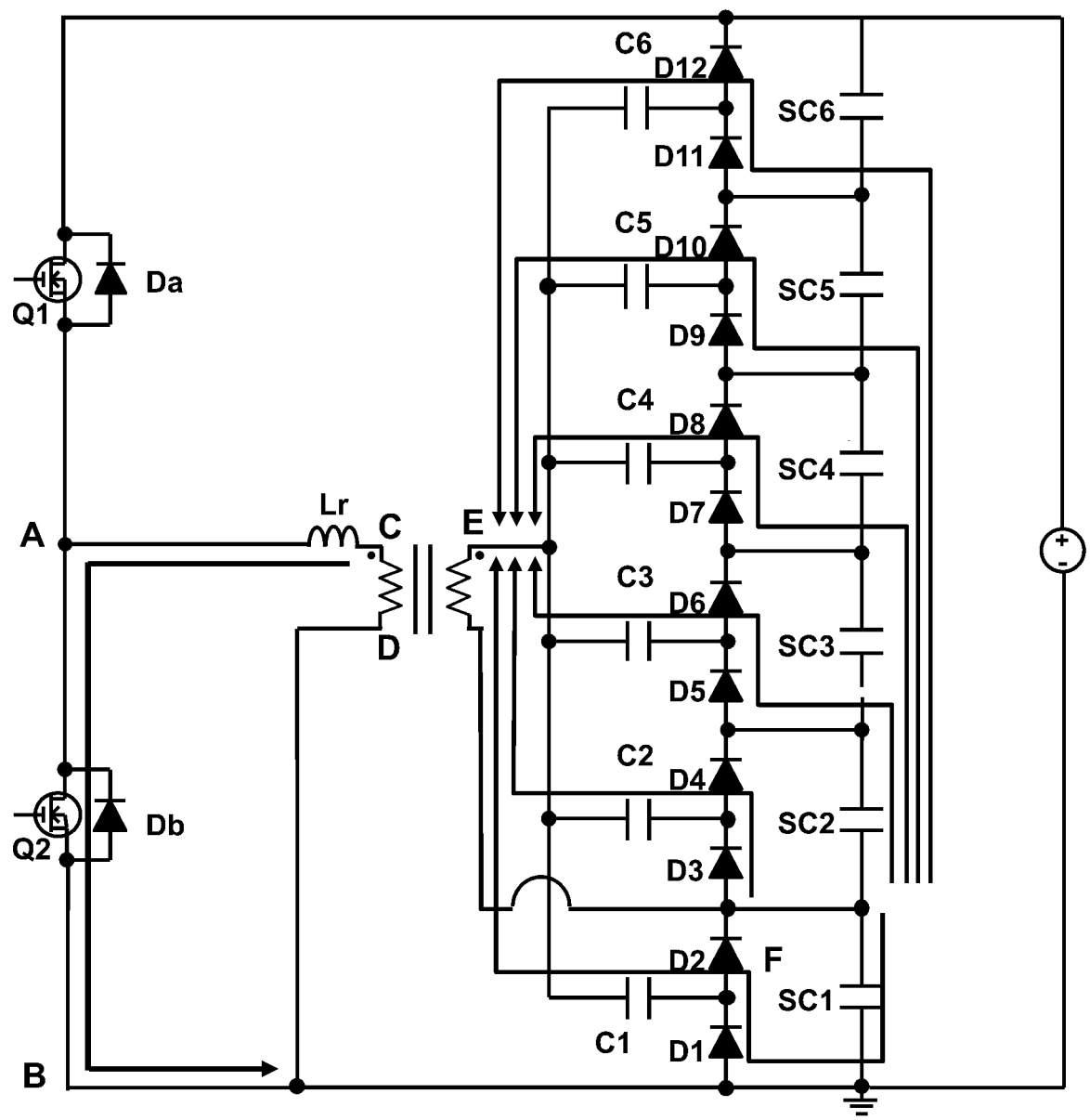
FIG. 30 is a diagram illustrating paths of current flowing during Mode 4 when the equalization circuit illustrated in FIG. 23 is operated at a frequency lower than the resonance frequency of the resonance circuit (FIG. 30 in Patent Literature 1).
Figure 31:
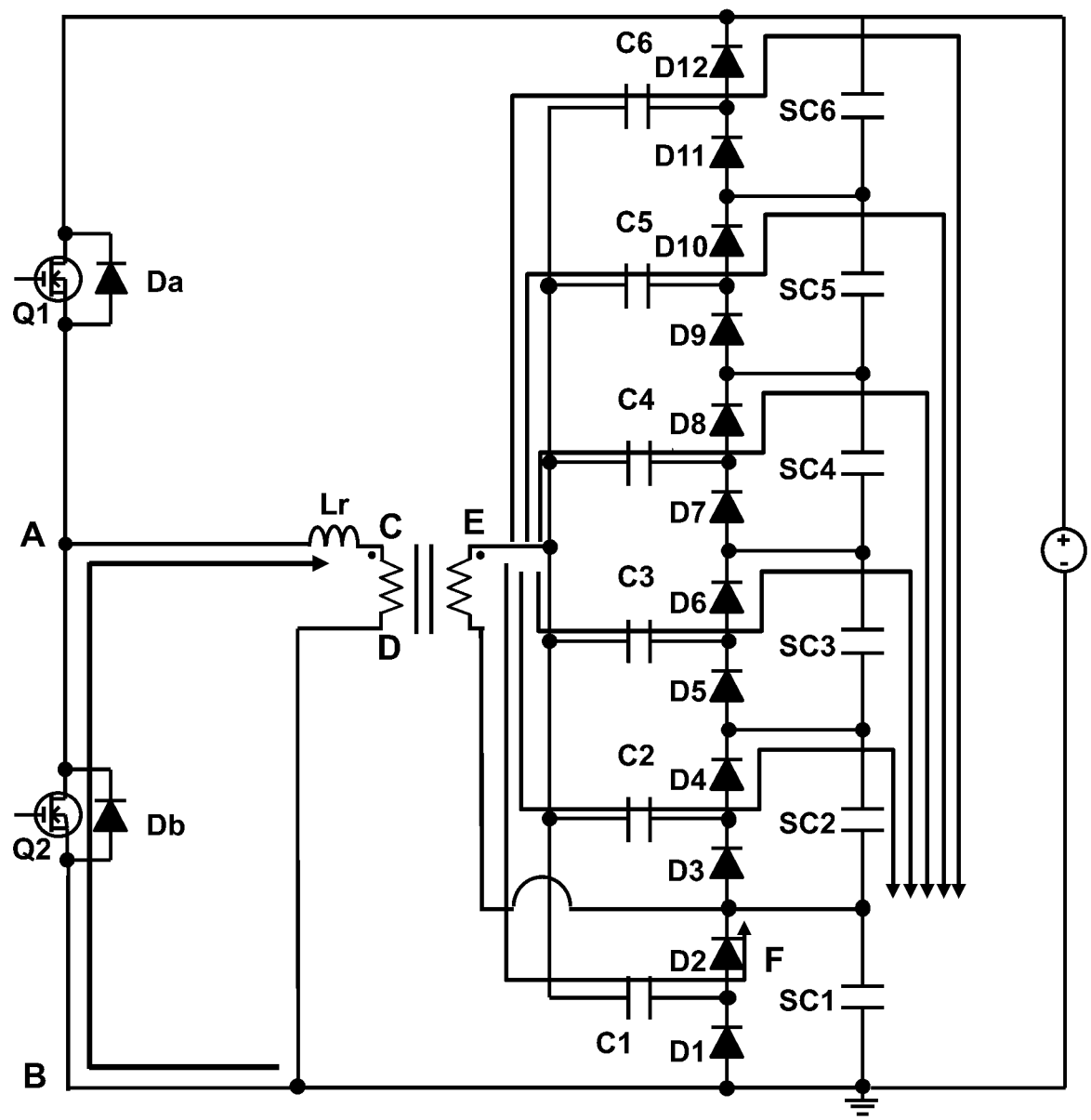
FIG. 31 is a diagram illustrating paths of current flowing during Mode 1 when the equalization circuit illustrated in FIG. 23 is operated at a frequency lower than the resonance frequency of the resonance circuit (FIG. 31 in Patent Literature 1).

When the resonance circuit is provided with a transformer in the equalization circuit disclosed in Patent Literature 1, a connection point F between the resonance circuit and the multi-stage voltage-doubling rectifier circuit can be located at an optional position between both ends of each of the diodes D1 to D12. For example, FIG. 23 illustrates the configuration of the equalization circuit when a connection point D is located at a middle point between the diodes D2 and D3. With such a configuration, too, when the connection state is temporally switched between the state in which the switch Q1 is on and the state in which the switch Q2 is on, a square wave voltage having a peak voltage at $V_{in}$ and a bottom voltage at zero is output to the resonance circuit. The current $i_{Lr}$ flowing through the inductor Lr is alternating current as in the graph of $i_{Lr}$ in FIG. 10 due to a resonance phenomenon among the inductor Lr, the resonance circuit internal capacitor Cr, and each of the capacitors C1 to C6.

FIGS. 24, 25, 26, and 27 illustrate paths of current during Modes 2, 3, 4, and 1, respectively, when the equalization circuit illustrated in FIG. 23 is operated at a switching frequency higher than the resonance frequency. Similarly to the equalization circuit illustrated in FIG. 9 or the like, the voltages $V_{C1E}$ to $V_{C6E}$ of the capacitors C1 to C6 when $v_{vm}$ in has the maximum value $V_{VM-E}$ can be expressed in Expression (2)' below by applying Kirchhoff's second law to a circuit in FIG. 24 corresponding to Mode 2, and the voltages $V_{C1O}$ to $V_{C6O}$ of the capacitors C1 to C6 when $v_{vm}$ in has the minimum value $V_{VM-O}$ can be expressed in Expression (3)' below by applying Kirchhoff's second law to a circuit in FIG. 26 corresponding to Mode 4.

[Math 6]

$$\begin{cases} -V_{C1E} = -V_{VM-E} + V_D \\ -V_{C2E} = -V_{VM-E} + V_D + V_{SC2} \\ -V_{C3E} = -V_{VM-E} + V_D + V_{SC2} + V_{SC3} \\ -V_{C4E} = -V_{VM-E} + V_D + V_{SC2} + V_{SC3} + V_{SC4} \\ -V_{C5E} = -V_{VM-E} + V_D + V_{SC2} + V_{SC3} + V_{SC4} + V_{SC5} \\ -V_{C6E} = -V_{VM-E} + V_D + V_{SC2} + V_{SC3} + V_{SC4} + V_{SC5} + V_{SC6} \end{cases} \quad (2)'$$

-continued

[Math 7]

$$\begin{cases} -V_{C1O} = -V_{VM-O} - V_D - V_{SC1} \\ -V_{C2O} = -V_{VM-O} - V_D \\ -V_{C3O} = -V_{VM-O} - V_D + V_{SC2} \\ -V_{C4O} = -V_{VM-O} - V_D + V_{SC2} + V_{SC3} \\ -V_{C5O} = -V_{VM-O} - V_D + V_{SC2} + V_{SC3} + V_{SC4} \\ -V_{C6O} = -V_{VM-O} - V_D + V_{SC2} + V_{SC3} + V_{SC4} + V_{SC5} \end{cases} \quad (3)'$$

Similarly to the equalization circuit illustrated in FIG. 9, Expression (4) can be obtained from Expressions (2)' and (3)' above. Accordingly, when the equalization circuit illustrated in FIG. 23 is operated at a switching frequency higher than the resonance frequency, too, the voltages of the electricity storage cells (or electricity storage modules) SC1 to SC6 are changed toward equalization.

FIGS. 28, 29, 30, and 31 illustrate paths of current during Modes 2, 3, 4, and 1, respectively, when the equalization circuit illustrated in FIG. 23 is operated at a switching frequency lower than the resonance frequency. Similarly to the equalization circuit illustrated in FIG. 9 or the like, the voltages $V_{C1E}$ to $V_{C6E}$ of the capacitors C1 to C6 when $v_{vm}$ has the maximum value $V_{VM-E}$ can be expressed in Expression (2)' above by applying Kirchhoffs second law to a circuit in FIG. 28 corresponding to Mode 2, and the voltages $V_{C1O}$ to $V_{C6O}$ of the capacitors C1 to C6 when $v_{vm}$ has the minimum value $V_{VM-O}$ can be expressed in Expression (3)' above by applying Kirchhoffs second law to a circuit in FIG. 30 corresponding to Mode 4.

Similarly to the equalization circuit illustrated in FIG. 9, Expression (4) can be obtained from Expressions (2)' and (3)' above. Accordingly, when the equalization circuit illustrated in FIG. 23 is operated at a switching frequency lower than the resonance frequency, too, the voltages of the electricity storage cells (or electricity storage modules) SC1 to SC6 are changed toward equalization. When the connection point D is located at another position, too, Expression (4) is obtained similarly, indicating that the voltages of the electricity storage cells (or electricity storage modules) SC1 to SC6 are changed toward equalization.

Voltage Equalization Circuit System

The following describes the concept of the voltage equalization circuit system according to the present invention based on the configurations and operations of the circuit elements disclosed by the earlier application invention as described above.

Figure 32:
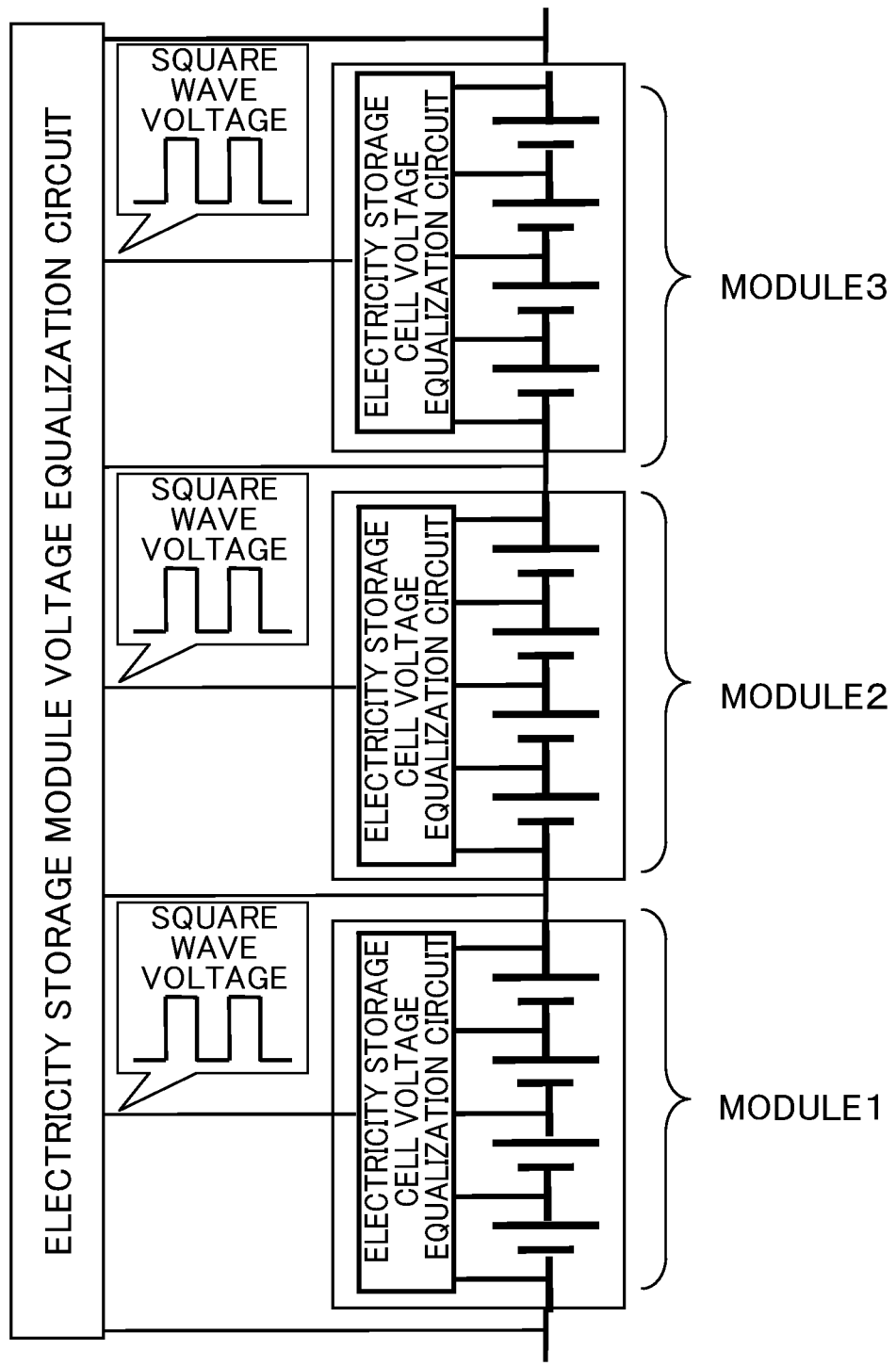
FIG. 32 is a conceptual diagram of a voltage equalization circuit system including a modular equalization circuit according to the present invention.

FIG. 32 is a conceptual diagram of a configuration in which an modular equalization circuit including an electricity storage module voltage equalization circuit and an electricity storage cell voltage equalization circuit is provided as an example of the voltage equalization circuit system according to the present invention in an electricity storage system in which three electricity storage modules each including four electricity storage cells connected in series are connected in series.

In a typical aspect, the electricity storage module voltage equalization circuit in FIG. 32 is a switching converter. A square wave voltage is generated at a switching node in the electricity storage module voltage equalization circuit collaterally with operation of the circuit. In the modular equalization circuit according to the present invention, this square wave voltage collaterally generated in the electricity storage module voltage equalization circuit is used to operate the electricity storage cell voltage equalization circuit, thereby achieving an electricity storage cell voltage equalization circuit without a switch. In other words, the electricity storage cell voltage equalization circuit does not need to include the input circuit included in the equalization circuit according to Patent Literature 1. The electricity storage cell voltage equalization circuit may be various types of resonance voltage-doubling rectifier circuits, such as the series resonance voltage-doubling rectifier circuit in the circuit illustrated in FIG. 3, each including the multi-stage voltage-doubling rectifier circuit and the resonance circuit of the equalization circuit described above based on the description of Patent Literature 1. The electricity storage module voltage equalization circuit may be operated through various equalization circuit schemes for operation by switching.

Embodiment 1

Figure 33:
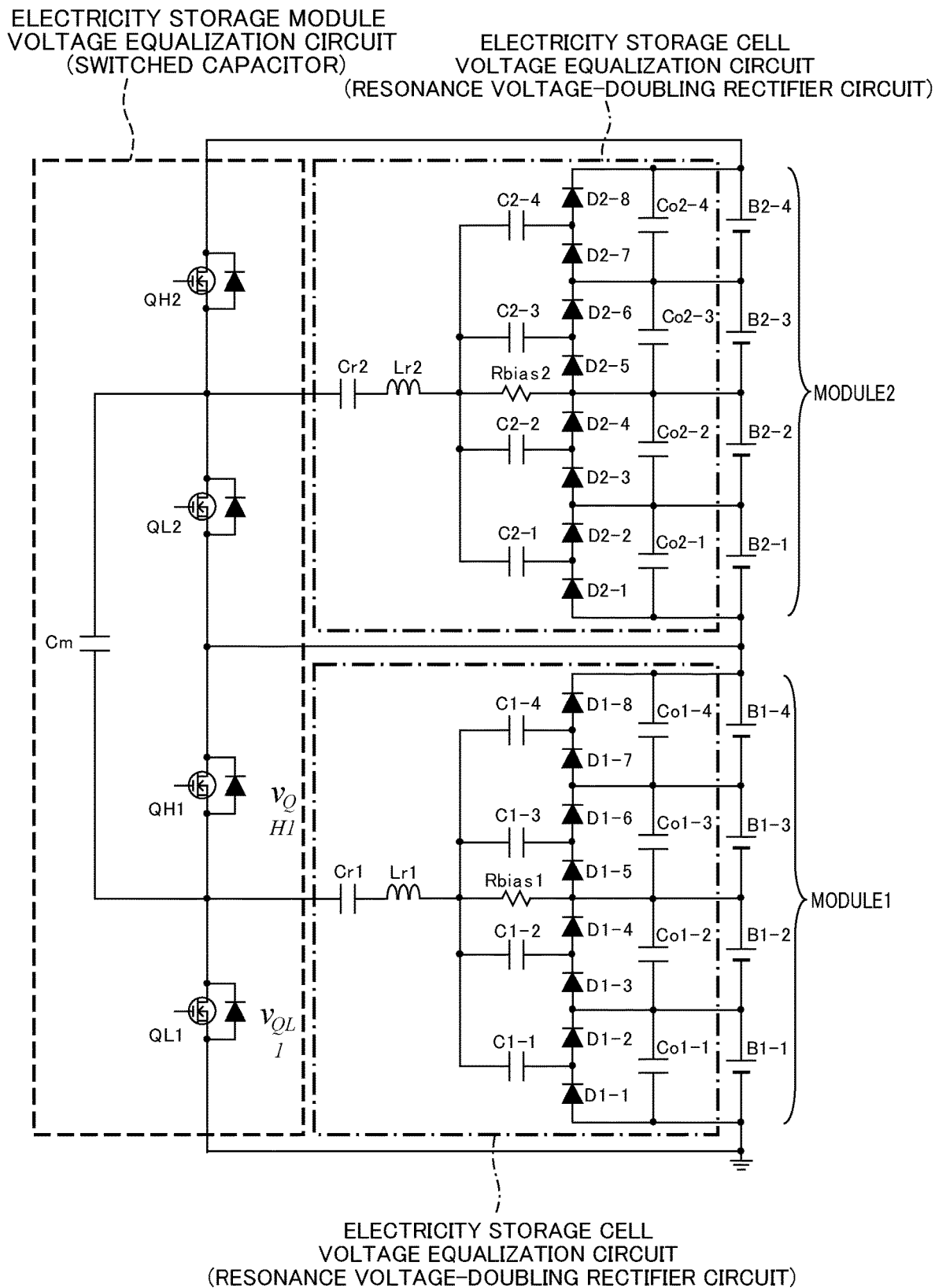
FIG. 33 is a circuit diagram of an electricity storage system including the voltage equalization circuit system according to the present invention, in which a switched capacitor is used as an electricity storage module voltage equalization circuit (the number of modules connected in series is two).

FIG. 33 illustrates, as a specific example of the voltage equalization circuit system, a system configuration in which the electricity storage module voltage equalization circuit is a switched capacitor, and the electricity storage cell voltage equalization circuit is the series resonance voltage-doubling rectifier circuit illustrated in FIG. 3.

The electricity storage module voltage equalization circuit is configured as a switched capacitor including a capacitor Cm and switches QL1, QH1, QL2, and QH2. A first electricity storage cell voltage equalization circuit is configured as a series resonance voltage-doubling rectifier circuit that includes a resonance circuit including a capacitor Cr1 and an inductor Lr1 and includes capacitors C1-1 to C1-4, diodes D1-1 to D1-8, and output-side capacitors Co1-1 to Co1-4. The output-side capacitors Co1-1 to Co1-4 are not essential. A second electricity storage cell voltage equalization circuit is configured as a series resonance voltage-doubling rectifier circuit that includes a resonance circuit including a capacitor Cr2 and an inductor Lr2 and includes capacitors C2-1 to C2-4, diodes D2-1 to D2-8, and output-side capacitors Co2-1 to Co2-4. The output-side capacitors Co2-1 to Co2-4 are not essential. In FIG. 33, Rbias1 and Rbias2 denote bias resistors that are optionally provided to stabilize the voltages of the capacitors Cr1 and C1-1 to C1-4 and the voltages of the capacitors Cr2 and C2-1 to C2-4, respectively.

As illustrated in FIG. 33, the first and second electricity storage cell voltage equalization circuits are connected with a first electricity storage module including electricity storage cells B1-1 to B1-4, and a second electricity storage module including electricity storage cells B2-1 to B2-4, respectively. Then, in operation, the switched capacitor is alternately switched between a state in which only the switches QL1 and QL2 are on and a state in which only the switches QH1 and QH2 are on at an equal time ratio for each state (ratio of a time in which the state is achieved in one switching period). However, the time ratio does not necessarily need to be equal to execute operation (the time ratio is desirably equal for equalization of performance of the electricity storage module voltage equalization circuit including the switched capacitor). In practical use of the electricity storage module voltage equalization circuit, an appropriate dead time is provided in the switching as necessary. Accordingly, the first electricity storage module and the second electricity storage module are connected in parallel with each other through the capacitor Cm and perform mutual charging and discharging to reduce a voltage difference between both electricity storage modules (the "voltage of an electricity storage module" refers to a voltage between both ends of the electricity storage module; this notation applies to the "voltage of an electricity storage cell" and the like, and any other embodiment).

In such an operation, square wave voltages are generated at the switches QL1 and QL2. Specifically, at a timing when the switches QL1 and QL2 are on, a voltage applied between both ends of each of the switches QL1 and QL2 is zero (to simplify description, the forward drop voltage of a diode is assumed to be zero; this assumption also applies in the following). At a timing when the switches QH1 and QH2 are on, a voltage applied between both ends of the switch QL1 is "the sum of voltages applied to the electricity storage cells B1-1 to B1-4 (the voltage of the first electricity storage module)", and a voltage applied between both ends of the switch QL2 is "the sum of voltages applied to the electricity storage cells B2-1 to B2-4 (the voltage of the second electricity storage module)". These square wave voltages are input to the respective first and second electricity storage cell voltage equalization circuits each configured as a series resonance voltage-doubling rectifier circuit.

As described above based on Patent Literature 1, when input to a series resonance voltage-doubling rectifier circuit, a square wave voltage is converted into an alternating-current voltage by a resonance circuit so that a multi-stage voltage-doubling rectifier circuit is operated based on the alternating-current voltage to equalize the voltages of electricity storage cells connected with the multi-stage voltage-doubling rectifier circuit. Specifically, in the first electricity storage cell voltage rectifier circuit, a square wave voltage input from a switching node between the switches QL1 and QH1 is converted into an alternating-current voltage by the resonance circuit including the capacitor Cr1 and the inductor Lr1. This alternating-current voltage is then input to the multi-stage voltage-doubling rectifier circuit including the capacitors C1-1 to C1-4, the diodes D1-1 to D1-8, and the output-side capacitors Co1-1 to Co1-4. Accordingly, the voltages of the electricity storage cells B1-1 to B1-4 are equalized through the operation of the multi-stage voltage-doubling rectifier circuit (the voltages of the output-side capacitors Co1-1 to Co1-4 are equalized, and the voltages of the electricity storage cells B1-1 to B1-4 connected in parallel with the respective output-side capacitors Co1-1 to Co1-4 are equalized. When the output-side capacitors Co1-1 to Co1-4 are not provided, the voltages of the electricity storage cells B1-1 to B1-4 are directly equalized). In the second electricity storage cell voltage rectifier circuit, a square wave voltage input from a switching node between the switches QL2 and QH2 is converted into an alternating-current voltage by the resonance circuit including the capacitor Cr2 and the inductor Lr2. This alternating-current voltage is then input to the multi-stage voltage-doubling rectifier circuit including the capacitors C2-1 to C2-4, the diodes D2-1 to D2-8, and the output-side capacitors Co2-1 to Co2-4. Accordingly, the voltages of the electricity storage cells B2-1 to B2-4 are equalized through the operation of the multi-stage voltage-doubling rectifier circuit (the voltages of the output-side capacitors Co2-1 to Co2-4 are equalized, and the voltages of the electricity storage cells B2-1 to B2-4 connected in parallel with the respective output-side capacitors Co2-1 to Co2-4 are equalized. When the output-side capacitors Co2-1 to Co2-4 are not provided, the voltages of the electricity storage cells B2-1 to B2-4 are directly equalized).

In this manner, the voltages of the electricity storage cells in the electricity storage system can be equalized through parallel execution of equalization of the voltages of the electricity storage modules by the electricity storage module voltage equalization circuit and equalization of the voltages of the electricity storage cells in the electricity storage modules by the respective first and second electricity storage cell voltage equalization circuits.

Figure 34:
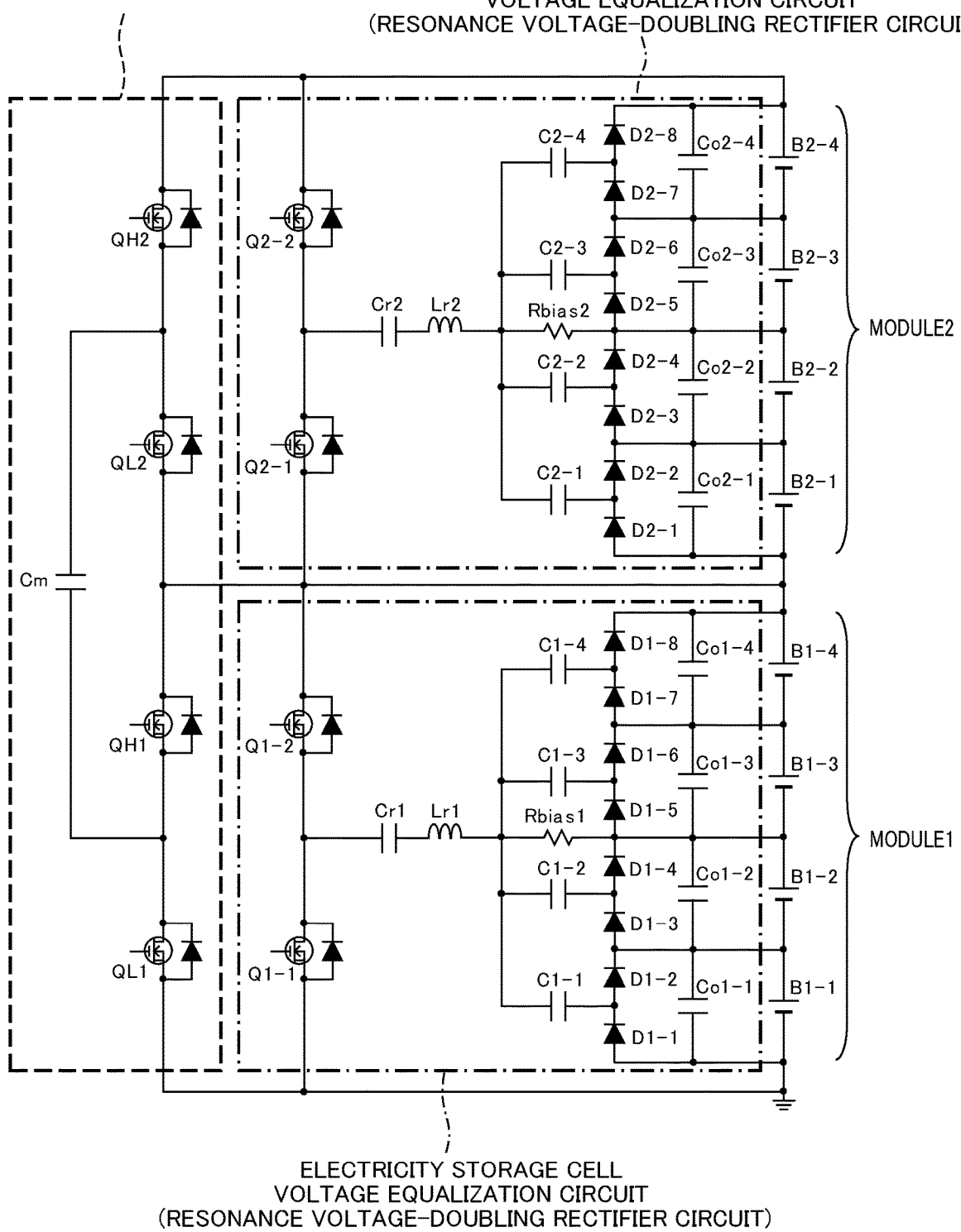
FIG. 34 is a circuit diagram of an electricity storage system including a conventional voltage equalization circuit system, in which a switched capacitor is used as an electricity storage module voltage equalization circuit (the number of modules connected in series is two).

FIG. 34 illustrates a conventional voltage equalization circuit system in which an electricity storage module voltage equalization circuit (switched capacitor) is not integrated with any electricity storage cell voltage equalization circuit (series resonance voltage-doubling rectifier circuit), and each circuit separately includes a switch. In this conventional system, the switches QL1, QH1, QL2, and QH2 included in the switched capacitor are controlled separately from the switches Q1-1, Q1-2, Q2-1, and Q2-2 connected with the respective series resonance voltage-doubling rectifier circuits. With this configuration, equalization of the voltages of electricity storage modules was performed separately from equalization of the voltages of electricity storage cells. The number of switches in the equalization circuit system illustrated in FIG. 33 is reduced to four from eight in the conventional example illustrated in FIG. 34.

Figure 35:
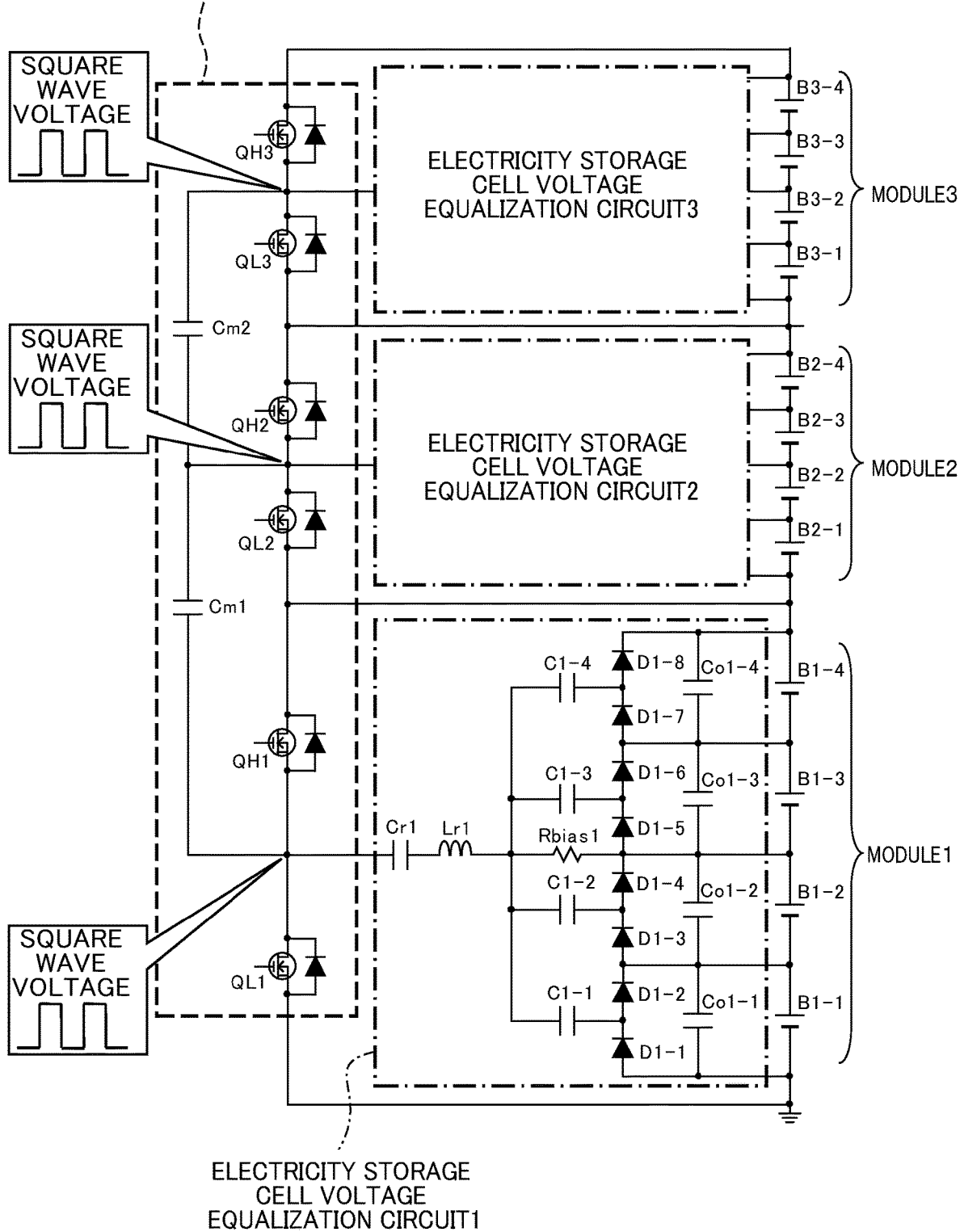
FIG. 35 is a circuit diagram of an electricity storage system including the voltage equalization circuit system according to the present invention, in which a switched capacitor is used as an electricity storage module voltage equalization circuit (the number of modules connected in series is three).

The voltage equalization by the equalization circuit system according to the present invention may be performed on an optional number of electricity storage modules connected in series and an optional number of electricity storage cells connected in series. FIG. 35 illustrates a system circuit diagram of a configuration in which three electricity storage modules are connected in series. For simplification, FIG. 35 only illustrates a circuit diagram of an electricity storage cell voltage equalization circuit provided to the first electricity storage module, and illustrates, as a block, an electricity storage cell voltage equalization circuit provided to any other electricity storage module.

Embodiment 2

Figure 36:
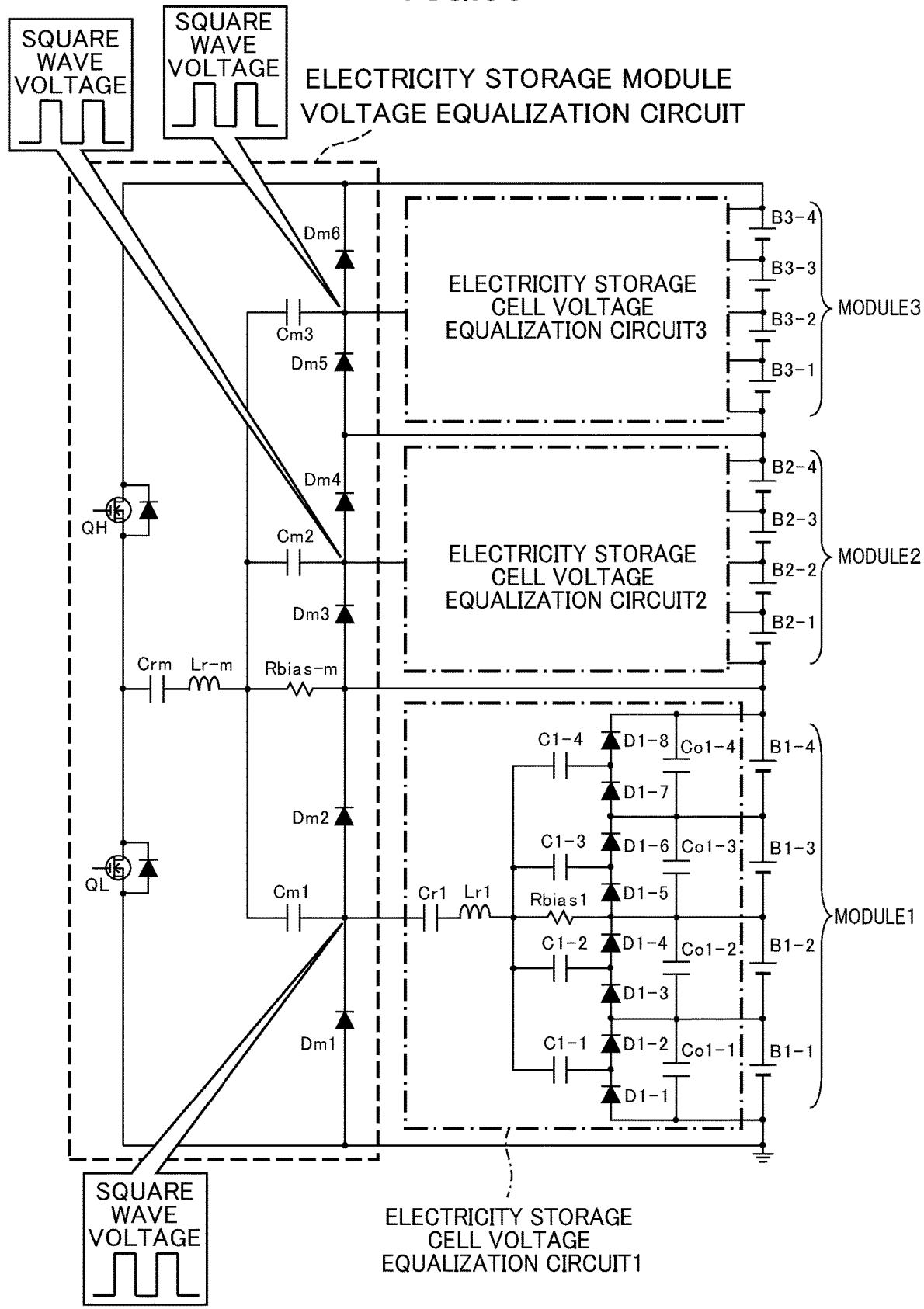
FIG. 36 is a circuit diagram of an electricity storage system including the voltage equalization circuit system according to the present invention, in which a series resonance voltage-doubling rectifier circuit is used as an electricity storage module voltage equalization circuit (the number of modules connected in series is three).

Although FIG. 33 illustrates a circuit configuration in which a switched capacitor is employed as an electricity storage module voltage equalization circuit, any other equalization circuit scheme is applicable to the electricity storage module voltage equalization circuit. For example, FIG. 36 illustrates a modular voltage equalization circuit system in which an electricity storage module voltage equalization circuit and an electricity storage cell voltage equalization circuit are both series resonance voltage-doubling rectifier circuits.

The electricity storage module voltage equalization circuit includes a resonance circuit, a series resonance voltage-doubling rectifier circuit, and an input circuit connected with the resonance circuit and the series resonance voltage-doubling rectifier circuit. The resonance circuit includes a capacitor Crm and an inductor Lr-m. The series resonance voltage-doubling rectifier circuit includes capacitors Cm1 to Cm3 and diodes Dm1 to Dm6. In the input circuit, switches QL and QH are each connected in parallel with a flywheel diode. Reference sign Rbias-m denotes a bias resistor that is optionally provided to stabilize the voltages of the capacitors Crm and Cm1 to Cm3. The three electricity storage cell voltage equalization circuits are configured as series resonance voltage-doubling rectifier circuits like those illustrated in FIG. 33.

In operation, a square wave voltage is output by alternately switching the input circuit of the electricity storage module voltage equalization circuit between a state in which only the switch QL is on and a state in which only the switch QH is on at an equal time ratio for each state (ratio of a time in which the state is achieved in one switching period). This square wave voltage is converted into an alternating-current voltage by the resonance circuit including the capacitor Crm and the inductor Lr-m. This alternating-current voltage is then input to the multi-stage voltage-doubling rectifier circuit including the capacitors Cm1 to Cm3 and the diodes Dm1 to Dm6. Accordingly, the voltages of first to third electricity storage modules (in FIG. 36, Modules 1 to 3) are equalized through the operation of the multi-stage voltage-doubling rectifier circuit. However, similarly to Embodiment 1, the time ratio does not necessarily need to be equal to execute operation, and an appropriate dead time is provided in the switching as necessary.

Through the switching in the input circuit, square wave voltages are generated between the diodes Dm1 and Dm2, between the diodes Dm3 and Dm4, and between the diodes Dm5 and Dm6, respectively. Specifically, as described above based on Patent Literature 1, a state in which the odd-numbered diodes Dm1, Dm3, and Dm5 are in conduction and a state in which the even-numbered diodes Dm2, Dm4, and Dm6 are in conduction are alternately achieved in the multi-stage voltage-doubling rectifier circuit including the capacitors Cm1 to Cm3 and the diodes Dm1 to Dm6 (refer to, for example, FIGS. 11 to 14 and 17 to 20). When the odd-numbered diodes are in conduction, a voltage applied between both ends of each of the diodes Dm1, Dm3, and Dm5 is zero (to simplify description, the forward drop voltage of a diode is assumed to be zero; this assumption also applies in the following), and voltages applied between both ends of each of the even-numbered diodes Dm2, Dm4, and Dm6 are equal to the voltage of the first electricity storage module, the voltage of the second electricity storage module, and the voltage of the third electricity storage module, respectively. When the even-numbered diodes are in conduction, a voltage applied between both ends of each of the diodes Dm2, Dm4, and Dm6 is zero, and voltages applied between both ends of each of the odd-numbered diodes Dm1, Dm3, and Dm5 are equal to the voltage of the first electricity storage module, the voltage of the second electricity storage module, and the voltage of the third electricity storage module, respectively. In this manner, similarly to the operation of the voltage equalization circuit system illustrated in FIG. 33, the square wave voltage is input to each electricity storage cell voltage equalization circuit.

Similarly to the configuration illustrated in FIG. 33, the three electricity storage cell equalization circuits are series resonance voltage-doubling rectifier circuits. Thus, as described above with reference to Patent Literature 1 and Embodiment 1, the series resonance voltage-doubling rectifier circuits operate in response to the square wave voltages as input voltages, thereby equalizing the voltages of electricity storage cells in each electricity storage module. In the configuration illustrated in FIG. 36, too, each electricity storage cell voltage equalization circuit can operate without a switch, and the number of switches needed in the entire voltage equalization circuit system configured as a modular equalization circuit is two (the switches QL and QH in the electricity storage module voltage equalization circuit).

Embodiment 3

Figure 37:
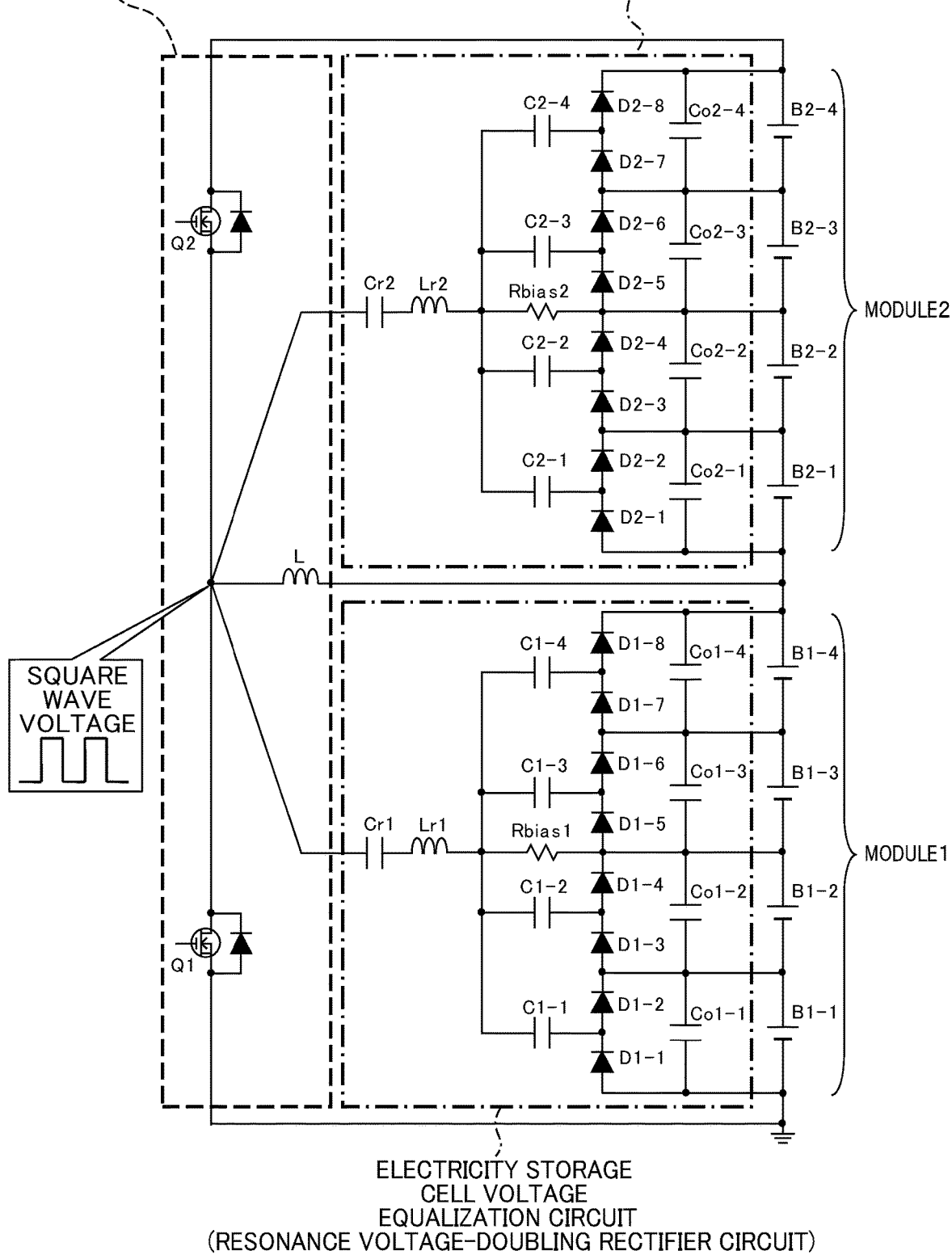
FIG. 37 is a circuit diagram of an electricity storage system including the voltage equalization circuit system according to the present invention, in which a buck-booster converter is used as an electricity storage module voltage equalization circuit (the number of modules connected in series is two).

FIG. 37 illustrates the configuration of a voltage equalization circuit system provided with a switch-type buck-boost converter including switches Q1 and Q2 and an inductor L, as another exemplary electricity storage module voltage equalization circuit. The configuration of an electricity storage cell voltage equalization circuit is same as that illustrated in, for example, FIG. 33.

In the voltage equalization circuit system illustrated in FIG. 37, a state in which only the switch Q1 is on and a state in which only the switch Q2 is on are alternately switched to equalize the voltages of first and second electricity storage modules (in FIG. 37, Modules 1 and 2). Specifically, when D represents a time ratio (ratio of a time in which only the switch Q1 is on in one switching period) of the switch Q1 (0<D<1) and $V_{M1}$ and $V_{M2}$ represent the voltages of the first and second electricity storage modules, respectively, the following equation holds based on the balance of magnetic flux at the inductor L in the stationary state.

$$DV_{M1}=(1-D)V_{M2} \quad (7)$$

When the time ratio is set to be 50% (D=0.5), the equation yields $V_{M1}=V_{M2}$, which indicates that the voltages of the first and second electricity storage modules are equalized.

In this case, a voltage applied to the switch Q1 is zero in the state in which only the switch Q1 is on, or is $V_{M1}+V_{M2}$ in the state in which only the switch Q2 is on. Accordingly, a square wave voltage is generated between the switches Q1 and Q2 through switching of the switches Q1 and Q2. This square wave voltage is input to two series resonance voltage-doubling rectifier circuits (electricity storage cell voltage equalization circuits) connected with the first and second electricity storage modules, respectively, thereby equalizing the voltages of electricity storage cells in each of the first and second electricity storage modules as described above.

INDUSTRIAL APPLICABILITY

The present invention is widely applicable to a power source including an electricity storage cell, such as a capacitor, a secondary battery, and an electric double-layer capacitor.

REFERENCE SIGNS LIST

SC1 to SC6, B1 to B3, B1-1 to B1-4, B2-1 to B2-4, B3-1 to B3-4 electricity storage cell (or electricity storage module)
C1 to C6, Ca, Cb, Cout1 to Cout4, C1-1 to C1-4, C2-1 to C2-4, Co1-1 to Co1-4, Co2-1 to Co2-4 capacitor
D1 to D12, D1-1 to D1-8, D2-1 to D2-8 diode
Q1 to Q6, QL1 to QL3, QH1 to QH3, Q1-1, Q1-2, Q2-1, Q2-2 switch
Da to Dd flywheel diode
L, Lr, Lr1, Lr2, Lm, Lp inductor
Cr, Cr1, Cr2 resonance circuit internal capacitor
Rbias1, Rbias2 bias resistor

The invention claimed is:
1. A voltage equalization circuit system comprising:
first to n-th (n is an integer equal to or larger than two) electricity storage modules in series connection, each electricity storage module including a plurality of electricity storage cells in series connection;
first to n-th electricity storage cell voltage equalization circuits, where the k-th (k is any integer from 1 to n) electricity storage cell voltage equalization circuit is connected to both edges of the k-th electricity storage module; and
an electricity storage module voltage equalization circuit connected to each of the first to n-th electricity storage cell voltage equalization circuits, wherein
when $m_k$ ($m_k$ is an integer equal to or larger than two) represents the number of electricity storage cells included in the k-th electricity storage module, the k-th electricity storage cell voltage equalization circuit includes at least:
$m_k$ output-side capacitors in series connection;
$2m_k$ internal diodes in series connection;
$m_k$ internal capacitors; and
a resonance circuit comprising a resonance inductor and a resonance capacitor in series connection, each one electricity storage cell in the $m_k$ electricity storage cells included in the k-th electricity storage module is in parallel connection with one output-side capacitor in the $m_k$ output-side capacitors, each electricity storage cell in the $m_k$ electricity storage cells included in the k-th electricity storage module is in parallel connection with a set of two internal diodes among the $2m_k$ internal diodes, a middle point of the set of two internal diodes is connected to one of the $m_k$ internal capacitors, and the $m_k$ internal capacitors are connected to the resonance circuit,
the electricity storage module voltage equalization circuit includes at least:
2n switches in series connection; and
one or more electricity storage module voltage equalization capacitors, and
the k-th electricity storage cell voltage equalization circuit is connected to a set of two switches among the 2n switches, a middle point of the set of two switches is connected to at least one of the one or more electricity storage module voltage equalization capacitors, and both edges of a set of the 2n switches are connected to a set of the first to n-th electricity storage modules.

2. A voltage equalization circuit system comprising:
first to n-th (n is an integer equal to or larger than two) electricity storage modules in series connection, each electricity storage module including a plurality of electricity storage cells in series connection;
first to n-th electricity storage cell voltage equalization circuits, where the k-th (k is any integer from 1 to n) electricity storage cell voltage equalization circuit is connected to both edges of the k-th electricity storage module; and
an electricity storage module voltage equalization circuit connected to each of the first to n-th electricity storage cell voltage equalization circuits, wherein
when $m_k$ ($m_k$ is an integer equal to or larger than two) represents the number of electricity storage cells included in the k-th electricity storage module, the k-th electricity storage cell voltage equalization circuit includes at least:
$2m_k$ internal diodes in series connection;
$m_k$ internal capacitors; and
a resonance circuit comprising a resonance inductor and a resonance capacitor in series connection, each electricity storage cell among the $m_k$ electricity storage cells included in the k-th electricity storage module is in parallel connection with a set of two internal diodes in the $2m_k$ internal diodes, a middle point of the set of two internal diodes is connected to one of the $m_k$ internal capacitors, the $m_k$ internal capacitors are connected to the resonance circuit, the electricity storage module voltage equalization circuit includes at least:
2n electricity storage module voltage equalization diodes in series connection;
n electricity storage module voltage equalization capacitors;
an electricity storage module voltage equalization resonance circuit comprising an electricity storage module voltage equalization resonance inductor and an electricity storage module voltage equalization resonance capacitor in series connection; and
two switches in series connection, and
the resonance circuit in each one of the first to n-th electricity storage cell voltage equalization circuits is connected to a middle point of a set of two electricity storage module voltage equalization diodes in the 2n electricity storage module voltage equalization diodes, the middle point of the set of two electricity storage module voltage equalization diodes is connected to one of the n electricity storage module voltage equalization capacitors, the n electricity storage module voltage equalization capacitors are connected to the electricity storage module voltage equalization resonance circuit, the electricity storage module voltage equalization resonance circuit is connected to a middle point of a set of the two switches, and both edges of the set of the two switches are connected to a set of the first to n-th electricity storage modules.

3. A voltage equalization circuit system comprising:
first to n-th (n is an integer equal to or larger than two) electricity storage modules in series connection, each electricity storage module including a plurality of electricity storage cells in series connection;
first to n-th electricity storage cell voltage equalization circuits, where the k-th (k is any integer from 1 to n) electricity storage cell voltage equalization circuit is connected to both edges of the k-th electricity storage module; and
an electricity storage module voltage equalization circuit connected to each of the first to n-th electricity storage cell voltage equalization circuits, wherein
when $m_k$ ($m_k$ is an integer equal to or larger than two) represents the number of electricity storage cells included in the k-th electricity storage module, the k-th electricity storage cell voltage equalization circuit includes at least:
$2m_k$ internal diodes in series connection;
$m_k$ internal capacitors; and
a resonance circuit comprising a resonance inductor and a resonance capacitor in series connection, each one electricity storage cell in the $m_k$ electricity storage cells included in the k-th electricity storage module is in parallel connection with a set of two internal diodes in the $2m_k$ internal diodes, a middle point of the set of two internal diodes is connected to one of the $m_k$ internal capacitors, the $m_k$ internal capacitors are connected to the resonance circuit,
n=2,
the electricity storage module voltage equalization circuit includes at least:
an electricity storage module voltage equalization inductor; and
two switches in series connection, and
one edge of the electricity storage module voltage equalization inductor is connected to a middle point of a set of the first electricity storage module and the second electricity storage module, the other edge of the electricity storage module voltage equalization inductor is connected to the resonance circuit included in the first electricity storage cell voltage equalization circuit and to the resonance circuit included in the second electricity storage cell voltage equalization circuit, the other edge of the electricity storage module voltage equalization inductor is further connected to a middle point of a set of the two switches, and both edges of the set of the two switches are connected to a set of the first to n-th electricity storage modules.

* * * * *